(12) United States Patent
Iijima et al.

(10) Patent No.: US 6,462,491 B1
(45) Date of Patent: Oct. 8, 2002

(54) POSITION SENSORLESS MOTOR CONTROL APPARATUS

(75) Inventors: Tomoyuki Iijima, Osaka; Kazushige Narazaki, Katano; Toru Tazawa, Ibaraki; Yukinori Maruyama, Kadoma, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/491,382

(22) Filed: Jan. 26, 2000

(30) Foreign Application Priority Data

Jan. 27, 1999 (JP) .......................................... 11-018362
Mar. 26, 1999 (JP) .......................................... 11-083304

(51) Int. Cl.$^7$ ................................................ H02P 6/18
(52) U.S. Cl. ........................ 318/254; 318/439; 318/721
(58) Field of Search ................................ 318/138, 254, 318/439, 700, 720–724

(56) References Cited

U.S. PATENT DOCUMENTS

| | | | |
|---|---|---|---|
| 4,701,839 A | * 10/1987 | McNally et al. ........ 318/721 X |
| 4,922,169 A | * 5/1990 | Freeman ..................... 318/254 |
| 5,448,149 A | * 9/1995 | Ehsani et al. ............... 318/701 |
| 5,569,994 A | * 10/1996 | Taylor et al. ............... 318/700 |
| 5,635,810 A | * 6/1997 | Goel .......................... 318/719 |
| 5,689,165 A | * 11/1997 | Jones et al. ................. 318/701 |
| 5,696,430 A | 12/1997 | Erdman et al. ............. 318/254 |
| 5,726,549 A | * 3/1998 | Okuno et al. .............. 318/721 |
| 6,005,364 A | * 12/1999 | Acarnley .................... 318/632 |
| 6,028,406 A | * 2/2000 | Birk ............................ 318/254 |
| 6,081,087 A | * 6/2000 | Iijima et al. ................ 318/439 |
| 6,157,150 A | * 12/2000 | Konecny ..................... 318/254 |

FOREIGN PATENT DOCUMENTS

| | | |
|---|---|---|
| JP | Sho 64-43095 | 2/1989 |
| JP | Hei 9-47075 | 2/1997 |
| JP | Hei 9-65678 | 3/1997 |

OTHER PUBLICATIONS

Takaharu Takeshita, et al.; "Back EMF Estimation–Based Sensorless Salient–Pole Brushless DC MotorDrives"; T.IEE Japan, vol. 117–D, No. 1; pp. 98—pp. 104 (1997).

* cited by examiner

*Primary Examiner*—Bentsu Ro
(74) *Attorney, Agent, or Firm*—Akin, Gump, Strauss, Hauer & Feld, L.L.P.

(57) ABSTRACT

A position sensorless motor control apparatus is provided that achieves high resolution and high accuracy angle estimation, achieves angle estimation even in the presence of phase voltage saturation, and achieves high accuracy angle estimation even when a back electromotive force constant changes. An angle estimating unit which generates estimated rotor angle comprises: an estimation phase selecting unit for selecting an estimation phase designating the stator winding phase to be used for the generation of the estimated angle; a deviation generating unit for generating, based on the estimated angle and phase voltage value, a deviation relative to a model expressed by a phase voltage equation of the estimation phase; an angle correcting unit for correcting the estimated angle so that the deviation converges to zero; and an estimated coefficient value correcting unit for correcting an estimated coefficient value which is the estimated value of a coefficient in the phase voltage equation.

26 Claims, 30 Drawing Sheets

FIG. 28 PRIOR ART

POSITION SENSORLESS MOTOR CONTROL APPARATUS

BACKGROUND OF THE INVENTION

The present invention relates to a position sensorless motor control apparatus which drives a motor for rotation by estimating rotor angle without using position sensors. More particularly, the invention relates to a position sensorless motor control apparatus that achieves high resolution and high accuracy angle estimation, achieves angle estimation even in the presence of phase voltage saturation, and achieves high accuracy angle estimation even-when a back electromotive force constant changes.

Brushless motors which do not use mechanical commutation mechanisms need to be electrically commutated based on rotor angle.

In conventional motor control apparatuses, position sensors such as Hall elements, resolvers, or optical encoders mounted on brushless motors have been used to obtain rotor angle information. The provision of such a position sensor has necessarily added to the cost and increased the size of the brushless motor.

Position sensorless motor control apparatuses that achieve reduced cost and reduced size by eliminating the position sensor are known in the art, including one disclosed in Japanese Unexamined Patent Publication No. 64-43095 (hereinafter referred to as the prior art 1) and one described in "Collection of Papers, The Institute of Electrical Engineers," Vol. 117-D, No. 1, pp. 98–104, 1997 (hereinafter referred to as the prior art 2). These prior art position sensorless motor control apparatuses will be described below. In the following description, some of the value names used in the above cited literature are changed to maintain consistency with those used in the embodiments of the present invention.

These prior art position sensorless motor control apparatuses are designed to control Y-connected three-phase brushless motors.

A block diagram of the, position sensorless motor control apparatus of the prior art 1 is shown in FIG. 27, and a timing chart for the same is shown in FIG. 28. In FIG. 28, some of the signal names are changed for the convenience of comparison with the present invention.

In FIG. 27, the position sensorless motor control apparatus of this prior art first detects phase currents (iu, iv, and iw) flowing through stator windings for the respective phases, phase voltages (vu, vv, and vw) applied to the respective phase stator windings, and a voltage (vn) at a neutral point. Next, the following equations (1), (2), and (3) are calculated to obtain back electromotive force values eu, ev, and ew of the voltages induced in the respective phase stator windings. In the equations, R designates the resistance and L the inductance. Further, d(iu)/dt, d(iv)/dt, and d(iw)/dt are the time derivatives of iu, iv, and iw, respectively.

$$eu = vu - vn - R \cdot iu - L \cdot d(iu)/dt \quad (1)$$

$$ev = vv - vn - R \cdot iv - L \cdot d(iv)/dt \quad (2)$$

$$ew = vw - vn - R \cdot iw - L \cdot d(iw)/dt \quad (3)$$

The back electromotive force values eu, ev, and ew are input to a comparator circuit 35 (FIG. 27). The comparator circuit 35 compares the back electromotive force values eu, ev, and ew with the respective back electromotive force values multiplied by a predetermined constant k (0≦k), i.e., k·eu, k·ev, and k·ew, to determine their magnitude relationships, and outputs signals (b) C1, (c) C2, (d) C3, (e) C4, (f) C5, and (g) C6 representing the results of the comparisons (FIG. 28). These signals are input to a logic circuit 36 (FIG. 27). The logic circuit 36 outputs drive signals (h) DSU+, (i) DSU−, (j) DSV+, (k) DSV−, (l) DSW+, and (m) DSW− for driving an output unit 16 (FIGS. 27) for the stator windings (FIGS. 27 and 28). The currents flowing through the stator windings are controlled by the drive signals, and the rotor rotates in a prescribed direction.

The prior art 1 compares the magnitudes of the respective back electromotive forces and determines the energization period of each phase, but does not have an angle estimation unit for estimating the rotor angle of the motor. In the timing chart for (b) C1 in FIG. 28, a high period of C1 is shown, but no detailed information within the high period of C1 is presented that is, whether C1 is currently at the beginning, in the middle, or at the end, of the high period is not known. Furthermore, since the angular velocity of the motor is not detected, it is not known how long the high period of C1 will last. It is only possible to know which of the signals C1 to C6 is high at a particular point in time.

Accordingly, the motor cannot be driven with a sinusoidal or like waveform for smooth rotation. In embodiment 1, the voltage applied to each phase of the motor during its energization period is constant.

One object of the present invention is to drive a motor smoothly by estimating the angle of the motor and driving the motor with a sinusoidal waveform.

A block diagram of the position sensorless motor control apparatus of the prior art 2 is shown in FIG. 29, and an analytical model of the motor and its driving circuitry is shown in FIG. 30.

In FIG. 29, the prior art 2 first obtains an error signal, $\Delta\omega = (d\theta/dt) - (d\theta mb/dt)$, representing the difference between a target angular velocity $(d\theta/dt)$ and the estimated angular velocity $(d\theta mb/dt)$ output from an estimated model, and supplies the error signal $\Delta\omega$ to a velocity control block (PI control circuit). The velocity control block outputs a target current for generating the torque required to achieve the target angular velocity. Actual current i is subtracted from the target current The resulting difference $\Delta i$ is input to a current control block (PI control). The current control block outputs the voltage required to flow the target current as a voltage expressed on $\gamma - \delta$ axes. This required voltage is summed with the back electromotive force (em) output from the estimated model. The sum voltage expressed on the $\gamma - \delta$ axes is first converted into voltages on u, v, and w axes representing the voltages to be applied to the respective stator windings, and then, these voltages on the u, v, and w axes are actually applied to the respective stator windings of the motor.

As described above, the u, v, and w axes are stationary axes corresponding to the respective phases of the stator windings.

The $\gamma$ and $\delta$ axes are coordinate axes with the origin at the center of the magnetic dipole of the rotor of the brushless motor model estimated by the position sensorless motor control apparatus, the direction of the $\gamma$ axis being the same as the direction of the estimated rotor's magnetic dipole (i.e., the axis joining the S pole to the N pole) and the $\delta$ axis being advanced relative to the $\gamma$ axis by 90 degrees in the positive direction (in the counterclockwise direction), and the coordinate axes rotates with the estimated rotor.

Likewise, the d and q axes are coordinate axes with the origin at the center of the magnetic dipole of the actual rotor of the motor, the direction of the d axis being the same as the direction of the actual rotor's magnetic dipole (i.e., the axis joining the S pole to the N pole) and the q axis being advanced relative to the d axis by 90 degrees in the positive direction (in the counterclockwise direction), and the coordinate axes rotates with the actual rotor.

In the feedback loop shown in FIG. 29, the phase currents flowing in the stator windings of the respective phases are detected, and the phase current values are coordinate converted to generate a γ-axis current value iγ and a δ-axis current value iδ.

The relationships between the currents iγ, iδ and the voltages vγ, vδ can be expressed by the following equations (79) and (80) (where iγ and iδ are the γ-axis current component and the δ-axis current component, respectively). θm is the estimated rotor angle.

$$vγ=\{R+Lγ(dθm/dt)+Lγ(d/dt)\}iγ+\{-Lδ(dθm/dt)-Lδ(d/dt)\}iδ+e(-\sin Δθ) \quad (79)$$

$$vδ=\{Lγ(dθm/dt)-Lγ(d/dt)\}iγ+\{R-Lγδ(dθm/dt)+Lδ(d/dt)\}iδ+e(\cos Δθ) \quad (80)$$

Setting Lγδ≈0, Lγ≈Ld, Lδ≈Lq, and Δθ=θ−θm (where θ is the actual rotor angle, and am is the estimated rotor angle), then iγ and iδ (the actual stator winding currents expressed on the γ−δ axes) are given as $$iγ(n)=(1-R·T/Ld)·iγ(n-i) +(dθm/dt)·Lq·T/Ld·iδ(n-1) +(T/Ld)·vγ(n-1) +(T·e/Ld)·(\sin Δθ) \quad (81)$$

$$iδ(n)=\{-(dθm/dt)·(Ld·T/Lq)·iγ(n-1) +(1-R·T/Lq)·iδ(n-1) +(T/Lq)·vδ(n-1) +(T·e/Lq)·(-\cos Δθ) \quad (82)$$

where T is the calculation interval, that is, the time difference between iγ(n) and iγ(n−1).

Likewise, by applying motor constants to the γ-axis and δ-axis voltage equations expressing the brushless motor model, the γ-axis current model value iγm (estimated γ-axis current component) and the δ-axis current model value iδm (estimated δ-axis current component) are expressed as shown by equations (83) and (84).

$$iγm(n)=(1-R·T/Ld)·iγ(n-1) +\{(dθm/dt)·Lq·T/Ld·iδ(n-1) +(T/Ld)·vγ(n-1) +(T·em/Ld)·0 \quad (83)$$

$$iδm(n)=\{-(dθm/dt)·(Ld\ T/Lq)·iγ(n-1) +(1-R·T/Lq)·iδ(n-1) +(T/Lq)·vδ(n-1) +(T·em/Lq)·1 \quad (84)$$

(These equations are the same as the equations of iγ(n) and iδ(n) when Δθ=0.)

From equations (81) to (84), the γ-axis current error value, Δiγ(n)=iγ(n)−iγm(n), and the δ-axis current error value, Δiδ(n)=iδ(n)−iδm(n), representing the errors of the estimated γ-axis current model value iγm and δ-axis current model value iδm relative to the actual γ-axis current value iγ and δ-axis current value iδ, respectively, are given as $$Δiγ(n) = (T/Ld)·e(\sin Δθ) \quad (85)$$
$$≈ (T/Ld)·e(Δθ)$$

$$Δiδ(n) = (T/Lq)·(em - e·\cos Δθ) \quad (86)$$
$$≈ (T/Lq)·Δe$$

As shown in the above equations, the velocity electromotive force estimation error Δe is proportional to Δiδ(n) and the position estimation error Δθ is proportional to Δiγ(n).

After all, the prior art 2 estimates the back electromotive force (electromotive force) based on equation (86) and the rotor angle based on equation (85), as will be described later.

In the actual motor, since the back electromotive force varies as a function of temperature, the back electromotive force e and the voltages vγ and vδ vary with temperature. On the other hand, in the estimated model which does not take temperature variations into account, neither the back electromotive force em nor the voltages vγm, vδm vary with temperature.

Though, actually, the back electromotive force em vary with temperature and, consequently, vγ(n−1) and vδ(n−1) vary with temperature, the equations (83) and (84), expressing the estimated values that do not vary with temperature, are respectively subtracted from the equations (81) and (82), expressing the actually measured values that vary with temperature, to derive the equations (85) and (86); therefore, Δiγ(n) and Δiδ(n) are expressed as varying proportionally to e and Δe despite the fact that they change differently with temperature. As a result, the variation of the back electromotive force with temperature causes errors in the estimated angle.

In the prior art 2, the estimated back electromotive force em(n) and estimated angle θm (n) are obtained by multiplying the current errors Δiγ(n) and Δiδ(n) of equations (85) and (86) by the velocity electromotive force constant Kv and position estimation gain Kp.

$$em(n)=em(n-1)-KpΔiδ(n) \quad (87)$$

$$θm(n)=θm(n-1)+(T/Kv)·em(n) +Kp·sgn\{θm(n-1)\}·Δiγ(n) \quad (88)$$

$$sgn\{θm(n-1)\}=1: θm(n-1)≧0 \quad -1: θm(n-1)<0$$

In FIG. 29, the actually measured iγ and iδ are fed back to the estimated model (velocity electromotive force, position, and velocity estimation) for calculation of the error signals relative to the estimated iγm and iδm that the estimated model has, and the resultant Δiγ(n) and Δiδ(n) are substituted into the equations (87) and (88) to obtain the velocity electromotive force (back electromotive force) em(n) and the estimated angle θm(n), respectively.

From the equations (87) and (88), the estimated angular velocity (dθm/dt) is obtained by the following equation.

$$dθm/dt = (1/T)\{θm(n) - θm(n - 1)\} \quad (89)$$
$$= \{em(n)/Kv\} + (Kp/T)·sgn\{θm(n - 1)\}·Δiγ(n)$$

In the prior art 2, the estimated angular velocity (dθm/dt) is passed through an LPF (low pass filter) to eliminate the effects of noise before being output.

As described above, the prior art 2 obtains the velocity electromotive force (back electromotive force) em(n) and estimated angle θm(n) from the equations (87) and (88), and the estimated angular velocity (dθm/dt) from the equation (89).

In practice, however, the velocity electromotive force constant Kv used as a constant coefficient in the equations (87) and (88) has temperature dependence. The drawback is therefore that the angle estimation error of the estimated model increases due to such factors as changes in environmental temperature between summer and winter and the increase of temperature inside the apparatus from the start of the motor operation to the time steady state operation is reached.

Further, as described in the literature of the prior art 2, the rotor angle of the motor is estimated using voltages expressed on the γ−δ axes. This therefore requires that the voltages expressed on the γ−δ axes be converted to the stator winding phase voltages expressed on the u, v, and w axes, and conversely, the stator winding phase voltages expressed on the u, v, and w axes be converted to signals on the γ−δ axes.

The position sensorless motor control apparatus of the prior art 1 can detect the angle in the presence of phase voltage saturation. However, since it only determines the phase to be energized based on the logic of the comparison results created based on the obtained back electromotive force values eu, ev, and ew, the rotor angle information only provides information concerning the point at which the phase voltage is switched. Accordingly, in the case of the 150-degree energization method described in an embodiment of the prior art 1, if all pieces of information were combined it was only possible to achieve a resolution of 30 degrees in terms of electrical angle (information concerning to which phase the current is to be supplied).

Furthermore, in the prior art 1, angle estimation is not performed, but the angle is only detected and square wave voltages are applied to the stator windings of the motor. This caused torque ripple because square wave currents were supplied to the stator windings.

If sinusoidal currents are to be supplied to the stator windings, angle estimation must be performed.

Moreover, since the velocity information was created based on the low resolution angle, velocity controllability was poor.

The position sensorless motor control apparatus of the prior art 2 can estimate the angle with high resolution. However, the prior art 2 estimates the rotor angle of the motor by using voltages expressed on the γ–δ axes (rotating coordinate system). This requires that the voltages expressed on the γ and δ axes be converted to coordinates on the u, v, and w axes expressing the voltages applied to the respective phases and, conversely, the signals expressed on the u, v, and w axes be converted to signals expressed on the γ and δ axes.

If the motor is driven with a sinusoidal waveform, it is easy to convert the voltages expressed on the γ–δ axes to the stator winding phase voltages expressed on the u, v, and w axes and, conversely, the stator winding phase voltages expressed on the u, v, and w axes to signals expressed on the γ–δ axes. However, if the motor is to be driven with a non-sinusoidal waveform (for example, a trapezoidal or square waveform), the problem is that it is extremely difficult to convert the trapezoidal or square waveform, for example, applied to the stator windings of the motor, to a waveform on the γ and δ axes.

Furthermore, in the prior art 2, the equations (81), (82), (83), and (84) are given on the assumption that the signal waveform is sinusoidal. This has lead to the problem that if the method of the prior art 2 is applied to the case of a signal waveform other than a sinusoidal waveform, an angle estimation error occurs.

As a result, if the motor angular velocity or output torque, for example, increases and the required phase voltage becomes large, the phase voltage saturates; this causes, in particular, the voltage waveform of each. phase to lose its sinusoidal shape, rendering accurate angle estimation impossible, and therefore it has not been possible to achieve high angular velocity or large output torque.

Further, the position sensorless motor control apparatus of the prior art 2 estimates the angle based on the equations (87) and (88). Therefore, since the velocity electromotive force constant Kv varies with temperature, as earlier noted there occurs the problem that the angle estimation error increases due to environmental temperature changes or temperature rises inside the apparatus.

Phase resistance value R also varies with temperature, but since the magnitude of the term of the phase resistance in the phase voltage equations is small, it has little effect on the angle estimation.

In this specification, the term "phase voltage equation" refers to any equation relating to the stator winding phase of the motor. The phase voltage equation includes, for example, a strict equation such as equation (26), as well as a simplified equation such as equation (50). The term is used with a broader concept to include equations other than those described in this specification as long as they are equations relating to the stator winding phase of the motor.

In this specification and in the description of the appended claims, the term "equation" and the term "function" are used with the same meaning.

Further, in the prior art 2, the estimated back electromotive force em is added in the path between the point where the target angular velocity (dθ/dt) is input and the point where the voltage is applied to each phase of the motor.

However, since the back electromotive force e is a value that varies with temperature, the addition of the estimated back electromotive force em that does not consider temperature changes involves the problem that the residual error of the estimated angle increases when the temperature changes.

The present invention has been devised to solve the above-enumerated problems, and it is an object of the invention to provide a position sensorless motor control apparatus that achieves high resolution and high accuracy angle estimation, achieves high accuracy angle estimation even in the presence of phase voltage saturation, and achieves high accuracy angle estimation even when the back electromotive force constant changes.

SUMMARY OF THE INVENTION

A position sensorless motor control apparatus applies to each stator winding of a motor a voltage derived by a function that takes a target current of the stator winding of the motor, an actually measured current of the stator winding, and an estimated rotor angle of the motor as variables.

According to this invention, a position sensorless motor control apparatus can be achieved that estimates the angle with high accuracy over a wide temperature range.

A position sensorless motor control apparatus estimates the angle by using a signal derived from a parameter relating to each stator winding of the motor.

According to this invention, a position sensorless motor control apparatus can be achieved that estimates the angle with high accuracy over a wide voltage range or current range extending into a region where the phase voltage, etc. saturate.

A position sensorless motor control apparatus calculates an angle error between an estimated signal (estimated model) and a signal based on measure data, and corrects the estimated signal in such a manner as to reduce the angle error.

According to this invention, a position sensorless motor control apparatus can be achieved that estimates the angle with high accuracy over a wide voltage range or current range extending into a region where the phase voltage, etc. saturate, by using, for example, an angle estimating unit having an estimated signal of sinusoidal waveform.

In this specification and in the description of the appended claims, the term "estimated signal" and the term "estimated model" are used with the same meaning.

A position sensorless motor control apparatus calculates an angle error and an amplitude error between the estimated signal and the signal based on measured data, and corrects the estimated signal in such a manner as to reduce the angle error and amplitude error.

According to this invention, a position sensorless motor control apparatus can be achieved that is capable of estimating the correct angular velocity even when changes occur in the load or in the angular velocity.

A position sensorless motor control apparatus corrects, based on measured data, the value of at least one of coefficients in a function forming the estimated signal (estimated model).

According to this invention, a position sensorless motor control apparatus can be achieved that has high angle estimation accuracy.

A position sensorless motor control apparatus forms an angle estimation control system that contains neither a back electromotive force nor an element substantially equivalent to the back electromotive force.

According to this invention, a position sensorless motor control apparatus can be achieved that estimates the angle with high accuracy over a wide temperature range.

A position sensorless motor control apparatus selects one of the plurality of stator windings of the motor and corrects the estimated signal based on the data of the selected phase.

According to this invention, a position sensorless motor control apparatus can be achieved that estimates the angle with high resolution and high accuracy for any rotor angle.

A position sensorless motor control apparatus determines that the motor is not controlled properly when the magnitude of an error signal exceeds a certain range.

According to this invention, a position sensorless motor control apparatus can be achieved that can quickly recover from a faulty condition by taking appropriate action, such as decelerating the motor, when the angle estimation control system drifts outside a pull-in range or hold range.

A position sensorless motor control apparatus corrects the estimated signal by using a value obtained by multiplying the error signal by a gain having a defined correspondence with the angular velocity.

According to this invention, a position sensorless motor control apparatus can be achieved that estimates the angle with high accuracy over a wide velocity range.

A position sensorless motor control apparatus imposes a limit to the correction amount of the estimated signal.

According to this invention, a position sensorless motor control apparatus can be achieved that is relatively unaffected by variations due to noise.

A position sensorless motor control apparatus causes the phase current values detected by current sensors to be interchanged between at least two stator winding phases and also causes voltage command values to be interchanged between the at least two stator winding phases when a rotational direction command indicates switching from a forward direction to a reverse direction.

According to this invention, a position sensorless motor control apparatus can be achieved that accomplishes switching between the forward and reverse rotations with a small number of elements involved, and that allows most of the circuit block or program block to be used for both forward and reverse rotations.

A position sensorless motor control apparatus takes as the estimated signal a back electromotive force derived by subtracting components other than the back electromotive force from the measured or calculated voltage of the stator winding.

According to this invention, a position sensorless motor control apparatus can be achieved that estimates the angle with high accuracy over a wide temperature range.

The term "calculated voltage of the stator winding" includes the target voltage of the stator winding.

A position sensorless motor control apparatus has an estimated signal whose waveform is the same as the waveform of a stator winding current.

According to this invention, a position sensorless motor control apparatus can be achieved that estimates the angle with high accuracy over a wide temperature range.

The invention has an estimated signal whose waveform is the same as the waveform of a phase voltage.

According to this invention, a position sensorless motor control apparatus can be achieved that performs angle estimation with a shorter computation time using an inexpensive small-size microprocessor or the like.

The position sensorless motor control apparatus of the invention is characterized in that a voltage, derived by a function that takes a target current of each stator winding of a motor, an actually measured current of the stator winding, and an estimated rotor angle of the motor as variables, is applied to the stator winding of the motor.

The state equation of the control apparatus according to this invention does not contain back electromotive force (electromotive force) or magnetic flux elements. This absence of temperature dependent elements has the effect that the estimation accuracy of the rotor angle of the motor does not degrade due to temperature.

In this specification and in the description of the appended claims, the term "estimated angle" refers to the angle that has been estimated, while the term "estimated angular velocity" refers to the angular velocity that has been estimated.

In this specification and in the description of the appended claims, the terms "rotor angle", "rotor phase", and "rotor position" are used with the same meaning.

Further, in this specification and in the description of the appended claims, the term "target angular velocity" is a concept that includes the target number of revolutions that is proportional to the target angular velocity. Likewise, the term "estimated angular velocity" is a concept that includes the estimated number of revolutions that is proportional to the estimated angular velocity. The angular velocity and the number of revolutions are substantially the same elements.

The position sensorless motor control apparatus is characterized in that the target current of the stator winding is derived by a function that takes the target angular velocity of the rotor and the estimated angular velocity of the rotor as variables.

The state equation of the control apparatus according to this invention does not contain back electromotive force (electromotive force) or magnetic flux elements. This absence of temperature dependent elements has the effect that the estimation accuracy of the rotor angle of the motor does not degrade due to temperature.

The position sensorless motor control apparatus is characterized by the inclusion of an angle estimating unit for estimating rotor angle of a motor, wherein the angle estimating unit has a first signal or angle information of the first signal, the first signal having the same waveform as the waveform of the phase voltage or phase current or back electromotive force of the stator winding of the motor.

The angle estimating unit in the position sensorless motor control apparatus according this invention has the first signal which, in the case of a three-phase motor driving apparatus, for example, is a signal on the u, v, and w axes. This provides the effect that when performing calculations between the estimated signal and the phase voltage or phase current, etc. of each stator winding of the motor, there is no need for coordinate rotation and the calculations can be performed only on the u, v, and w axes.

If the angle estimating unit has an estimated model (estimated signal) of γ–δ axes or the d, q axes, as in the prior art 2, coordinate rotation must be performed when performing calculations between the estimated signal and the phase voltage or phase current, etc. of each stator winding of the motor. If the phase voltage or phase current, etc. of each stator winding of the motor is sinusoidal in waveform, the coordinate rotation is easy, but if the phase voltage, etc. is not sinusoidal in waveform, the coordinate rotation is difficult. In that case, if the same mathematical equations used for the phase voltage, etc. of sinusoidal waveform are used there arises the problem that the estimation error of the rotor angle increases if the coordinates are simply rotated.

For example, when the motor angular velocity or output torque increases and the required phase voltage becomes large, the phase voltage of each stator winding phase saturates, causing the voltage waveform of each phase to lose its sinusoidal shape. In such cases, with an apparatus having an estimated model (estimated signal) of the γ–δ axes or the d, q axes, as in the prior art 2, the angle cannot be estimated correctly, and therefore it has not been possible to achieve high angular velocity or large output torque.

By contrast, with the position sensorless motor control apparatus according to the invention, the generation of a non-sinusoidal estimated model (estimated signal) can be easily accomplished because there is no need to rotate the coordinates. This has the effect of being able to achieve high angular velocity and large output torque because the angle can be estimated correctly, even when the motor angular velocity or output torque increases and the required phase voltage becomes large, causing the phase voltage of each stator winding phase to saturate and thereby causing the voltage waveform of each phase to lose its sinusoidal shape.

The equations (2), etc. of the prior art 2 are given on the premise that the permanent magnet of the rotor is magnetized with a sinusoidal waveform, but in the position sensorless motor control apparatus of the invention, the permanent magnet of the rotor can be magnetized with any desired waveform. Accordingly, the invention offers the effect of being able to estimate the rotor angle with high accuracy even for motors whose rotor permanent magnets are magnetized with non-sinusoidal waveforms and whose back electromotive force waveform is non-sinusoidal.

The position sensorless motor control apparatus is characterized in that the stator winding current is treated as a sinusoidal signal.

In the position sensorless motor control apparatus of this invention, since the stator winding current is treated as a sinusoidal signal, it has the effect of simplifying the computation for the angle estimation. This offers the effect that the angle estimation can be accomplished with a short computation time using a small-size and inexpensive microprocessor.

Furthermore, since the stator winding has a large inductance component, the waveform of the stator winding current does not easily'saturate, and even when the waveform of the stator winding phase voltage saturates, the waveform of the phase current is maintained close to a sinusoidal shape; this offers the effect that the angle error arising due to the approximation of the waveform of the stator winding current by a sinusoidal waveform is small even when the waveform of the stator winding phase voltage saturates.

The position sensorless motor control apparatus of the invention is characterized by the inclusion of an angle estimating unit for estimating rotor angle of a motor, wherein the angle estimating unit calculates an angle error between the estimated angle and the angle derived from information containing the phase current of the stator winding of the motor, or calculates an amplitude error having a defined correspondence with the angle error, and corrects the estimated angle in such a manner as to reduce the angle error or the amplitude error having a defined correspondence with the angle error.

While the prior art corrects the waveform of the estimated model in such a manner as to reduce the error between the waveform of the estimated model itself and a signal derived based on measured information, etc., the angle estimating unit in the position sensorless motor control apparatus of this invention calculates a specific parameter of angle error and corrects the estimated angle in such a manner as to reduce the angle error.

For example, when the actual motor driving waveform is a square waveform (or a trapezoidal waveform), the prior art has required that the angle estimating unit have an estimated model of square (or trapezoidal) waveform. By contrast, in the position sensorless motor control apparatus of this invention, the angle estimating unit has an estimated model of sinusoidal waveform; in the above case, the angle estimating unit calculates the angle error between the angle of the square (or trapezoidal) waveform and the angle of the sinusoidal waveform, and corrects the estimated model of sinusoidal waveform in such a manner as to reduce the angle error. This offers the effect of facilitating the generation of the estimated model.

The position sensorless motor control apparatus according to this invention has the effect of being able to achieve high angular velocity and large output torque because the angle can be estimated correctly, even when the motor angular velocity or output torque increases and the required phase voltage becomes large, causing the phase voltage of each stator winding phase to saturate and thereby causing the voltage waveform of each phase to lose its sinusoidal shape.

Furthermore, in the position sensorless motor control apparatus of the invention, the permanent magnet of the rotor can be magnetized with any desired waveform. Accordingly, the invention offers the effect of being able to estimate the rotor angle with high accuracy even for motors whose rotor permanent magnets are magnetized with non-sinusoidal waveforms and whose back electromotive force waveform is non-sinusoidal.

The position sensorless motor control apparatus is characterized by the inclusion of an angle estimating unit for generating an estimated signal containing estimated rotor angle of a motor, wherein the angle estimating unit calculates an angle error between the estimated angle of the estimated signal and the angle derived from information containing the phase current of the stator winding of the motor, or calculates an amplitude error having a defined correspondence with the angle error, and corrects the estimated signal in such a manner as to reduce the angle error or the amplitude error having a defined correspondence with the angle error, and the angle estimating unit further calculates the amplitude error between the amplitude of the estimated signal and the amplitude derived from the information containing the phase current of the stator winding of the motor, and corrects the estimated signal in such a manner as to reduce the amplitude error.

The angle estimating unit in the position sensorless motor control apparatus of this invention calculates specific parameters of angle error and amplitude error and corrects the estimated angle in such a manner as to reduce the angle error. In the position sensorless motor control apparatus of this invention, when the actual motor driving waveform is a square waveform (or a trapezoidal waveform), the angle estimating unit has an estimated model of sinusoidal waveform, calculates the angle error between the angle of the square (or trapezoidal) waveform and the angle of the sinusoidal waveform, and corrects the estimated model of the sinusoidal waveform in such a manner as to reduce the angle error. This offers the effect of facilitating the generation of the estimated model.

If there is an amplitude error between the amplitude of the estimated model and the amplitude of the actual motor signal waveform, there arises the problem that the amplitude error affects the angle error, degrading the angle estimation accuracy. The invention has the effect of being able to calculate the correct angle error with the provision of a feedback loop for reducing the amplitude error. This offers the effect of being able to estimate the angle with high accuracy.

For example, the angle difference (angular velocity time difference) between the estimated model and the signal based on measured results can be directly measured or calculated by providing a counter which takes as a clock input a square wave signal sufficiently faster than the above time, and by starting to count up the counter at a zero crossing point of the estimated model and, at a zero crossing point of the signal based on measure results, latching the count value of the counter into a D flip flops having the same number of stages as the counter. In practice, however, this method of directly measuring or calculating the angle error is difficult to implement, and the accuracy is poor. As a result, in a commonly practiced method the level difference between the two signals is measured or calculated at a particular point in time, and this level difference is converted to the angle error, as in an embodiment of the invention described later. With this method the detection of the error is easier, and the detection accuracy is higher.

The method of converting the level difference to the angle error, however, tends to be affected by signal amplitude errors. The invention is particularly effective for application to apparatuses that detect the angle error using this method.

Further, the level of the signal based on measured results tends to change because of variations in load or in angular velocity. With the provision of the feedback loop for reducing the amplitude error, the invention has the effect of being able to estimate the correct angular velocity even in the presence of variations in load or in angular velocity. This offers the effect of being able to achieve a position sensorless motor control apparatus that estimates the rotor angle with high accuracy over a wide angular velocity range.

The position sensorless motor control apparatus is also characterized by the inclusion of an angle estimating unit for estimating rotor angle of a motor, the angle estimating unit having a function that takes at least the estimated angle as a variable, wherein the angle estimating unit corrects at least one of coefficients in the function, based on a value derived based on information containing a phase current of a stator winding of the motor.

To drive a position sensorless motor with a sinusoidal waveform requires the provision of an angle estimating unit for estimating the rotor angle of the motor. The angle estimating unit estimates the correct angle by performing control in such a manner as to reduce the angle error between the angle of the estimated model (estimated signal) that the angle estimating unit has and the angle based on the measured result.

When the estimated model has a function that takes the estimated angle as a variable, if a coefficient (for example, signal amplitude) other than the variable (angle) of the function is not correct, the correct angle cannot be estimated.

The angle estimating unit in the position sensorless motor control apparatus of the invention corrects not only the variable but also a coefficient or coefficients in the function, thereby making the function itself match the actual motor; this has the effect of being able to enhance the estimation accuracy of the angle which is the variable.

The position sensorless motor control apparatus is also characterized by the inclusion of an angle estimating unit for estimating rotor angle of a motor, wherein the transfer characteristics of a signal path leading from an output of the angle estimating unit to a feedback input of the angle estimating unit do not contain back electromotive force, rotor flux linkage, or power generation constants.

As earlier noted the back electromotive force, rotor flux linkage, and power generation constants vary with temperature.

In the position sensorless motor control apparatus of this invention, the transfer characteristics of the signal path leading from the output of the angle estimating unit to the feedback input of the angle estimating unit do not contain the above-listed temperature dependent elements. Accordingly, the invention offers the effect that the angle estimation accuracy of the angle estimating unit does not degrade due to variations in temperature.

In this specification and in the description of the appended claims, the term "back electromotive force" the same in meaning as the term "power generation voltage". The term "power generation constant" is the same in meaning as the terms "back electromotive force constant" and "electromotive force constant".

The position sensorless motor control apparatus is also characterized by the inclusion of an angle estimating unit for estimating rotor angle of a motor, wherein the angle estimating unit selects a stator winding phase of the motor, and corrects the estimated angle, based on the phase voltage, phase current, or back electromotive force of the selected phase.

The angle estimating unit estimates the correct angle by correcting its internal estimated model, based on a signal or value obtained based on measured results. However, if the correction is made always based on a single signal (for example, the phase voltage of a particular phase (u axis)), there occur angles where the angle error detection accuracy is high and angles where the detection accuracy is low. This leads to the problem that the angle estimation accuracy increases or decreases depending on the angle.

By selecting from among the plurality of stator winding phases the phase for which the largest angle error can be detected and by correcting the estimated angle based on the phase voltage, etc. of the selected phase, the position sensorless motor control apparatus of this invention has the effect of being able to estimate the angle with high accuracy at all times for any rotor angle.

The position sensorless motor control apparatus is also characterized by the inclusion of an angle estimating unit that has an estimated signal containing information on rotor angle of a motor, wherein when an error between the value derived from information containing a stator winding current of the motor and the value derived from the estimated signal exceeds a predetermined range, it is determined that the motor is not properly controlled.

The position sensorless motor control apparatus estimates the rotor angle of the motor based on measured data, etc., but when the angle estimation error exceeds a certain range for any reason (and as a result, the estimated angular velocity shows a value entirely different from the actual angular velocity), if the estimated angle is thereafter corrected based on measured data, etc., the correction cannot be made correctly, and the correct angle cannot be estimated as long as this condition continues (the angle estimation control does not settle).

The position sensorless motor control apparatus of this invention has the effect of being able to detect the condition when the angle estimation error exceeds a certain range. Accordingly, if a situation arises where the angle estimation control cannot be made to settle forever by an ordinary feedback loop, alternative means, such as stopping the motor, can be taken to quickly exit from the uncontrollable state.

The position sensorless motor control apparatus is also characterized in that when the error exceeds the predetermined range, the motor is decelerated or stopped.

The position sensorless motor control apparatus of this invention has the effect that when the angle estimation error is detected having exceeded the predetermined range, the motor is decelerated or stopped. In particular, when the motor is stopped the angle estimation control can be brought back to the normal condition without fail. It also has the effect that by decelerating the motor, the angle estimation control can be brought back to the normal condition with high probability.

For example, in a position sensorless motor control apparatus having an angle estimating unit for high speed rotation and an angle estimating unit for slow speed rotation, if the angle estimating unit for high speed rotation is thrown into an uncontrollable state during high speed rotation, the motor is decelerated and the angle estimation is performed using the angle estimating unit for slow speed rotation; then, when the correct estimated angle is obtained the motor is accelerated again and the angle estimation is resumed using the angle estimating unit for high speed rotation.

The position sensorless motor control apparatus is also characterized by the inclusion of an angle estimating unit that has an estimated signal containing information on rotor angle and angular velocity of a motor, wherein the angle estimating unit generates an error signal representative of an error between the value derived from information containing a stator winding current of the motor and the value derived from the estimated signal, and corrects the estimated signal by using a value obtained by multiplying the error signal by a gain having a defined correspondence with the angular velocity.

If the estimated signal is corrected using a correction value obtained by multiplying the error signal by a fixed gain, the problem is that the correction value is too large when the angular velocity of the motor is low, and too small when the angular velocity of the motor is high.

Since the estimated model is corrected using the correction value obtained by multiplying the error signal by a gain having a defined correspondence with the angular velocity, the angle estimating unit in the position sensorless motor control apparatus of this invention has the effect of being able to obtain a proper correction value from a low angular velocity range to a high angular velocity range, achieving high accuracy angle estimation over a wide velocity range.

The position sensorless motor control apparatus is also characterized in that the absolute value of the gain may become larger as the angular velocity increases, but does not become smaller.

The angle estimating unit in the position sensorless motor control apparatus of this invention corrects the estimated model by using a correction value obtained by multiplying the error signal by a small gain when the angular velocity is low, and using a correction value obtained by multiplying the error signal by a large gain when the angular velocity is high. This has the effect of being able to obtain a proper correction value from a low angular velocity range to a high angular velocity range, achieving high accuracy angle estimation over a wide velocity range.

The position sensorless motor control apparatus is also characterized by the inclusion of an angle estimating unit that has an estimated signal containing information on rotor angle and angular velocity of a motor, wherein the angle estimating unit generates an error signal representative of an error between the value derived from information containing a stator winding current of the motor and the value derived from the estimated signal, corrects the estimated signal by using a correction value derived from the error signal, and performs control so that the correction value does not exceed at least one of an upper bound value and a lower bound value having a defined correspondence with the angular velocity.

The position sensorless motor control apparatus of this invention has the effect of preventing the estimated signal from being corrected using an excessively large correction value. This prevents the problem of the estimated signal varying greatly and drifting outside the pull-in range or hold range of the angle estimating unit, for example, when an erroneous error signal is produced due to transitory noise.

The position sensorless motor control apparatus is also characterized in that the absolute value of the upper bound value or lower bound value may become larger as the angular velocity increases, but does not become smaller.

The position sensorless motor control apparatus of this invention prevents the estimated signal from being corrected using an excessively large correction value; here, the determination level used to determine whether the correction value is excessively large or not varies depending on the angular velocity of the motor. Accordingly, by varying the upper bound value or lower bound value of the correction value in accordance with the angular velocity, an appropriate upper bound value or lower bound value can be set from a low angular velocity range to a high angular velocity range, achieving the effect of being able to perform angle estimation unaffected by noise over a wide velocity range.

The position sensorless motor control apparatus is also characterized in that the angle estimating unit further has a table of compensation values with at least one of the estimated angle, the estimated angular velocity of the motor, and the measured or calculated current of the stator winding taken as a parameter, and in that the angle estimating unit compensates the estimated angle by using the compensation value associated with the parameter.

By including the table of compensation values associated with the parameter, the angle estimating unit of this invention has the effect of being able to estimate the angle with a higher accuracy than an apparatus that estimates the angle by calculation only.

The position sensorless motor control apparatus is also characterized by the inclusion of: a current sensor for detecting a phase current value representing the value of a current to the stator winding of the motor; a voltage command value generating unit for generating, based on estimated rotor angle of the motor, a phase voltage command value indicating a command value for the voltage to be applied to the stator winding; a driving unit for applying the voltage to the stator winding based on the phase voltage command value; an angle estimating unit for generating the estimated angle; and a rotational direction command unit for outputting a rotational direction command indicating the direction in which the rotor is to be rotated, wherein when the rotational direction commands indicates a reverse direction, the phase current values for at least two phases are interchanged with each other and the phase voltage command values for the at least two phases are interchanged with each other.

This invention has the effect of being able to realize a position sensorless motor control apparatus that accomplishes switching between the forward and reverse rotations with a very small number of elements involved, and that allows most of the circuit block or program block to be used for both forward and reverse rotations.

The position sensorless motor control apparatus is also characterized by the inclusion of an angle estimating unit for estimating rotor angle of a motor, wherein the angle estimating unit has a second signal or a third signal derivable from the second signal, or angle information of the second signal or third signal, the second signal having the same waveform as the waveform of a back electromotive force derived by subtracting components other than the back electromotive force from the measured or calculated phase voltage of the stator winding.

This invention derives the back electromotive force by subtracting the components other than the back electromotive force from the measured or calculated voltage of the stator winding.

If the estimated signal is generated using the back electromotive force, as in the prior art, the angle estimation accuracy degrades since the back electromotive force changes with temperature. For example, with the method of obtaining the back electromotive force from the equations (87) and (88), as in the prior art 2, the derived estimated angle Em has temperature dependence.

By contrast, the position sensorless motor control apparatus of the invention derives the back electromotive force by subtracting the components other than the back electromotive force from the measured or calculated voltage of the stator winding, and thus can obtain the correct back electromotive force. Though the magnitude of this back electromotive force has temperature dependence, this will have no ill effect on the angle estimation since the magnitude relationships between the back electromotive force on the u axis, the back electromotive force on the v axis, and the back electromotive force on the w axis are not temperature dependent. The invention therefore has the effect of being able to realize an angle estimating unit having a high estimation accuracy over a wide temperature range.

Basically, the angle estimating unit of this invention takes as the estimated. signal the second signal having the same waveform as the waveform of the back electromotive force of one of the u, v, and w phases (in the case of a three-phase motor). However, this is not restrictive; for example, the angle estimating unit may be configured to have a third signal derivable from the second signal, for example, a back electromotive force expressed on the γ–δ (or d, q) axes. The two signals are compatible with each other and have the same effect in addressing the above problem.

Further, the angle estimating unit may be configured to have the waveform of the second signal, which is, for example, a sinusoidal wave, in its original form, or have only the angle information in the form of numeric information.

This includes, for example, the case in which the phase voltage applied to the stator winding of the motor is of a square or trapezoidal waveform and the estimated model is a sinusoidal wave having the same angle as that of the waveform of the phase voltage applied to the stator winding. This sinusoidal wave contains the angle information of the phase voltage of square or trapezoidal waveform.

Preferably, the angle estimating unit has the back electromotive force of one of the u, v, and w phases (in the case of a three-phase motor) as the estimated signal, as described above, because it then facilitates the generation of the estimated model of a non-sinusoidal waveform.

The position sensorless motor control apparatus is also characterized in that the second signal or third signal or the angle information is derived by a function that takes the measured or calculated phase voltage of the stator winding of the motor, the measured current of the stator winding, and the estimated rotor angle of the motor as variables.

This invention derives the back electromotive force based on the measured or phase voltage of the stator winding, the measured phase current of the stator winding, etc. that do not have temperature dependence, or on the measured phase voltage of the stator winding, etc. The angle estimated using the back electromotive force derived based on these elements is unaffected by temperature variations, as previously described the invention has the effect of providing an angle estimating unit capable of estimating the angle with high accuracy over a wide temperature range.

The position sensorless motor control apparatus is also characterized in that the angle estimating unit calculates an angle error between a signal derived from the second signal or the third signal, or a signal derived from the angle information, and the back electromotive force derived by subtracting the components other than the back electromotive force from the measured or calculated phase voltage of the stator winding, or calculates an amplitude error having a defined correspondence with the angle error, and corrects the estimated angle of the second signal or third signal or of the angle information in such a manner as to reduce the angle error or the amplitude error having a defined correspondence with the angle error.

In the position sensorless motor control apparatus of this invention, even when the back electromotive force waveform of the actual motor is a square waveform (or a trapezoidal waveform), the angle estimating unit has an estimated model of sinusoidal waveform, calculates the angle error between the angle of the square (or trapezoidal) waveform and the angle of the sinusoidal waveform, and corrects the estimated model of the sinusoidal waveform in such a manner as to reduce the angle error. This offers the effect of facilitating the generation of the estimated model by eliminating the need to generate an estimated model of the square (or trapezoidal) waveform.

Accordingly, the position sensorless motor control apparatus of this invention has the effect of being able to achieve high angular velocity and large output torque because the angle can be estimated correctly, even when the motor angular velocity or output torque increases and the required phase voltage becomes large, causing the phase voltage of each stator winding phase to saturate and thereby causing the voltage waveform of each phase to lose its sinusoidal shape.

Furthermore, in the position sensorless motor control apparatus of the invention, the permanent magnet of the rotor can be magnetized with any desired waveform. Accordingly, the invention offers the effect of being able to estimate the rotor angle with high accuracy even for motors whose rotor permanent magnets are magnetized with non-sinusoidal waveforms and whose back electromotive force waveform is non-sinusoidal.

The position sensorless motor control apparatus is also characterized in that the angle estimating unit further calculates an amplitude error between the amplitude of the second signal or third signal and the amplitude of the back electromotive force derived by subtracting the components other than the back electromotive force from the measured or calculated phase voltage of the stator winding, and corrects the amplitude of the second signal or third signal in such a manner as to reduce the amplitude error.

The position sensorless motor control apparatus of this invention has the effect of being able to calculate the correct angle error with the provision of the feedback loop for reducing the amplitude error between the amplitude of the estimated model and the amplitude of the actual motor signal waveform when the amplitude error adversely affects the angle estimation. This offers the effect of being able to estimate the angle with high accuracy.

This invention is particularly effective for application to an apparatus that detects angle error by measuring or calculating the level difference between the two signals at a particular point in time and by converting the level difference to the angle error.

There is also offered the effect of being able to estimate the correct angular velocity even when the signal amplitude changes because of changes in load or in angular velocity. The resulting effect is the realization of a position sensorless motor control apparatus that estimates the rotor angle with high accuracy over a wide angular velocity range.

The position sensorless motor control apparatus is also characterized by the inclusion of an angle estimating unit that has a back electromotive force estimated signal containing information on rotor angle of a motor, wherein the angle estimating unit selects the largest error from among errors each representing an error between the back electromotive force of each phase, derived based on information containing the current of each stator winding phase of the motor, and the estimated signal of the back electromotive force, and corrects the estimated signal in such a manner as to reduce the largest error.

The angle estimating unit estimates the correct angle by correcting its internal estimated model, based on a signal or value obtained based on measured results. However, if the correction is made always based on the back electromotive force of a particular phase (u axis), there occur angles where the angle error detection accuracy is high and angles where the detection accuracy is low. This leads to the problem that the angle estimation accuracy increases or decreases depending on the angle.

By selecting from among the plurality of stator winding phases the phase for which the largest angle error can be detected and by correcting the estimated angle based on the back electromotive force of the selected phase, the position sensorless motor control apparatus of this invention has the effect of being able to estimate the angle with high accuracy at all times for any rotor angle.

The calculation of the "error between the back electromotive force of each phase and the estimated signal of the back electromotive force" means calculating the error by considering the angular displacement of each phase (in the case of a three-phase motor, the phases are displaced relative to each other by 120 degrees).

Suppose, for example, that the estimated signals of the back electromotive forces for the respective phases have a prescribed angle on the u, v, and w axes.

In one embodiment, the back electromotive force of each phase is coordinate converted so that its angle matches the angle of the estimated signal, and the error between the estimated signal and the back electromotive force after the coordinate conversion is calculated.

In another embodiment, the estimated signal is coordinate converted so that its angle matches the angle of each phase, and the error between the back electromotive force of each phase and the estimated signal after the coordinate conversion is calculated.

The position sensorless motor control apparatus is also characterized by the inclusion of an angle estimating unit that has a back electromotive force estimated signal containing information on rotor angle of a motor, wherein the angle estimating unit selects a stator winding phase whose back electromotive force is the smallest of the back electromotive forces of the stator winding phases of the motor derived based on information respectively containing the currents of the respective stator winding phases, and corrects the estimated signal in such a manner as to reduced an error between the back electromotive force of the selected phase and the estimated signal of the back electromotive force.

By selecting from among the plurality of stator winding phases the phase for which the largest angle error can be detected and by correcting the estimated angle based on the back electromotive force of the selected phase, the position sensorless motor control apparatus of this invention has the effect of being able to estimate the angle with high accuracy at all times for any rotor angle.

Further, a simple method is used that compares the back electromotive forces of the respective phases and selects the phase whose back electromotive force is the smallest, eliminating the need to calculate errors for all phases; this offers the effect of reducing the computation time, since the phase whose error is the largest in the normal state is selected and the error is calculated only for the selected phase.

The position sensorless motor control apparatus is also characterized in that when the amplitude of the second signal or third signal exceeds a predetermined range, the motor is decelerated or stopped.

The position sensorless motor control apparatus of this invention has the effect of being able to detect the condition when the amplitude of the estimated signal, i.e., the second signal or the third signal, exceeds a certain range. Accordingly, if a situation arises where the angle estimation control cannot be made to settle forever by an ordinary feedback loop, alternative means, such as stopping the motor, can be taken to exit from the uncontrollable state.

The position sensorless motor control apparatus is also characterized in that the angle estimating unit corrects the estimated angle of the second signal or third signal or of the angle information by using a correction value obtained by multiplying the angle error, or the amplitude error having a defined correspondence with the angle error, by a gain having a defined correspondence with the estimated rotor angular velocity of the motor.

Since the estimated model is corrected using a value obtained by multiplying the error signal by a gain having a defined correspondence with the angular velocity, the angle estimating unit in the position sensorless motor control apparatus of this invention has the effect of being able to obtain a proper correction value from a low angular velocity range to a high angular velocity range, achieving high accuracy angle estimation over a wide velocity range.

The position sensorless motor control apparatus is also characterized in that the absolute value of the gain may become larger as the angular velocity increases, but does not become smaller.

The angle estimating unit in the position sensorless motor control apparatus of this invention corrects the estimated model by using a correction value obtained by multiplying the error signal by a small gain when the angular velocity is low, and using a correction value obtained by multiplying the error signal by a large gain when the angular velocity is high. This has the effect of being able to obtain a proper correction value from a low angular velocity range to a high angular velocity range, achieving high accuracy angle estimation over a wide velocity range.

The position sensorless motor control apparatus is also characterized in that the angle estimating unit performs control so that the correction value does not exceed at least one of the upper bound value and lower bound value having a defined correspondence with the angular velocity.

The position sensorless motor control apparatus of this invention has the effect of preventing the estimated signal from being corrected using an excessively large correction value. This prevents the problem of the estimated signal varying greatly and drifting outside the pull-in range or hold range of the angle estimating unit, for example, when an erroneous error signal is produced due to transitory noise.

The position sensorless motor control apparatus is also characterized in that the absolute value of the upper bound value or lower bound value may become larger as the angular velocity increases, but does not become smaller.

The position sensorless motor control apparatus of this invention prevents the estimated signal from being corrected using an excessively large correction value; here, the determination level used to determine whether the correction value is excessively large or not varies depending on the angular velocity of the motor. Accordingly, by varying the upper bound value or lower bound value of the correction value in accordance with the angular velocity, an appropriate upper bound value or lower bound value can be set from a low angular velocity range to a high angular velocity range, achieving the effect of being able to perform angle estimation unaffected by noise over a wide velocity range.

The position sensorless motor control apparatus is also characterized in that the angle estimating unit further has a table of compensation values with at least one of the estimated angle, the estimated angular velocity of the motor, and the measured or calculated current of the stator winding taken as a parameter, and corrects and compensates the estimated angle of the second signal or third signal or of the angle information by using the compensation value associated with the parameter in the table as well as the compensation value derived from the angle error or the amplitude error having a defined correspondence with the angle error.

By including the table of compensation values associated with the parameter, the angle estimating unit of this invention has the effect of being able to estimate the angle with a higher accuracy than an apparatus that estimates the angle by calculation only.

The position sensorless motor control apparatus is also characterized in that the components other than the back electromotive force are derived using the measured or calculated current of the stator winding of the motor, the measured or calculated current being assumed to be a sinusoidal signal.

In the position sensorless motor control apparatus of this invention, since the stator winding current is treated as a sinusoidal signal, it has the effect of simplifying the computation for the angle estimation. This offers the effect that the angle estimation can be accomplished with a short computation time using a small-size and inexpensive microprocessor.

Furthermore, since the stator winding has a large inductance component, the waveform of the stator winding current does not easily saturate, and even when the waveform of the stator winding phase voltage saturates, the waveform of the phase current is maintained close to a sinusoidal shape; this offers the effect that the angle error arising due to the approximation of the waveform of the stator winding current by a sinusoidal waveform is small even when the waveform of the stator winding phase voltage saturates.

The position sensorless motor control apparatus is also characterized by the inclusion of an angle estimating unit for estimating rotor angle of a motor, wherein the angle estimating unit has a fourth signal or a fifth signal derivable from the fourth signal, or angle information of the fourth signal or fifth signal, the fourth signal having the same waveform as the waveform of a stator winding current.

The position sensorless motor control apparatus of this invention estimates the angle by reference to the current signal of the stator winding. As shown in equation (72), the angle error of the estimated angle derived from the back electromotive force is equivalent to the angle error of the estimated angle derived from the stator winding current. Accordingly, the estimated angle derived from the current is stable to temperature. Generally, the current value of the stator winding is stable to temperature.

The invention therefore has the effect of being able to realize an angle estimating unit having a high estimation accuracy over a wide temperature range.

Basically, the angle estimating unit of this invention takes as the estimated signal the fourth signal having the same waveform as the waveform of the phase current of one of the u, v, and w phases (in the case of a three-phase motor). However, this is not restrictive; for example, the angle estimating unit may be configured to have a fifth signal derivable from the fourth signal, for example, a stator winding current signal expressed on the $\gamma$–$\delta$ (or d, q) axes. The two signals are compatible with each other and have the same effect in addressing the above problem.

Further, the angle estimating unit may be configured to have the waveform of the fourth signal or fifth signal, which is, for example, a sinusoidal wave, in its original form, or have only the angle information in the form of numeric information.

This includes, for example, the case in which the phase current applied to the stator winding of the motor is of a square waveform and the estimated model is a sinusoidal wave having the same angle as that of the waveform of the phase current applied to the stator winding. This sinusoidal wave contains the angle information of the phase current of square waveform.

Preferably, the angle estimating unit has the phase current of one of the u, v, and w phases (in the case of a three-phase motor) as the estimated signal, as described above, because it then facilitates the generation of the estimated model of a non-sinusoidal waveform (since coordinate rotation is not needed).

The position sensorless motor control apparatus is also characterized in that the angle estimating unit calculates an angle error between the fourth signal or fifth signal or the angle information and the signal derived from the stator winding current, or calculates an amplitude error having a defined correspondence with the angle error, and corrects the estimated angle of the fourth signal or fifth signal or of the angle information in such a manner as to reduce the angle error or the amplitude error having a defined correspondence with the angle error.

In the position sensorless motor control apparatus of this invention, even when the current waveform of the actual motor is a square waveform, the angle estimating unit has an estimated model of sinusoidal waveform, calculates the angle error between the angle of the square waveform and the angle of the sinusoidal waveform, and corrects the estimated model of the sinusoidal waveform in such a manner as to reduce the angle error. This offers the effect of facilitating the generation of the estimated model by eliminating the need to generate an estimated model of the square waveform.

Accordingly, the position sensorless motor control apparatus of this invention has the effect of being able to achieve high angular velocity and large output torque because the angle can be estimated correctly, even when the motor angular velocity or output torque increases and the required phase voltage becomes large, causing the phase voltage of each stator winding phase to saturate and thereby causing the voltage waveform of each phase to lose its sinusoidal shape.

Furthermore, in the position sensorless motor control apparatus of the invention, the permanent magnet of the rotor can be magnetized with any desired waveform. Accordingly, the invention offers the effect of being able to estimate the rotor angle with high accuracy even for motors whose rotor permanent magnets are magnetized with non-sinusoidal waveforms and whose back electromotive force waveform is non-sinusoidal.

The position sensorless motor control apparatus is also characterized in that the angle estimating unit further calculates an amplitude error between the amplitude of the fourth signal or fifth signal that the angle estimating unit has and the amplitude of the signal derived from the stator winding current, and corrects the amplitude of the fourth signal or fifth signal in such a manner as to reduce the amplitude error.

The position sensorless motor control apparatus of this invention has the effect of being able to calculate the correct angle error with the provision of the feedback loop for reducing the amplitude error between the amplitude of the estimated model and the amplitude of the actual motor signal waveform when the amplitude error adversely affects the angle estimation. This offers the effect of being able to estimate the angle with high accuracy.

This invention is particularly effective for application to an apparatus that detects angle error by measuring or calculating the level difference between the two signals at a particular point in time and by converting the level difference to the angle error.

There is also offered the effect of being able to estimate the correct angular velocity even when the signal amplitude changes because of changes in load or in angular velocity. The resulting effect is the realization of a position sensorless motor control apparatus that estimates the rotor angle with high accuracy over a wide angular velocity range.

The position sensorless motor control apparatus is also characterized by the inclusion of an angle estimating unit that has a stator winding current estimated signal containing information on rotor angle of a motor, wherein the angle estimating unit selects the largest error from among errors each representing an error between a measured current of each stator winding of the motor and the estimated signal of the current, and corrects the estimated signal in such a manner as to reduce the largest error.

The angle estimating unit estimates the correct angle by correcting its internal estimated model, based on a signal or value obtained based on measured results. However, if the correction is made always based on the phase current of a particular phase (u axis), there occur angles where the angle error detection accuracy is high and angles where the detection accuracy is low. This leads to the problem that the angle estimation accuracy increases or decreases depending on the angle.

By selecting from among the plurality of stator winding phases the phase for which the largest angle error can be detected and by correcting the estimated angle based on the phase current of the selected phase, the position sensorless motor control apparatus of this invention has the effect of being able to estimate the angle with high accuracy at all times for any rotor angle.

The position sensorless motor control apparatus is also characterized by the inclusion of an angle estimating unit that has a stator winding current estimated signal containing information on rotor angle of a motor, wherein the angle estimating unit selects a stator winding phase whose measured current is the smallest of the measured currents of the stator winding phases of the motor, and corrects the estimated signal in such a manner as to reduced the error between the current of the selected phase and the estimated signal of the current.

By selecting from among the plurality of stator winding phases the phase for which the largest angle error can be detected and by correcting the estimated angle based on the phase current of the selected phase, the position sensorless motor control apparatus of this invention has the effect of being able to estimate the angle with high accuracy at all times for any rotor angle.

Further, a simple method is used that compares the back electromotive forces of the respective phases and selects the phase whose back electromotive force is the smallest, eliminating the need to calculate errors for all phases; this offers the effect of reducing the computation time, since the phase whose error is the largest in the normal state is selected and the error is calculated only for the selected phase.

The position sensorless motor control apparatus is also characterized in that when the angle error or the amplitude error having a defined correspondence with the angle error exceeds a predetermined range, the motor is decelerated or stopped.

The position sensorless motor control apparatus of this invention has the effect of being able to detect the condition when the angle estimation error exceeds a certain range. Accordingly, if a situation arises where the angle estimation control cannot be made to settle forever by an ordinary feedback loop, alternative means, such as stopping the motor, can be taken to exit from the uncontrollable state.

The position sensorless motor control apparatus is also characterized in that the angle estimating unit corrects the estimated angle of the fourth signal or fifth signal or of the angle information by using a correction value obtained by multiplying the angle error, or the amplitude error having a defined correspondence with the angle error, by a gain having a defined correspondence with the estimated rotor angular velocity of the motor.

Since the estimated model is corrected using a value obtained by multiplying the error signal by a gain having a defined correspondence with the angular velocity, the angle estimating unit in the position sensorless motor control apparatus of this invention has the effect of being able to obtain a proper correction value from a low angular velocity range to a high angular velocity range, achieving high accuracy angle estimation over a wide velocity range.

The position sensorless motor control apparatus is also characterized in that the absolute value of the gain may become larger as the angular velocity increases, but does not become smaller.

The angle estimating unit in the position sensorless motor control apparatus of this invention corrects the estimated model by using a correction value obtained by multiplying the error signal by a small gain when the angular velocity is low, and using a correction value obtained by multiplying the error signal by a large gain when the angular velocity is high. This has the effect of being able to obtain a proper correction value from a low angular velocity range to a high angular velocity range, achieving high accuracy angle estimation over a wide velocity range.

The position sensorless motor control apparatus is also characterized in that the angle estimating unit performs control so that the correction value does not exceed at least one of the upper bound value and lower bound value having a defined correspondence with the angular velocity.

The position sensorless motor control apparatus of this invention has the effect of preventing the estimated signal from being corrected using an excessively large correction value. This prevents the problem of the estimated signal varying greatly and drifting outside the pull-in range or hold range of the angle estimating unit, for example, when an erroneous error signal is produced due to transitory noise.

The position sensorless motor control apparatus is also characterized in that the absolute value of the upper bound value or lower bound value may become larger as the angular velocity increases, but does not become smaller.

The position sensorless motor control apparatus of this invention prevents the estimated signal from being corrected using an excessively large correction value; here, the determination level used to determine whether the correction value is excessively large or not varies depending on the angular velocity of the motor. Accordingly, by varying the upper bound value or lower bound value of the correction value in accordance with the angular velocity, an appropriate upper bound value or lower bound value can be set from a low angular velocity range to a high angular velocity range, achieving the effect of being able to perform angle estimation unaffected by noise over a wide velocity range.

The position sensorless motor control apparatus is also characterized in that the angle estimating unit has a table of compensation values with at least one of the estimated angle, the estimated angular velocity of the rotor, and the measured or calculated current of the stator winding taken as a parameter, and compensates the estimated angle of the fourth signal or fifth signal or of the angle information by using the compensation value associated with the parameter in the table.

By including the table of compensation values associated with the parameter, the angle estimating unit of this invention has the effect of being able to estimate the angle with a higher accuracy than an apparatus that estimates the angle by calculation only.

The position sensorless motor control apparatus is also characterized in that the measured or calculated current of the stator winding of the motor is treated as a sinusoidal signal.

In the position sensorless motor control apparatus of this invention, since the stator winding current is treated as a sinusoidal signal, it has the effect of simplifying the computation for the angle estimation. This offers the effect that the angle estimation can be accomplished with a short computation time using a small-size and inexpensive microprocessor.

Furthermore, since the stator winding has a large inductance component, the waveform of the stator winding current does not easily saturate, and even when the waveform of the stator winding phase voltage saturates, the waveform of the phase current is maintained close to a sinusoidal shape; this offers the effect that the angle error arising due to the approximation of the waveform of the stator winding current by a sinusoidal waveform is small even when the waveform of the stator winding phase voltage saturates.

The position sensorless motor control apparatus is also characterized by the inclusion of an angle estimating unit for estimating rotor angle of a motor, wherein the angle estimating unit has a sixth signal or a seventh signal derivable from the sixth signal, or angle information of the sixth signal or seventh signal, the sixth signal having the same waveform as the waveform of the measured or calculated phase voltage of the stator winding.

By taking as the estimated model a signal having the same waveform as the waveform of the measured or calculated phase voltage of the stator winding, the position sensorless motor control apparatus of this invention has the effect of being able to perform angle estimation using an inexpensive small-size microprocessor or the like and reducing the computation time.

The novel features of the invention will be hereinafter fully described and particularly pointed out in the appended claims, and the construction and details of the invention, together with other objects and features thereof, will become better understood and appreciated by reference to the following detailed description when considered in conjunction with the accompanying drawings.

BRIEF DESCRIPTION OF THE INVENTION

It will be appreciated, that all or part of the drawings are purely diagrammatic for illustrative purposes and do not necessarily present faithful depictions of the actual relative sizes and positions of the illustrated elements.

DETAILED DESCRIPTION OF THE INVENTION

Specific embodiments for implementing a position sensorless motor control apparatus according to the present invention will be described below with reference to the accompanying drawings.

Embodiment 1

A position sensorless motor control apparatus according to a first embodiment will be described below.

The position sensorless motor control apparatus of the first embodiment obtains a back electromotive force value from the phase voltage equation of each stator winding phase, obtains a deviation between the back electromotive force value and a back electromotive force reference value, and corrects estimated angle θm so that the deviation converges to 0. It then achieves high resolution and high accuracy angle estimation, achieves angle estimation even in the presence of phase voltage saturation, and achieves high accuracy angle estimation even when motor constants such as a back electromotive force constant, etc. change.

In this specification and in the description of the appended claims, the term "error" and the term "deviation" are used with the same meaning.

First, the configuration of the position sensorless motor control apparatus according to the first embodiment will be described.

Figure 1:
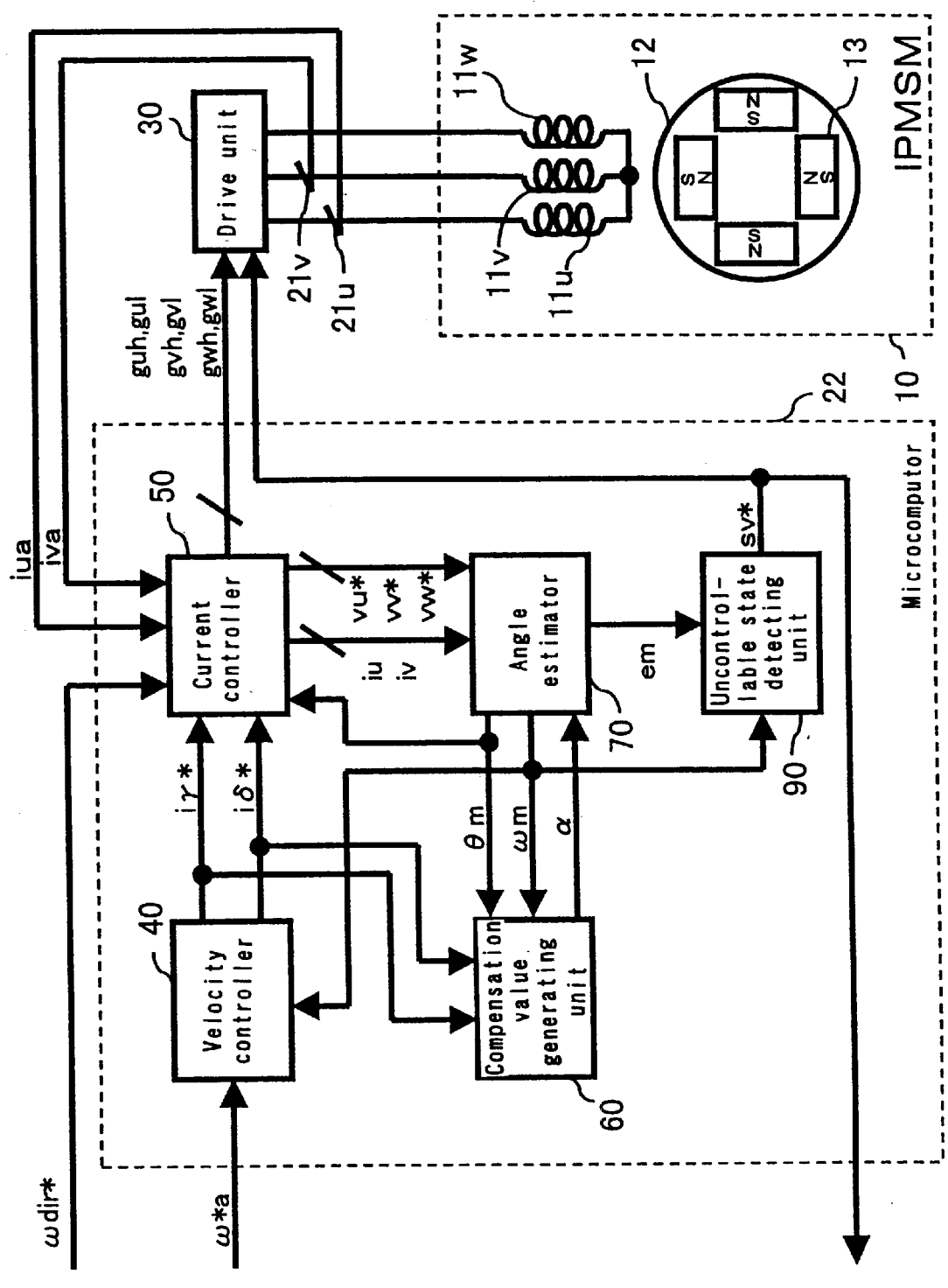
FIG. 1 is a block diagram showing the configuration of a position sensorless motor control apparatus according to a first embodiment.

<Description of FIG. 1>

FIG. 1 is a block diagram showing the configuration of the position sensorless motor control apparatus according to the first embodiment. An interior permanent magnet synchronous motor (IPMSM) 10 comprises a stator (not shown), around which are wound stator windings 11u, 11v, and 11w through which phase currents flow, and a rotor 12 placed in close proximity and in opposing relationship to the stator (not shown). The stator windings 11u, 11v, and 1w are connected in a Y-configuration (one end of each of the stator windings 11u, 11v, and 11w is connected at one point to the corresponding ends of the other windings). This brushless motor 10 includes a permanent magnet 13 embedded in the rotor 12, and the rotor 12 is rotated by the interaction between the magnetic flux generated by the phase current and the magnetic flux produced by the permanent magnet 13.

The position sensorless motor control apparatus of the first embodiment comprises: a current sensor 21u which outputs an analog u-phase current value iua; a current sensor 21v which outputs an analog v-phase current value iva; a microcomputer (microprocessor) 22 which takes the analog u-phase current value iua, analog v-phase current value iva, analog velocity command value ω*a, and rotational direction command ωdir* as inputs, and outputs switching command signals guh, gul, gvh, gvl, gwh, gwl and a servo-on signal sv*; and a drive unit 30 which takes the switching command signals guh, gul, gvh, gvl, gwh, gwl and the servo-on signal sv* as inputs, and controls the voltages to be applied to the stator windings 11u, 11v, and 11w.

Figure 2:
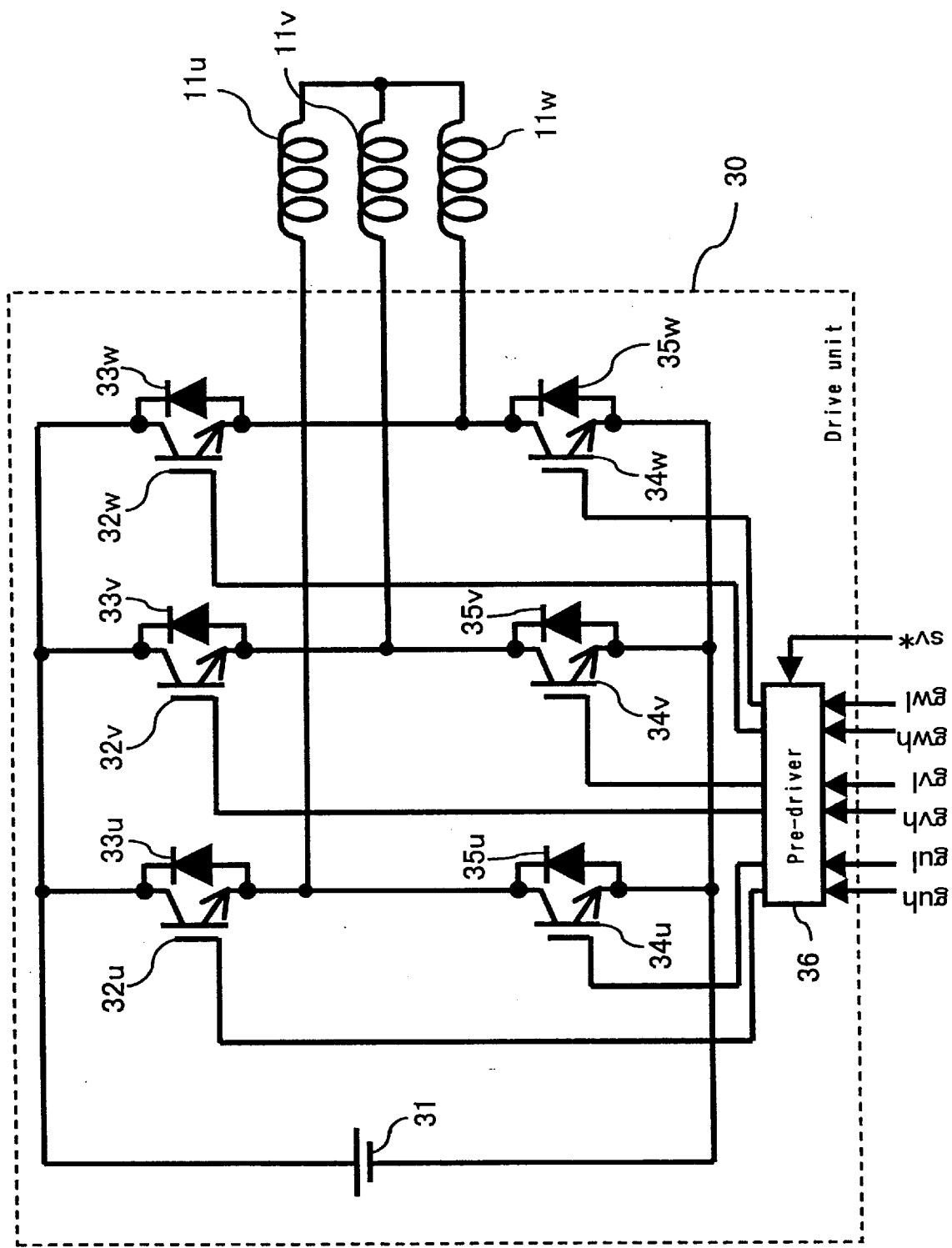
FIG. 2 is a circuit diagram of a drive unit according to the first embodiment.

<Description of FIG. 2>

FIG. 2 is a circuit diagram showing the configuration of the drive unit 30 according to the first embodiment. The drive unit 30 comprises: a power supply 31; upper side IGBTs (Insulated Gate Bipolar Transistors) 32u, 32v, and 32w whose collectors are connected to the positive terminal of the power supply 31, and whose emitters are connected to the phase windings 11u, 11v, and 11w, respectively; upper side flywheel diodes 33u, 33v, and 33w reversely connected in parallel to the upper side IGBTs 32u, 32v, and 32w, respectively; lower side IGBTs 34u, 34v, and 34w whose collectors are connected to the stator windings 11u, 11v, and 11w, respectively, and whose emitters are connected to the negative terminal of the power supply 31; lower side flywheel diodes 35u, 35v, and 35w reversely connected in parallel to the lower side IGBTs 34u, 34v, and 34w, respectively; and a pre-driver 36 which controls the gate voltages of the upper side IGBTs 32u, 32v, and 32w and the gate voltages of the lower side IGBTs 34u, 34v, and 34w, based on the respective switching command signals guh, gul, gvh, gvl, gwh, gwl and the servo-on signal sv*.

In terms of hardware, the microcomputer 22 comprises a CPU, ROM, RAM, timer, ports, and a bus interconnecting them.

Functionally, the microcomputer 22 comprises: a velocity controller 40 which takes the analog velocity command value ω*a and estimated velocity ωm as inputs, and outputs a γ-axis current command value iγ* and a δ-axis current command value iδ*; a current controller 50 which takes the analog u-phase current value iua, analog v-phase current value iva, rotational direction command ωdir*, γ-axis current command value iγ*, δ-axis current command value iδ*, and estimated angle θm as inputs, and outputs a u-phase current value iu, v-phase current value iv, u-phase voltage command value vu*, v-phase voltage command value vv*, w-phase voltage command value vw*, and the switching command signals guh, gul, gvh, gvl, gwh, and gwl; a compensation value generating unit 60 which takes the γ-axis current command value iγ*, δ-axis current command value iδ*, estimated angle θm, and estimated velocity ωm as inputs, and generates a compensation value α; an angle estimator 70 which takes the u-phase current value iu, v-phase current value iv, u-phase voltage command value vu*, v-phase voltage command value vv*, w-phase voltage command value vw*, and compensation value α as inputs, and outputs the estimated angle θm, estimated velocity ωm, and a back electromotive force amplitude estimated value em; and an uncontrollable state detecting unit 90 which takes the estimated velocity ωm and back electromotive force amplitude estimated value em as inputs, and outputs the servo-on signal sv*.

In this specification and in the description of the appended claims, the term "estimated velocity" and the term "estimated angular velocity" are both used in terms of angular velocity.

Figure 3:
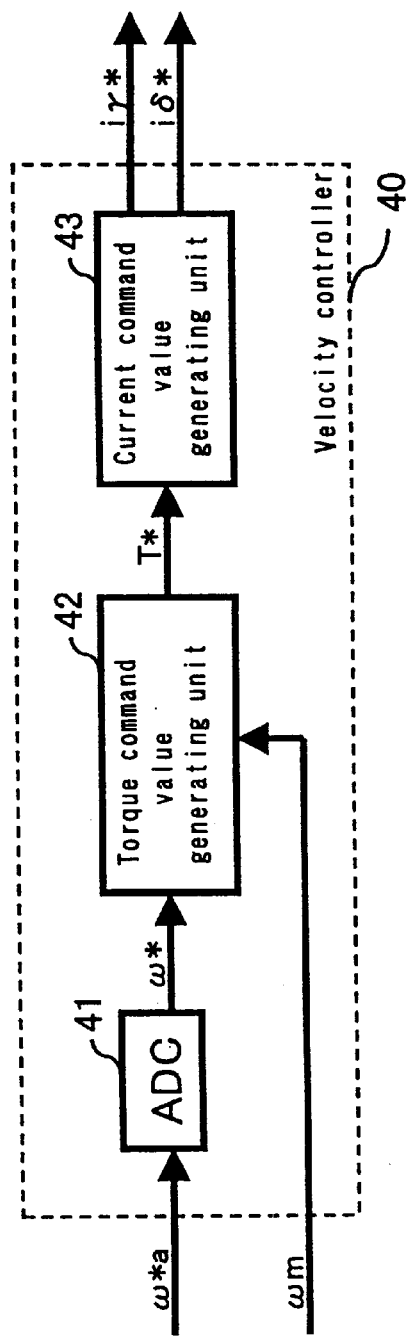
FIG. 3 is a block diagram showing the configuration of a velocity controller according to the first embodiment.

<Description of FIG. 3>

FIG. 3 is a block diagram showing the configuration of the velocity controller 40 according to the first embodiment. The velocity controller 40 comprises: an ADC (Analog Digital Converter) 41 which takes the analog velocity command value ω*a as an input and outputs a velocity command value ω*; a torque command value generating unit 42 which takes the velocity command value ω* and estimated velocity ωm as inputs, and outputs a torque command value T*; and a current command value generating unit 43 which takes the torque command value T* as an input and outputs the γ-axis current command value iγ* and δ-axis current command value iδ*.

Figure 4:
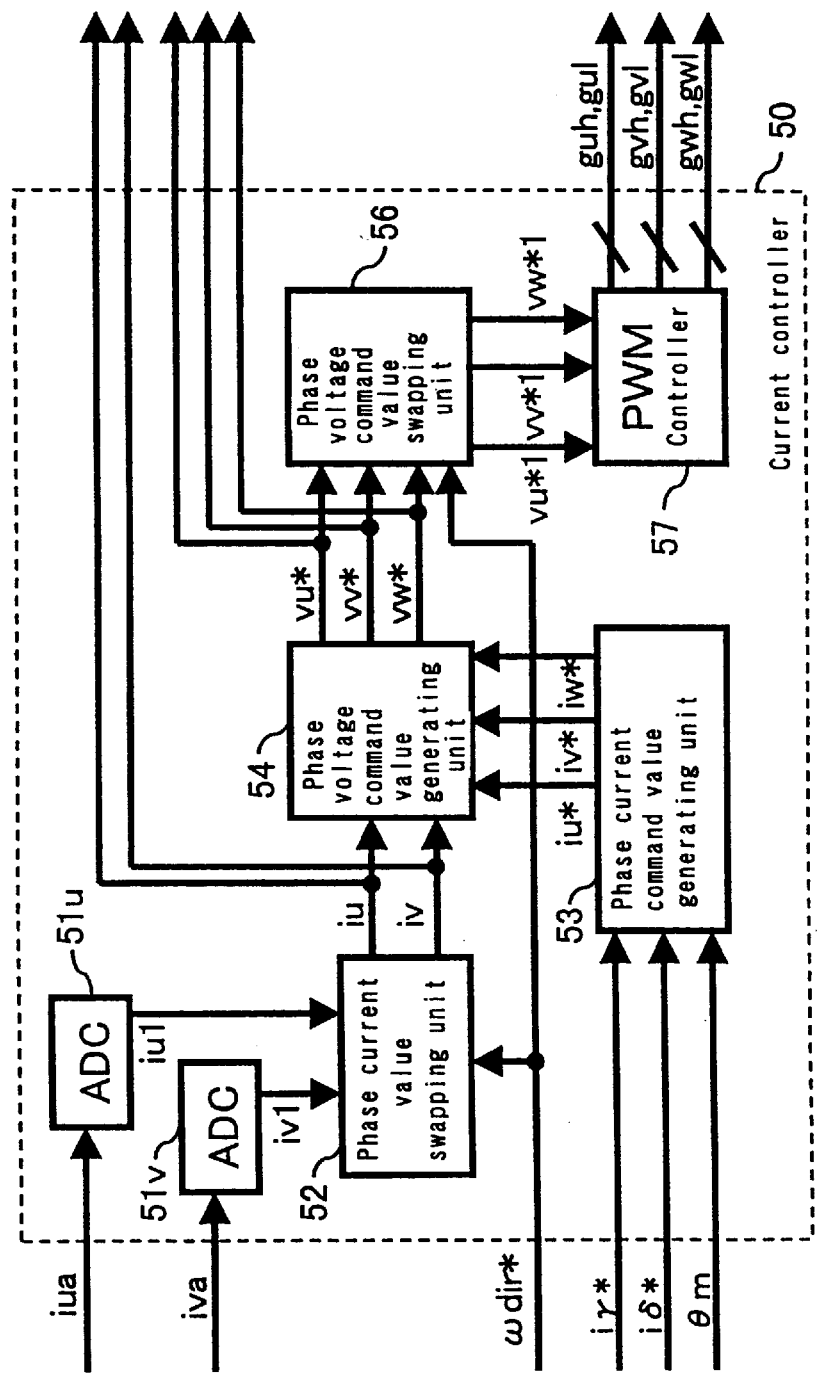
FIG. 4 is a block diagram showing the configuration of a current controller according to the first embodiment.

<Description of FIG. 4>

FIG. 4 is a block diagram showing the configuration of the current controller 50 according to the first embodiment. The current controller 50 comprises: an ADC 51u which takes the analog u-phase current value iua as an input and outputs a pre-swap u-phase current value iu1; an ADC 51v which takes the analog v-phase current value iva as an input and outputs a pre-swap v-phase current value iv1; a phase current value swapping unit 52 which takes the pre-swap u-phase current value iu1, pre-swap v-phase current value iv1, and rotational direction command ωdir* as inputs, and outputs the u-phase current value iu and v-phase current value iv; a phase current command value generating unit 53 which takes the γ-axis current command value iγ*, δ-axis current command value iδ*, and estimated angle θm as inputs, and outputs a u-phase current command value iu*, v-phase current command value iv*, and w-phase current command value iw*; a phase voltage command value generating unit 54 which takes the u-phase current value iu, v-phase current value iv, u-phase current command value iu*, v-phase current command value iv*, and w-phase current command value iw* as inputs, and outputs the u-phase voltage command value vu*, v-phase voltage command value vv*, and w-phase voltage command value vw*; a phase voltage command value swapping unit 56 which takes the u-phase voltage command value vu*, v-phase voltage command value vv*, w-phase voltage command value vw*, and rotational direction command ωdir* as inputs, and outputs a post-swap u-phase voltage command value vu*1, post-swap v-phase voltage command value vv*1, and post-swap w-phase voltage command value vw*1; and a PWM controller 57 which takes the post-swap u-phase voltage command value vu*1, post-swap v-phase voltage command value vv*1, and post-swap w-phase voltage command value vw*1 as inputs, and outputs the switching command signals guh, gul, gvh, gvl, gwh, and gwl.

Figure 5:
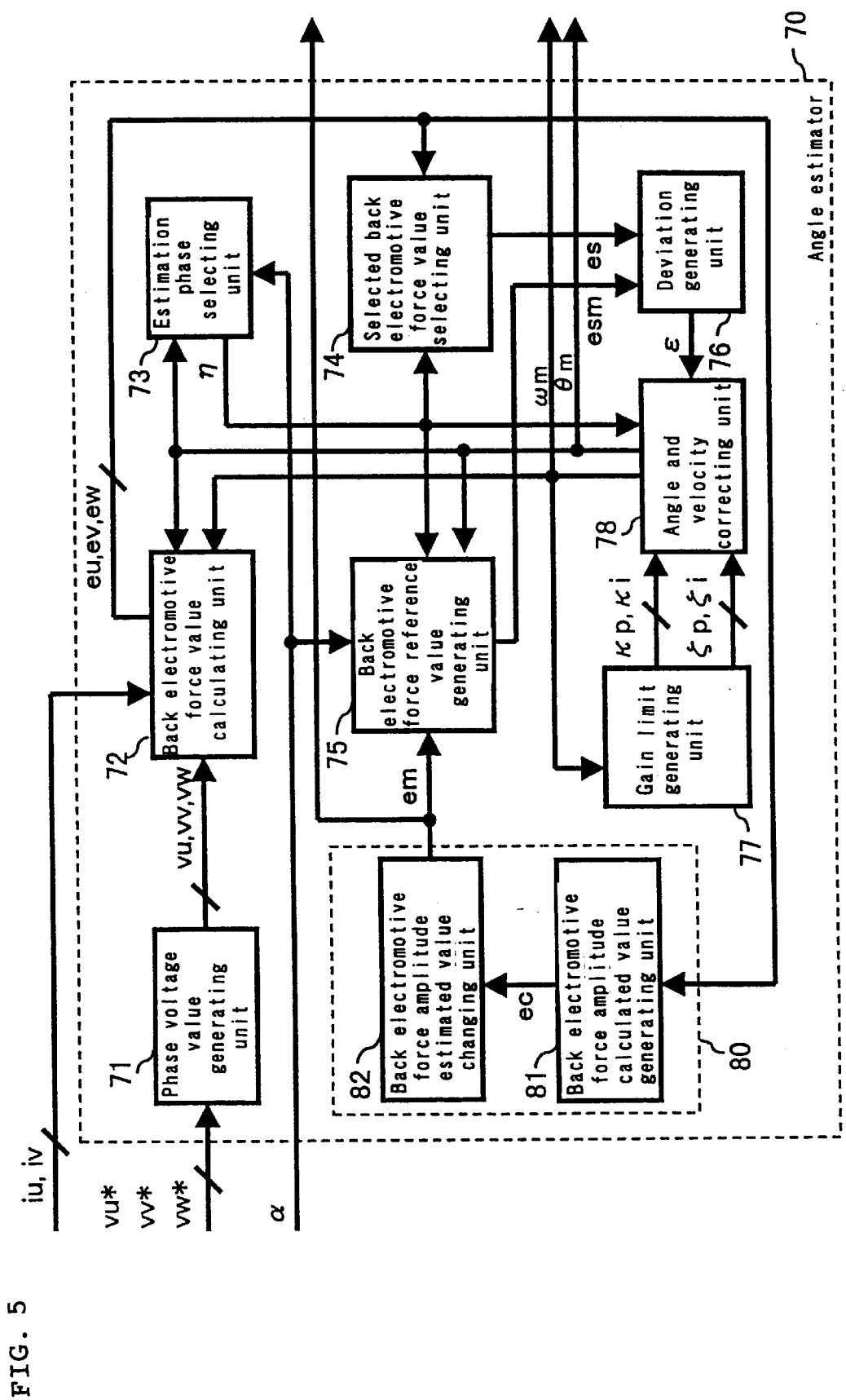
FIG. 5 is a block diagram showing the configuration of an angle estimator according to the first embodiment.

<Description of FIG. 5>

FIG. 5 is a block diagram showing the configuration of the angle estimator 70 according to the first embodiment. The angle estimator 70 comprises: a phase voltage value generating unit 71 which takes the u-phase voltage command value vu*, v-phase voltage command value vv*, and w-phase voltage command value vw* as inputs, and outputs a u-phase voltage value vu, a v-phase voltage value vv, and a w-phase voltage value vw; a back electromotive force value calculating unit 72 which takes the u-phase current value iu, v-phase current value iv, u-phase voltage value vu, v-phase voltage value vv, w-phase voltage value vw, estimated angle θm, and estimated velocity ωm as inputs, and outputs a u-phase back electromotive force value eu, a v-phase back electromotive force value ev, and a w-phase back electromotive force value ew; an estimation phase selecting unit 73 which takes the estimated angle θm and compensation value α as inputs, and outputs an estimation phase index η; a selected back electromotive force value selecting unit 74 which takes the estimation phase index η, u-phase back electromotive force value eu, v-phase back electromotive force value ev, and w-phase back electromotive force value ew as inputs, and outputs a selected back electromotive force value es; a back electromotive force reference value generating unit 75 which takes the estimation phase index η, estimated angle θm, compensation value α, and back electromotive force amplitude estimated value em as inputs, and outputs a back electromotive force reference value esm; a deviation generating unit 76 which takes the selected back electromotive force value es and back electromotive force reference value esm as inputs, and outputs a deviation ε; a gain limit generating unit 77 which takes the estimated velocity ωm as an input, and outputs a proportional gain κp, an integral gain κi, a proportional limit ζp, and an integral limit ζi; an angle and velocity correcting unit 78 which takes the estimation phase index η, deviation ε, proportional gain κp, integral gain κi, proportional limit ζp, and integral limit ζi as inputs, and outputs the estimated angle θm and estimated velocity ωm; and a back electromotive force amplitude estimated value correcting unit 80 which takes the u-phase back electromotive force value eu, v-phase back electromotive force value ev, and w-phase back electromotive force value ew as inputs, and outputs the back electromotive force amplitude estimated value em.

The back electromotive force amplitude estimated value correcting unit 80 comprises: a back electromotive force amplitude calculated value generating unit 81 which takes the u-phase back electromotive force value eu, v-phase back electromotive force value ev, and w-phase back electromotive force value ew as inputs, and outputs a back electromotive force amplitude calculated value ec; and a back electromotive force amplitude estimated value changing unit 82 which takes the back electromotive force amplitude calculated value ec as an input and outputs the back electromotive force amplitude estimated value em.

Figure 6:
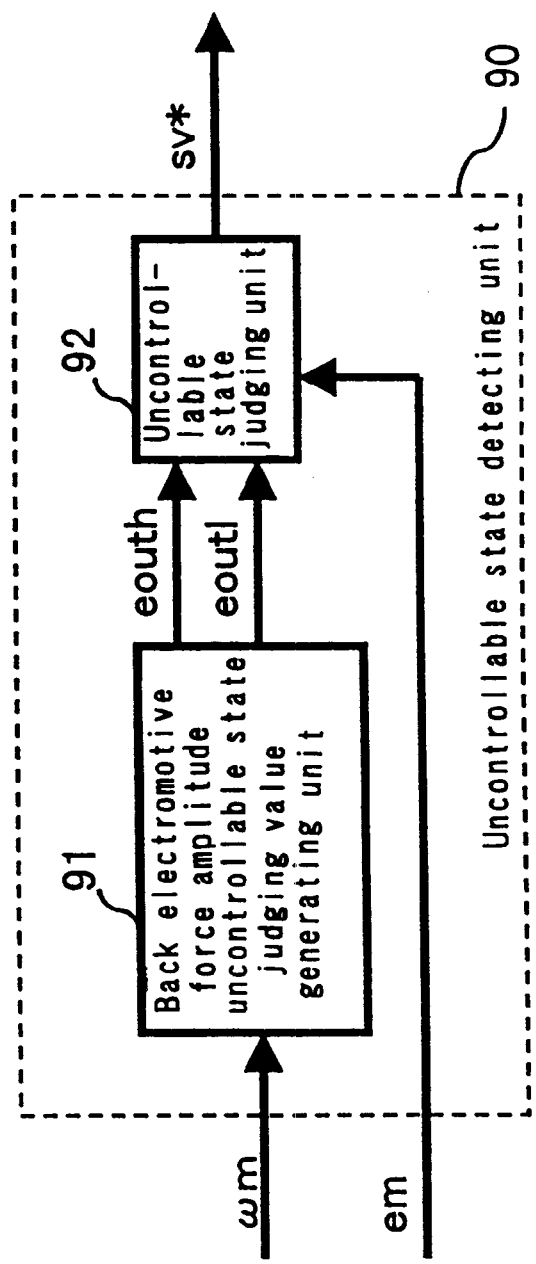
FIG. 6 is a block diagram showing the configuration of an uncontrollable state detecting unit according to the first embodiment.

<Description of FIG. 6>

FIG. 6 is a block diagram showing the configuration of the uncontrollable state detecting unit 90 according to the first embodiment. The uncontrollable state detecting unit 90 comprises: a back electromotive force uncontrollable state judging value generating unit 91 which takes the estimated velocity ωm as an input, and outputs a back electromotive force amplitude upper bound value eouth for the judgement of an uncontrollable state and a back electromotive force amplitude lower bound value eoutl for the judgement of an uncontrollable state; and an uncontrollable state judging unit 92 which takes the back electromotive force amplitude upper bound value eouth and lower bound value eoutl as inputs, and outputs the servo-on signal sv*.

Figure 7:
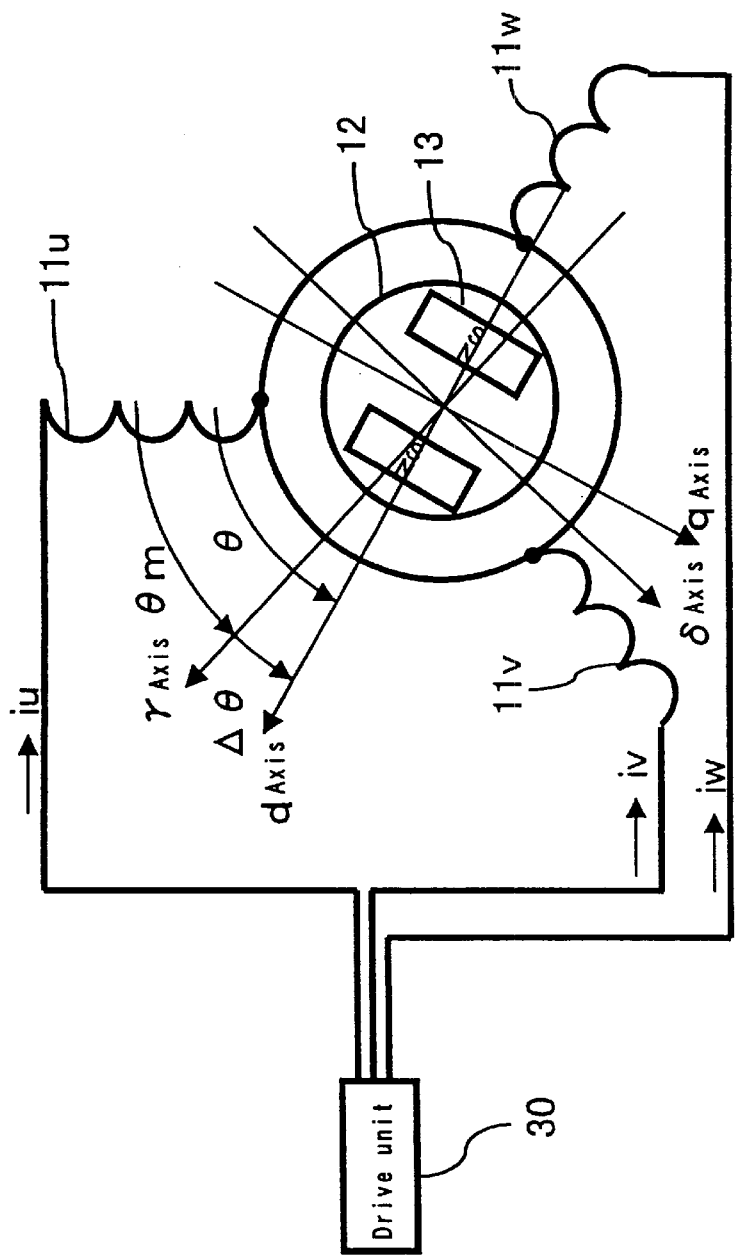
FIG. 7 is a diagram for explaining a coordinate system according to the first embodiment.

<Description of FIG. 7>

Next, the coordinate system will be explained. FIG. 7 is a diagram for explaining the coordinate system according to the first embodiment. In FIG. 7, an IPMSM with two magnetic poles is shown for the simplicity of explanation.

The d and q axes are axes determined by the actual angle θ of the rotor 12. The d axis is oriented in the direction of the magnetic flux produced by the permanent magnet 13 embedded in the rotor 12, and the q axis is advanced by 90 degrees relative to the d axis. The angle θ is the angle that the d axis makes with the stator winding 11u.

It is assumed here that in the plane of FIG. 7 the counterclockwise direction is the forward direction. When the rotor 12 rotates in the forward direction, the angle θ advances. The forward direction is the direction in which the current flowing through the stator windings 11u, 11v, and 11w changes in the order of u phase, v phase, and w phase.

The γ and δ axes are axes determined by the estimated angle θm. The axis rotated through the estimated angle θm relative to the stator winding 11u is taken as the γ axis, and the δ axis is advanced by 90 degrees relative to the γ axis. The difference between the angle θ and the estimated angle θm is denoted by an angle error Δθ (=θ−θm).

FIG. 7 shows an example in which there is a positive angle error Δθ, but if there is no error in the angle estimation and, hence, the angle error Δθ is 0, the estimated angle θm agrees with the angle θ, the d axis agrees with the γ axis, and the q axis agrees with the δ axis.

In the description hereinafter given, the angle θ, the estimated angle θm, and the angle error Δθ are expressed in terms of electrical angle. Hereinafter, all values relating to an angle are expressed in terms of electrical angle, unless specifically stated otherwise. Here, the mechanical angle denotes the angle of the rotor 12 itself; and is related to the electrical angle by the equation (Electrical angle)=(p/2) (Mechanical angle), where p is the number of magnetic poles.

The analog velocity command value ω*a is generated by a velocity command value generating unit (not shown) external to the position sensorless motor control apparatus of the first embodiment.

The rotational direction command ωdir* is generated by a-rotational direction command generating unit (not shown) external to the position sensorless motor control apparatus of the first embodiment. For the forward rotation of the IPMSM 10, the rotational direction command ωdir*=F (Forward). For the reverse rotation of the IPMSM 10, the rotational direction command ωdir*=R (Reverse).

Next, the operation of the position sensorless motor control apparatus of the first embodiment will be described.

The current sensors 21u and 21v detect the currents flowing through the respective. stator windings 11u and 11v, and generate the analog u-phase current value iua and the analog v-phase current value iva, respectively.

<Description of FIG. 2>

The operation of the drive unit 30 will be described below.

When the servo-on signal sv* is High (hereinafter abbreviated H), the drive unit 30 controls the voltage applied to the stator windings 11u, 11v, and 11w. When the servo-on signal sv* is Low (hereinafter abbreviated L), the drive unit 30 deenergizes the stator windings.

The power supply 31 supplies power to the drive unit 30.

When the servo-on signal sv* is H, the pre-driver 36 controls the gate voltage of the upper side IGBT 32u so that the upper side IGBT 32u conducts when the switching signal guh is H, and does not conduct when the switching signal guh is L. Further, the pre-driver 36 controls the gate voltage of the lower side IGBT 34u so that the lower side IGBT 34u conducts when the switching signal gul is H, and does not conduct when the switching signal gul is L. Likewise, for the v and w phases, the gate voltages of the upper side IGBTs 32v, 32w and the lower side IGBTs 34v, 34w are controlled based on the switching signals gvh, gwh, gvl, and gwl, respectively.

On the other hand, when the servo-on signal sv* is L, the pre-driver 36 controls the gate voltages of the upper side IGBTs 32u, 32v, 32w and the lower side IGBTs 34u, 34v, 34w so that all the IGBTs are turned off.

Next, the operation of the microcomputer 22 will be described.

<Description of FIG. 3>

First, the operation of the velocity controller 40 will be described.

The velocity controller 40 is activated at predetermined intervals of time, and controls the γ-axis current command value iγ* and the δ-axis current command value iδ* so that the rotor 12 rotates at the velocity directed by the externally supplied analog velocity command value ω*a, by operating the ADC 41, the torque command value generating unit 42, and the current command value generating unit 43 in this order, as described below.

The ADC 41 converts the analog velocity command value ω*a, an analog value, into the velocity command value ω*, a digital value.

The torque command value generating unit 42 controls the torque command value T* through proportional integral control (PI control) so that the estimated velocity ωm matches the velocity command value ω*. As shown in equation below, the difference between the velocity command value ω* and the estimated velocity ωm is controlled through proportional integral control using the proportional gain KPW and the integral gain KIW, and the result of the proportional integral control is taken as the torque command value T*.

$$T^* = KPW \cdot (\omega^* - \omega m) + KIW \cdot \Sigma(\omega^* - \omega m) \qquad (4)$$

The current command value generating unit 43 generates the γ-axis current command value iγ* and the δ-axis current command value iδ* so that the output torque of the IPMSM 10 matches the torque command value T*.

As shown in equation (5) below, the result obtained by dividing the torque command value T* by a predetermined value KT is taken as the current command value amplitude ia. Likewise, as shown in equation (6) below, the result obtained by multiplying the current command value amplitude ia by −sin (βT) is taken as the γ-axis current command value iγ*. Further, as shown in equation (7) below, the result obtained by multiplying the current command value amplitude ia by cos (βT) is taken as the δ-axis current command value iδ*. Here, βT is the current phase that achieves the maximum output torque or maximum efficiency when the current command value amplitude ia is given, and that is expressed as a set angle between 0 to 45 degrees. This phase is hereinafter referred to as the current command phase βT.

$$ia=T^*/KT \tag{5}$$

$$i\gamma^*=-ia \cdot \sin(\beta T) \tag{6}$$

$$i\delta^*=ia \cdot \cos(\beta T) \tag{7}$$

<Description of FIG. 4>

Next, the operation of the current controller 50 will be described.

The current controller 50 is activated at predetermined intervals of time (current control period), and controls the switching signals guh, gul, gvh, gvl, gwh, and gwl so that currents flow through the stator windings 11u, 11v, and 11w as directed by the γ-axis current command value iγ* and the δ-axis current command value iδ*, by operating the ADCs 51u and 51v, the phase current value swapping unit 52, the phase current command value generating unit 53, the phase voltage command value generating unit 54, the phase voltage command value swapping unit 56, and the PM controller 57 in this order, as described below.

The ADCs 51u and 51v convert the respective analog values, i.e., the analog u-phase current value iua and the analog v-phase current value iva, into the respective digital values, i.e., the pre-swap u-phase current value iu1 and the pre-swap v-phase current value iv1, respectively.

The phase current value swapping unit 52 outputs the pre-swap phase current values directly as the phase current values when the commanded direction is the forward direction, but interchanges the pre-swap phase current values with each other when the commanded direction is the reverse direction.

That is, when the rotational direction command ωdir*=F, the pre-swap u-phase current value iu1 is output as the u-phase current value iu and the pre-swap v-phase current value iv1 as the v-phase current value iv, as shown in equation (8) below. On the other hand, when the rotational direction command ωdir*=R, the pre-swap u-phase current value iu1 and the pre-swap v-phase current value iv1 are output as the v-phase current value iv and the u-phase current value iu, respectively, as shown in equation (9) below.

$$iu=iu1, iv=iv1 \text{(when } \omega dir^*=F) \tag{8}$$

$$iu=iv1, iv=iu1 \text{(when } \omega dir^*=R) \tag{9}$$

The phase current command value generating unit 53 converts the γ-axis current command value iγ* and the δ-axis current command value iδ*, expressed on the γ, δ axes of the rotating coordinate system defined by the estimated angle θ) m, into a stationary coordinate system, and generates the u-phase current command value iu*, v-phase current command value iv*, and w-phase current command value iw*, i.e., the command values for the currents that are supplied to the respective phases and are sinusoidal waves shifted in phase relative to each other by 120 degrees in terms of electrical angle. More specifically, this is done as shown by the following equations (10), (11), and (12).

$$iu^*=\{\sqrt{(2/3)}\} \cdot \{i\gamma^* \cdot \cos \theta m - i\delta^* \cdot \sin \theta m\} \tag{10}$$

$$iv^*=\{\sqrt{(2/3)}\} \cdot \{i\gamma^* \cdot \cos(\theta m-120°) - i\delta^* \cdot \sin(\theta m-120°)\} \tag{11}$$

$$iw^*=\{\sqrt{(2/3)}\} \cdot \{i\gamma^* \cdot \cos(\theta m+120°) - i\delta^* \cdot \sin(\theta m+120°)\} \tag{12}$$

The phase voltage command value generating unit 54 first obtains the w-phase current value. As shown in equation (13) below, the u-phase current value iu and the v-phase current value iv are summed and the sign of the sum is inverted to obtain the w-phase current value iw.

$$iw=-(iu+iv) \tag{13}$$

Next, the u-phase voltage command value vu* is controlled through proportional integral control (PI control) so that the u-phase current value iu matches the u-phase current command value. As shown in equation (14) below, the difference between the u-phase current command value iu* and the u-phase current value iu is controlled through proportional integral control using the proportional gain KPK and the integral gain KIK, and the result of the proportional integral control is taken as the u-phase voltage command value vu*. However, since the drive unit 30 cannot apply voltages greater than the voltage of the power supply 31 to the stator windings 11u, 11v, and 11w, a limit as defined by the following equation (15) is imposed. Here, E denotes the voltage value of the power supply 31.

Likewise, for the v and w phases, the v-phase voltage command value vv* and w-phase voltage command value vw* are generated as shown by the following equations (16), (17), (18), and (19).

$$vu^*=KPK \cdot (iu^*-iu)+KIK \cdot (iu^*-iu) \tag{14}$$

$$-(E/2) \leq vu^* \leq (E/2) \tag{15}$$

$$vv^*=KPK \cdot (iv^*-iv)+KIK \cdot \Sigma(iv^*-iv) \tag{16}$$

$$-(E/2) \leq vv^* \leq (E/2) \tag{17}$$

$$vw^*=KPK \cdot (iw^*-iw)+KIK \cdot \Sigma(iw^*-iw) \tag{18}$$

$$-(E/2) \leq vw^* \leq (E/2) \tag{19}$$

The phase voltage command value swapping unit 56 outputs the respective phase voltage values unchanged when the commanded direction is the forward direction, but interchanges the voltage command values between the u and v phases when the commanded direction is the reverse direction.

That is, when the rotational direction command ωdir*=F, the u-phase voltage command value vu* is output as the post-swap u-phase voltage command value vu*1 and the v-phase voltage command value vv* as the post-swap v-phase voltage command value vv*1, as shown in equation (20) below. On the other hand, when the rotational direction command ωdir*=R, the u-phase voltage command value vu* and the v-phase voltage command value vv* are output as the post-swap v-phase voltage command value vv*1 and the post-swap u-phase voltage command value vu*1, respectively, as shown in equation (21) below.

$$vu^*1=vu^*, vv1^*=vv^* \text{(when } \omega dir^*=F) \tag{20}$$

$$vu^*1=vv^*, vv1^*=vu^* \text{(when } \omega dir^*=R) \tag{21}$$

The PWM controller 57 applies pulse width modulation (PWM) to the post-swap u-phase voltage command value vu*1, post-swap v-phase voltage command value vv*1, and post-swap w-phase voltage command value vw*1. More specifically, a triangle wave having a set frequency and an amplitude of E/2 is generated, and this triangle wave is compared with the post-swap u-phase voltage command value vu*1; if the post-swap u-phase voltage command value vu*1 is larger, the switching signal guh is set to H and the switching signal gul to L. On the other hand, if the post-swap u-phase voltage command value vu*1 is smaller, the switching signal guh is set to L and the switching signal gul to H. Here, when the switching signals guh and gul transition from one state to another, a brief period of time is provided during which the switching signals guh and gul are both L (this brief period of time is called the dead time). Likewise for the v and w phases, the switching signals gvh, gvl and gwh, gwl are generated based on the post-swap v-phase voltage command value vv*1 and post-swap w-phase voltage command value vw*1, respectively.

<Description of FIG. 1>

Next, a description will be given of the operation of the compensation value generating unit 60 which constitutes a feature of the first embodiment.

The compensation value generating unit 60 operates each time the operation of the current controller 50 ends. The compensation value generating unit 60 generates the compensation value α indicating an amount by which the angle estimation θm in the angle estimator 70 is compensated. Though the angle estimator 70 produces estimated angle θm with good accuracy, it still contains a small amount of error. To address this, the error is obtained in advance through an experiment, etc. and a table is constructed. More specifically, a table α table is constructed which stores compensation values α for the residue (θm % 60) of the estimated angle θm divided by 60, the estimated velocity ωm, the γ-axis current command value iγ*, and the δ-axis current command value iδ*. The residue (θm % 60) of the estimated angle θm divided by 60 is used here because an error varying in a cycle of 60 degrees in terms of electrical angle occurs.

$$\alpha = \alpha \text{ table } (\theta m \% 60°, \omega m, i\gamma^*, i\delta^*) \quad (22)$$

<Description of FIG. 5>

Next, a description will be given of the operation of the angle estimator 70 which constitutes a feature of the first embodiment.

First, the operating principle of the angle estimator will be described.

The angle estimator 70 first produces a reference value for each back electromotive force (the back electromotive force reference value esm). Then, the estimated angle θm is corrected so that the phase of each of the back electromotive force values (the u-phase back electromotive force value eu, v-phase back electromotive force value ev, and w-phase back electromotive force value ew) obtained from the phase voltage equations of the stator winding 11u, 11v, 11w matches the angle (phase) of the back electromotive force reference value esm. Further, the back electromotive force amplitude estimated value em is corrected so that the amplitude of each of the back electromotive force values (the u-phase back electromotive force value eu, v-phase back electromotive force value ev, and w-phase back electromotive force value ew) matches the amplitude of the back electromotive force reference value esm (the back electromotive force amplitude estimated value em).

A method for phase matching the back electromotive force value and the back electromotive force reference value will be described first.

Figure 8:
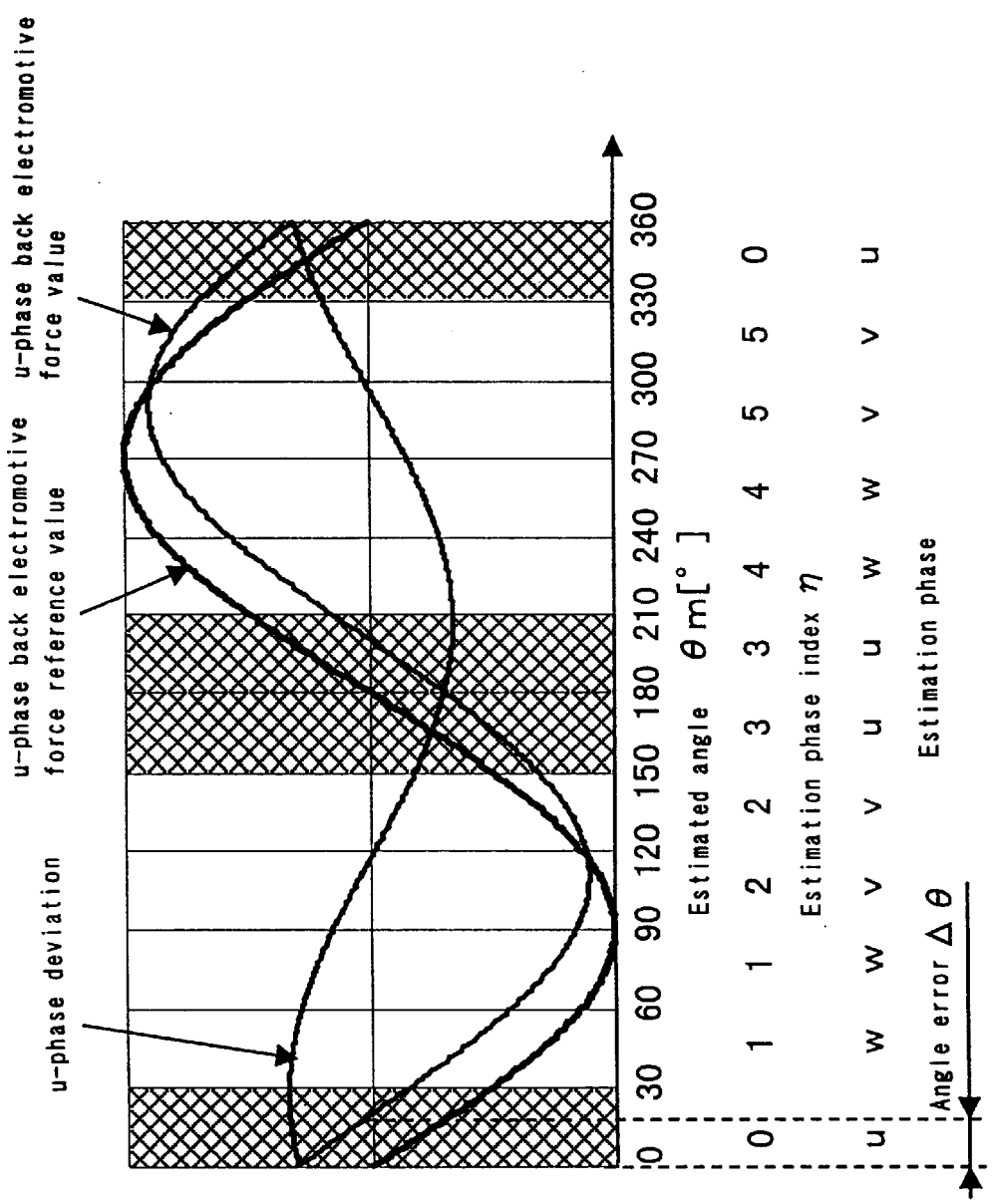
FIG. 8 is a waveform diagram showing a deviation between a u-phase back electromotive force value and a back electromotive force reference value according to the first embodiment.

<Description of FIG. 8>

FIG. 8 is a waveform diagram showing the deviation between the u-phase back electromotive force value and the back electromotive force reference value in the first embodiment. In FIG. 8, the back electromotive force value lags the back electromotive force reference value by 20 degrees in terms of electrical angle. Further, the amplitude of the back electromotive force value is 90% of that of the back electromotive force reference value (the back electromotive force amplitude estimated value em).

When the phase of the back electromotive force value of the u phase (the u-phase back electromotive force value eu) does not match the phase of the back electromotive force reference value for the u phase (the u-phase back electromotive force reference value eum), the deviation (u-phase deviation ε u), i.e., their phase difference, is not 0. Therefore, their phases are made to match by correcting the estimated angle θm so that the u-phase deviation δu converges to 0.

Here, the phase for which the estimation is made is selected according to the estimated angle θm. The u, v, and w phases are displaced from each other by 120 degrees in terms of electrical angle. In view of this, to improve the estimation accuracy, the angle estimation is performed by always using the phase whose phase difference most affects the deviation. That is, when the estimated angle θm is within ranges of 0 to 30 degrees, 150 to 210 degrees, and 330 to 360 degrees in terms of electrical angle, the estimation is performed using the u phase, since the magnitude of the u-phase deviation ε u is almost maximum in these angle ranges.

When the estimated angle θm is outside the above ranges, the estimation is performed using the v phase or w phase.

In FIG. 8, when the estimated angle θm is near or at 0 degree, the u-phase deviation εu is positive. Accordingly, when the estimated angle θm is within this range, if the deviation ε is positive, it is determined that the estimated angle θm is leading, and a correction is made so as to delay the estimated angle θm. Conversely, if the deviation ε is negative, it is determined that the estimated angle θm is lagging, and a correction is made so as to advance the estimated angle θm.

Further, in FIG. 8, when the estimated angle θm is near or at 180 degrees, the u-phase deviation εu is negative. Accordingly, when the estimated angle θm is within this range, if the deviation ε is negative, it is determined that the estimated angle θm is leading, and a correction is made so as to delay the estimated angle θm. Conversely, if the deviation ε is positive, it is determined that the estimated angle θm is lagging, and a correction is made so as to advance the estimated angle θm.

Next, a method for matching the amplitude of the back electromotive force value with that of the back electromotive force reference value (the back electromotive force amplitude estimated value em) will be described.

Back electromotive force values for all the phases (the u-phase back electromotive force value eu, v-phase back electromotive force value ev, and w-phase back electromotive force value ew) are obtained the amplitude is calculated, and the calculated amplitude is taken as the back electromotive force amplitude estimated value em.

The angle can thus be estimated by correcting the estimated angle θm and the back electromotive force amplitude estimated value em so that the back electromotive force value matches the back electromotive force reference value.

Furthermore, in the first embodiment, when correcting the estimated angle θm using the deviation, the gain and limit are varied according to the estimated velocity u)m to achieve control stabilization.

Further, in the first embodiment, the accuracy of the angle estimation is further enhanced by shifting the phase of the back electromotive force reference value esm by an amount equal to the compensation value α.

Now, the operation of the angle estimator 70 will be described in detail. The angle estimator 70 is activated in a predetermined cycle (angle estimation cycle: ΔT), and produces the estimated angle θm and estimated velocity ωm by operating the phase voltage value generating unit 71, the back electromotive force value calculating unit 72, the estimation phase selecting unit 73, the selected back electromotive force value selecting unit 74, the back electromotive force reference value generating unit 75, the deviation generating unit 76, the gain limit generating unit 77, the angle and velocity correcting unit 78, the back electromotive force amplitude calculated value generating unit 81, and the back electromotive force amplitude estimated value changing unit 82 in this order, as described below.

The angle estimation cycle ΔT is made to match the cycle of the current control by operating the current controller 50, the compensation value generating unit 60, and the angle estimator 70 in this order.

The angle estimation cycle ΔT does not depend on the motor structure, but depends on the processing capacity of the microcomputer. In the present embodiment, the angle estimation cycle ΔT is 67 μs. If the angle estimation cycle ΔT in the present embodiment that uses a motor rotor with four magnetic poles is expressed in terms of electrical angle Δθ, assuming that the motor is rotating at 1800 rpm (at an angular velocity of 60π/second) Δθ is calculated to be 1.45 degrees from the following equation.

$$\Delta\theta = 360 \text{ degrees} \times (4 \text{ poles}/2) \times 67 \mu s \times (1800 \text{ rpm}/60 \text{ s}) = 1.45 \text{ degrees}$$

As shown above, ΔT is a very small value, which means that the angle estimation is achieved in near real time.

The present embodiment is therefore free from response delays due to discrete sampling, as was the case with the prior art (in the prior art, since the angle estimation is performed at every 60 degrees of electrical angle, a delay equal to one half of the sampling period occurs). This near real time response achieves a higher responsiveness than was possible in the prior art, particularly during rapid acceleration or deceleration of the motor.

The ability to estimate the angle in a very short angle estimation cycle can also be achieved in other embodiments described herein.

The phase voltage value generating unit 71 takes the phase voltage command values vu*, vv*, and vw* as the phase voltage values vu, vv, and vw, respectively, as shown in the following equations (23), (24), and (25).

$$vu = vu^* \tag{23}$$

$$vv = vv^* \tag{24}$$

$$vw = vw^* \tag{25}$$

The back electromotive force value calculating unit 72 produces the back electromotive force values for the respective phases (the u-phase back electromotive force value eu, v-phase back electromotive force value ev, and w-phase back electromotive force value ew). The phase voltage equation of each phase is solved for the back electromotive force value.

More specifically, this is done as shown by equations (26), (27), and (28) below. In the equations, d/dt denotes the time derivative, and the estimated velocity ωm converted into the electrical angular velocity is used for dθ/dt appearing in the calculation of the derivative of a trigonometric function. Further, d(iu)/dt, d(iv)/dt, and d(iw)/dt are obtained by a first-order Euler approximation. The w-phase current value iw is obtained by summing the u-phase current value iu and v-phase current value iv and by inverting the sign of the sum, as shown in the previously given equation (13). In the equations, R is the resistance per stator winding phase, la is the leakage inductance per stator winding phase, La is the average value of the effective inductance per stator winding phase, and Las is the amplitude of the effective inductance per stator winding phase.

$$eu = vu - R \cdot iu - (la + La) \cdot d(iu)/dt - Las \cdot \cos(2\theta m) \cdot d(iu)/dt - Las \cdot iu \cdot d\{\cos(2\theta m)\}$$

$$/dt + 0.5 \cdot La \cdot d(iv)/dt - Las \cdot \cos(2\theta m - 120°) \cdot d(iv)/dt - Las \cdot iv \cdot d\{\cos(2\theta m - 120°)\}$$

$$/dt + 0.5 \cdot La \cdot d(iw)/dt - Las \cdot \cos(2\theta m + 120°) \cdot d(iw)/dt - Las \cdot iw \cdot d\{\cos(2\theta m + 120°)\}/dt \tag{26}$$

$$ev = vv - R \cdot iv - (la + La) \cdot d(iv)/dt - Las \cdot \cos(2\theta m + 120°) \cdot d(iv)/dt - Las \cdot iv \cdot d\{\cos(2\theta m + 120°)\}$$

$$/dt + 0.5 \cdot La \cdot d(iw)/dt - Las \cdot \cos(2\theta m) \cdot d(iw)/dt - Las \cdot iw \cdot d\{\cos(2\theta m)\}/dt + 0.5 \cdot La \cdot d(iu)$$

$$/dt - Las \cdot \cos(2\theta m - 120°) \cdot d(iu)/dt - Las \cdot iu \cdot d\{\cos(2\theta m - 120°)\}/dt \tag{27}$$

$$ew = vw - R \cdot iw - (la + La) \cdot d(iw)/dt - Las \cdot \cos(2\theta m - 120°) \cdot d(iw)$$

$$/dt - Las \cdot iw \cdot d\{\cos(2\theta m?120°)\}/dt + 0.5 \cdot La \cdot d(iu)/dt - Las \cdot \cos(2\theta m + 120°) \cdot$$

$$d(iu)/dt - Las \cdot iu \cdot d\{\cos(2\theta m + 120°)\}/dt + 0.5 \cdot La \cdot d(iv)/dt - Las \cdot \cos(2\theta m) \cdot$$

$$d(iv)/dt - Las \cdot iv \cdot d\{\cos(2\theta m)\}/dt \tag{28}$$

The estimation phase selecting unit 73 selects as the phase to be used for estimation (the estimation phase) the phase whose magnitude of deviation is the largest. The compensation value α is also taken into account. As shown in equation (29) below, when (estimated angle θm+compensation value α) is equal to or larger than 0 degree but smaller than 30 degrees, the estimation phase index η is set to 0. When (estimated angle θm+compensation value α) is equal to or larger than 30 degrees but smaller than 90 degrees, the estimation phase index η is set to 1 . . . . When (estimated angle θm+compensation value α) is equal to or larger than 270 degrees but smaller than 330 degrees, the estimation phase index η is set to 5. And, when (estimated angle θm+compensation value α) is equal to or larger than 330 degrees but smaller than 360 degrees, the estimation phase index η is set to 0. Here, when the estimation phase index η=0 or 3, the estimation phase is the u phase; when the estimation phase index η=1 or 4, the estimation phase is the w phase; and when the estimation phase index η=2 or 5, the estimation phase is the v phase.

η=0 estimation phase=u phase(when $0° \leq \theta m + \alpha < 30°$)

η=1 estimation phase=w phase(when $30° \leq \theta m + \alpha < 90°$)

η=2 estimation phase=v phase(when $90° \leq \theta m + \alpha < 150°$)

η=3 estimation phase=u phase(when $150° \leq \theta m + \alpha < 210°$)

η=4 estimation phase=w phase(when $210° \leq \theta m + \alpha < 270°$)

η=5 estimation phase=v phase(when $270° \leq \theta m + \alpha < 330°$)

η=0 estimation phase=u phase(when $330° \leq \theta m + \alpha < 360°$) (29)

The selected back electromotive force value selecting unit 74 takes the back electromotive force value of the estimation phase as the selected back electromotive force value es. As shown in equation (30) below, when the estimation phase index η=0 or 3, the u-phase back electromotive force value eu is taken as the selected back electromotive force value es. Likewise, when the estimation phase index η=2 or 5, the v-phase back electromotive force value ev is taken as the selected back electromotive force value es. Further, when the estimation phase index η=1 or 4, the w-phase back electromotive force value ew is taken as the selected back electromotive force value es.

$$es=eu \text{(when } \eta=0, 3\text{)}$$

$$es=ev \text{(when } \eta=2, 5\text{)}$$

$$es=ew \text{(when } \eta=1, 4\text{)} \tag{30}$$

The back electromotive force reference value generating unit 75 generates the back electromotive force reference value esm as the reference value for the back electromotive force value of the estimation phase. As shown in equation (31) below, when the estimation phase index η=0 or 3, the back electromotive force reference value for the u phase (the u-phase back electromotive force reference value eum) is taken as the back electromotive force reference value esm. Likewise, when the estimation phase index η=2 or 5, the back electromotive force reference value for the v phase (the v-phase back electromotive force reference value evm) is taken as the back electromotive force reference value esm. Further, when the estimation phase index η=1 or 4, the back electromotive force reference value for the w phase (the w-phase back electromotive force reference value ewm) is taken as the back electromotive force reference value esm.

Assuming that the permanent magnet of the rotor is magnetized with a sinusoidal waveform, the back electromotive force reference value esm for each phase is sinusoidal.

$$esm=eum \text{(when } \eta=0, 3\text{)}$$

$$esm=evm \text{(when } \eta=2, 5\text{)}$$

$$esm=ewm \text{(when } \eta=1, 4\text{)}$$

$$eum=-em \cdot \sin(\theta m+\alpha)$$

$$evm=-em \cdot \sin(\theta m+\alpha-120°)$$

$$ewm=-em \cdot \sin(\theta m+\alpha-240°) \tag{31}$$

The deviation generating unit 76 generates the deviation ε representing the difference between the selected back electromotive force value es and the back electromotive force reference value esm. As shown in equation (32) below, the deviation ε is obtained by subtracting the back electromotive force reference value esm from the selected back electromotive force value es.

$$\epsilon=es-esm \tag{32}$$

Figure 9:
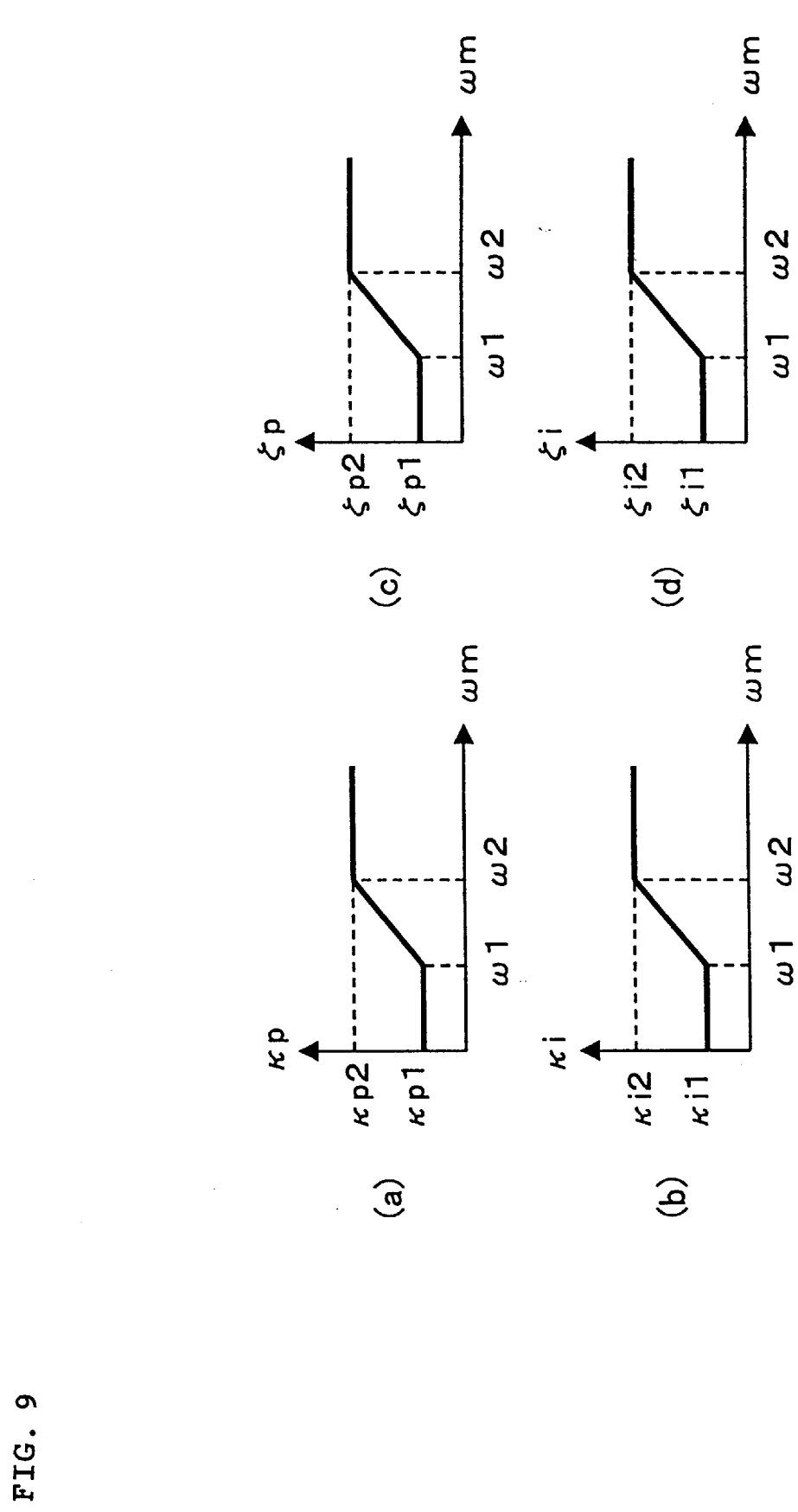
FIG. 9 is a diagram showing the relationship of gain and limit with respect to estimated velocity according to the first embodiment.

<Description of FIG. 9>

The gain limit generating unit 77 generates the proportional gain κp, integral gain κi, proportional limit ζp, and integral limit ζi, which increase with increasing estimated velocity ωm. As shown in FIG. 9(a), when the estimated velocity ωm is lower than a predetermined value ω1, the proportional gain κp is set to a predetermined value κp1. On the other hand, when the estimated velocity ωm is higher than a predetermined value ω2, the proportional gain κp is set to a predetermined value κp2. Further, when the estimated velocity ωm is within the range of ω1 to ω2, a value interpolated from (ω1, κp1) and (ω2, κp2) is taken as the proportional gain κp. The integral gain κi, proportional limit ζp, and integral limit ζi are generated in like manner, as shown in FIGS. 9(b), (c), and (d).

The angle and velocity correcting unit 78 corrects the estimated angle θm so that the deviation ε converges to 0. It also produces the estimated velocity ωm.

First, a correction sign σ indicating the direction of the correction is generated. As shown in equation (33) below, when the estimation phase index η=0, 2, or 4, the correction sign σ is set to −1. When the estimation phase index η=1, 3, or 5, the correction sign σ is set to 1.

$$\sigma=-1 (\eta=0, 2, 4)$$

$$\sigma=+1 (\eta=1, 3, 5) \tag{33}$$

Next, an advance value θmp is generated that indicates how much the estimated angle θm is to be advanced per angle estimation cycle. As shown by the equation (34), a value obtained by multiplying the deviation ε by the correction sign σ and by the proportional gain κp, with a limit imposed so that the absolute value of the multiplication result does not exceed the proportional limit ζp, is taken as the advance value proportional term θmpp. Likewise, as shown by the equation (35), a value obtained by multiplying the deviation ε by the correction sign σ and by the integral gain κi, with a limit imposed so that the absolute value of the multiplication result does not exceed the integral limit ζp, is taken as the advance value integral term θmpi. Then, the result of the integration of the advance value integral term θmpi is summed with the advance value proportional term θmpp, and the resulting sum is taken as the advance value θmp.

$$\theta mpp=\kappa p \cdot \sigma \cdot \epsilon, \ -\zeta p \leq \theta mpp \leq \zeta p \tag{34}$$

$$\theta mpi=\kappa i \cdot \sigma \cdot \epsilon, \ -\zeta \leq \theta mpi \leq \zeta i \tag{35}$$

$$\theta mp=\theta mpp+\Sigma \theta mpi \tag{36}$$

Next, the estimated angle θm is advanced by an amount equal to the advance θmp. The result of the integration of the advance θmp is taken as the estimated angle θm, as shown in equation (37) below.

$$\theta m=\Sigma mp \tag{37}$$

Then, the advance value θmp processed through a first-order digital low pass filter (LPF) is taken as the estimated velocity ωm. More specifically, this is done as shown by the following equation (38). In the equation, ωm(n) is the present estimated velocity, and ωm(n−1) is the previous estimated velocity. KTPW is a coefficient for changing the advance value into velocity units. Further, KLW is the low pass filter coefficient which takes a value between 0 and 1, and the effect of the filter increases as the value decreases.

$$\omega m(n)=KLW \cdot (KTPW \cdot \theta mp)+(1-KLW) \cdot \omega m(n-1) \tag{38}$$

The back electromotive force amplitude calculated value generating unit 81 produces the back electromotive force amplitude calculated value ec based on the sum of the absolute values of the back electromotive force values for the respective phases. As shown in equation (39) below, the absolute value of the u-phase back electromotive force value eu, the absolute value of the v-phase back electromotive force value ev, and the absolute value of the w-phase back electromotive force value ew are summed together, and the resulting sum multiplied by a predetermined coefficient KEC is taken as the back electromotive force amplitude calculated value ec. Here, the coefficient KEC is given as equation (40) below and, assuming that each phase is sinusoidal, is used to multiply the sum of the absolute values of the respective phases to convert the sum into the amplitude. In the equation, θm % 60 is the residue when the estimated angle θm is divided by 60.

$$ec = KEC \cdot (|eu| + |ev| + |ew|) \quad (39)$$

$$KEC = 0.5/\sin\{(\theta m \ \% \ 60) + 60°\} \quad (40)$$

The back electromotive force amplitude estimated value changing unit 82 takes the back electromotive force amplitude calculated value ec, processed through a first-order digital low pass filter (LPF), as the back electromotive force amplitude estimated value em. More specifically, this is done as shown by equation (41) below. In the equation, em(n) is the present back electromotive force amplitude estimated value, and em(n−1) is the previous back electromotive force amplitude estimated value. KLEM is the low pass filter coefficient which takes a value between 0 and 1, and the effect of the filter increases as the value decreases.

The low pass filter obtains an error (amplitude error) between the back electromotive force amplitude calculated value ec and the previous back electromotive force amplitude estimated value em(n−1), and multiplies it by the coefficient KLEM and adds the result of the multiplication to the previous back electromotive force amplitude estimated value em(n−1) to produce the present back electromotive force amplitude estimated value em(n). Using the low pass filter in this way, the amplitude error is calculated, and the back electromotive force amplitude estimated value em(n) is corrected in such a manner as to reduce the amplitude error.

$$em(n) = KLEM \cdot ec + (1 - KLEM) \cdot em(n-1) \quad (41)$$

<Description of FIG. 6>

Next, a description will be given of the uncontrollable state detecting unit 90 which constitutes a feature of the first embodiment.

First, the operating principle of the uncontrollable state detecting unit 90 will be described.

With the permanent magnet 13 contained in the IPMSM 10, a back electromotive force is produced when the rotor 12 rotates. The amplitude of this back electromotive force increases in proportion to the rotational speed of the rotor 12. The angle estimator 70 produces this back electromotive force amplitude as the back electromotive force amplitude estimated value em.

For example, when a user sets a parameter, there can occur cases where the user enters an erroneous value for the inductance used in the angle estimator 70, and this, though rare, could lead to an uncontrollable state. When an uncontrollable state does occur, a contradiction arises between the estimated velocity ωm and the back electromotive force amplitude estimated value em produced by the angle estimator 70.

The uncontrollable state detecting unit 90 detects this contradiction, and sets the servo-on signal sv* to L to inhibit energization in the drive unit 30. The servo-on signal sv* is also supplied to circuitry external to the position sensorless motor control apparatus of the first embodiment, to notify a higher order CPU or the user. Then, the higher order CPU performs restart processing or the user changes parameters in order to recover from the uncontrollable state.

Figure 10:
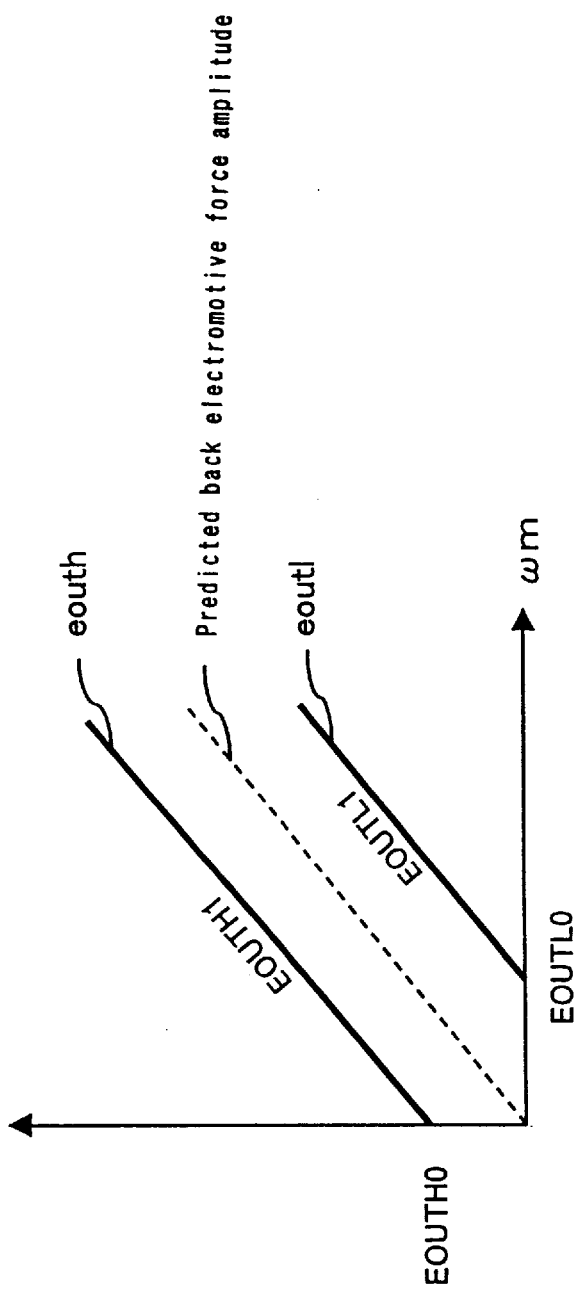
FIG. 10 is a diagram showing the relationship of an upper bound value and a lower bound value for back electromotive force amplitude with respect to estimated velocity according to the first embodiment.

<Description of FIG. 10>

The operation of the uncontrollable state detecting unit 90 will now be described in detail below.

The back electromotive force amplitude uncontrollable state judging value generating unit 91 generates an upper bound value and a lower bound value defining a range of a certain width for the back electromotive force which is predicted to be produced when the rotor 12 rotates at the estimated velocity ωm. FIG. 10 is a diagram illustrating the relationship of the back electromotive force amplitude upper bound value eouth and lower bound value eoutl with respect to the estimated velocity ωm according to the first embodiment. As shown in FIG. 10, the back electromotive force amplitude upper bound value eouth for the judgement of an uncontrollable state is set as a linear function of estimated angle ωm, whose intercept is EOUTH0 and whose slope is EOUTH1. Likewise, the back electromotive force amplitude lower bound value eoutl for the judgement of an uncontrollable state is set as a linear function of estimated angle am, whose point of intersection with the ωm axis is EOUTL0 and whose slope is EOUTL1.

The uncontrollable state judging unit 92 judges that an uncontrollable state has occurred when the back electromotive force amplitude estimated value em is outside the range defined by the back electromotive force amplitude upper bound value eouth and lower bound value eoutl. As shown in equation (42) below, when the back electromotive force amplitude estimated value em is smaller than the back electromotive force amplitude lower bound value eoutl, it is determined that an uncontrollable state has occurred, and the servo-on signal sv* is set to L. Likewise, when the back electromotive force amplitude estimated value em is larger than the back electromotive force amplitude upper bound value eouth, it is determined that an uncontrollable state has occurred, and the servo-on signal sv* is set to L. Otherwise, it is determined that the state is normal, and the servo-on signal sv* is set to H.

$$sv^* = L \ (em < eoutl)$$

$$sv^* = H \ (eoutl \leq em \leq eouth)$$

$$sv^* = L \ (em > eouth) \quad (42)$$

With the above operation, the position sensorless motor control apparatus of the first embodiment can estimate the angle with high resolution and high accuracy. Furthermore, the position sensorless motor control apparatus of the first embodiment is capable of estimating the angle even in the presence of phase voltage saturation. The position sensorless motor control apparatus of the first embodiment is also capable of estimating the angle with high accuracy even when the back electromotive force constant changes.

In other embodiments, the uncontrollable state detecting unit 90 judges that an uncontrollable state has occurred when the deviation ε is larger than a predetermined value, and sets the servo-on signal sv* to L. On the other hand, when the deviation ε is smaller than a predetermined value, it is determined that the state is normal, and the servo-on signal sv* is set to H.

In the present embodiment, in order to prevent the uncontrollable state detecting unit 90 from malfunctioning due to transitory noise, it is preferable to make provision so that when the deviation ε is detected staying above the predetermined value continuously for a predetermined length of time or having exceeded the predetermined value a predetermined number of times in succession, then the condition is determined to be an uncontrollable state and the servo-on signal sv* is set to L.

The effect of the position sensorless motor control apparatus of the first embodiment will be described below.

In the position sensorless motor control apparatus of the prior art 1, the back electromotive force values for the three phases were produced, comparisons were made based on the back electromotive force values, and the motor was driven with a square wave based on the logic of the comparison results. As a result, the current was distorted, causing torque ripple when the energized phase was switched from one phase to another.

By contrast, the position sensorless motor control apparatus of the first embodiment produces the back electromotive force reference value, and corrects the estimated angle θm by using the deviation ε representing the difference between the back electromotive force value and the back electromotive force reference value. Then, the phase current command values iu*, iv*, and iw* of sinusoidal waveform are generated based on the corrected estimated angle θm, and phase currents of sinusoidal waveform are supplied by controlling the current values.

In this way, by producing the estimated angle θm using the deviation ε between the back electromotive force value and the back electromotive force reference value, and flowing sinusoidal phase currents, the position sensorless motor control apparatus of the first embodiment reduces the torque ripple.

The position sensorless motor control apparatus of the prior art 1 calculates the back electromotive force value for each phase, and determines the angle at the instant of each zero crossing. Accordingly, the angle can be detected six times per cycle of the electrical angle, which means a resolution of 60 degrees in terms of electrical angle. If control is performed by interpolating this angle, quick response cannot be provided when the velocity changes abruptly. Further, if velocity control is performed by generating the velocity based on this angle, the response of the velocity control is slow.

By contrast, the position sensorless motor control apparatus of the first embodiment generates the back electromotive force reference value, and corrects the estimated angle θm by using the deviation ε representing the difference between the back electromotive force value and the back electromotive force reference value. Since the correction of the estimated angle θm is performed for each angle estimation cycle ΔT, the obtained estimated angle θm has a high resolution and high accuracy. The estimated velocity ωm generated based on this estimated angle θm also has a high accuracy.

In this way, by obtaining the deviation ε and correcting the estimated angle θm for each angle estimation cycle ΔT, the first embodiment achieves a position sensorless motor control apparatus that produces the estimated angle θm with high resolution and high accuracy at all times.

If the estimation phase is fixed to one particular phase, the angle can only be estimated at or around particular angles. For example, if the estimation phase is fixed to the u phase, it is only possible to estimate the angle when the angle θ is at or near 0 or 180 degrees. Since the angle cannot be estimated at other points in the cycle of the angle, the accuracy of the estimated angle θm degrades.

In the position sensorless motor control apparatus of the first embodiment, the phase used for estimation (the estimation phase) is switched according to the estimated angle θm. Here, the back electromotive force reference value esm for the estimation phase is generated, and the selected back electromotive force value es, i.e, the back electromotive force value for the estimation phase, is generated then, the estimated angle θm is corrected using the deviation ε representing the difference between the back electromotive force reference value esm and the selected back electromotive force value es. By so doing, the estimated angle θm is corrected always using the deviation ε of the phase most affected by the estimation error of the estimated angle θm.

In this way, since the phase used for estimation is switched according to the estimated angle θm, the first embodiment achieves a position sensorless motor control apparatus that produces the estimated angle θm with high accuracy at all times.

The position sensorless motor control apparatus of the prior art 2 performs control using the rotating coordinate system defined by the d and q axes, based on the premise that the phase currents flowing in the stator windings and the voltages applied across the stator windings are sinusoidal. As a result, when the rotor velocity or output torque increases and the required phase voltage becomes large, the phase voltage saturates, rendering accurate angle estimation impossible, and thus it has not been possible to achieve a high angular velocity and large output torque.

By contrast, the position sensorless motor control apparatus of the first embodiment generates the back electromotive force reference value esm based on the phase voltage equation of each stator winding phase, and corrects the estimated angle θm using the deviation ε representing the difference between the back electromotive force reference value esm and the back electromotive force value. Since the phase voltage equation of the stator winding also holds if the phase current and the phase voltage are non-sinusoidal, the estimated angle θm can be produced even when the phase voltage saturates.

In this way, by correcting the estimated angle θm based on the phase voltage equation of each stator winding phase, the first embodiment achieves a position sensorless motor control apparatus that produces the estimated angle θm in the presence of phase voltage saturation and drives the motor at high velocity and with large output torque.

On the other hand the position sensorless motor control apparatus of the prior art 2 estimates the angle by applying the motor constants, i.e., the resistance value, d-axis inductance, q-axis inductance, and the back electromotive force constant to the voltage equations. Therefore, when the motor is driven and the motor temperature varies, the angle cannot be estimated correctly because the amount of magnetic flux of the permanent magnet changes and, as a result, the back electromotive force constant changes.

The position sensorless motor control apparatus of the first embodiment corrects the back electromotive force amplitude estimated value em based on the back electromotive force value for each phase, generates the back electromotive force reference value esm using the back electromotive force amplitude estimated value em, obtains the deviation ε which varies according to the angle error Δθ, and produces the estimated angle θm. Here, rather than obtaining the back electromotive force value from the velocity and the back electromotive force constant, the back electromotive force amplitude estimated value em is obtained by subtracting components other than the back electromotive force from the phase voltage of each phase; accordingly, the estimated angle θm is unaffected by a change of the back electromotive force constant.

By correcting the back electromotive force amplitude estimated value em in this way, the first embodiment achieves a position sensorless motor control apparatus that produces the estimated angle θm with high accuracy even when the back electromotive force constant changes.

Consider if an uncontrollable state were not detected. In the event of an uncontrollable state, if a velocity command is given to the position sensorless motor control apparatus, the rotor 12 does not rotate as directed by the velocity command.

The position sensorless motor control apparatus of the first embodiment generates the upper bound value eouth and the lower bound value eoutl defining a range of a certain width for the amplitude of the back electromotive force which is predicted to be produced when the rotor 12 rotates at the estimated velocity ωm. When the back electromotive force amplitude estimated value em lies outside the range defined by the bound value eouth and the lower bound value eoutl, the condition is determined to be an uncontrollable state, and the servo-on signal sv* is set to L. This inhibits energization in the drive unit 30. The servo-on signal sv* is also supplied to circuitry external to the position sensorless motor control apparatus of the first embodiment, to request the upper-order CPU to restart the system or the user to re-set the parameters.

In this way, the first embodiment achieves a position sensorless motor control apparatus that detects the occurrence of an uncontrollable state by detecting a contradiction between the estimated velocity ωm and the back electromotive force amplitude estimated value em.

Consider if the angle estimation gain were fixed the effective gain varies with the rotational speed of the rotor. If the magnitude of the deviation ε is the same, the amount by which the advance value θp is to be varied is the same. Here, the amount by which the angle is advanced in each angle estimation cycle ΔT (the advance value θp) is smaller in low velocity operation than in high velocity operation. Accordingly, the proportion of the amount of change of the advance value θp to the advance value θp is large in low velocity operation. If the gain is set optimum for low velocity operation, the gain is small for high velocity operation, and if the gain is set optimum for high velocity operation, the gain is large for low velocity operation. The gain thus cannot be set optimum for both low velocity and high velocity operation, and this may make angle estimation unstable.

The position sensorless motor control apparatus of the first embodiment increases the proportional gain κp and integral gain κi as the estimated velocity ωm increases. Optimum gain is thus maintained throughout the entire velocity range from low velocity to high velocity.

In this way, by varying the angle estimation gain according to the velocity, the first embodiment achieves a position sensorless motor control apparatus that performs stable angle estimation throughout the entire velocity range from low velocity to high velocity.

This can also be said of the angle estimation limit. That is, by varying the angle estimation limit according to the velocity, the first embodiment achieves a position sensorless motor control apparatus that performs stable angle estimation throughout the entire velocity range from low velocity to high velocity.

Consider if the compensation value α were not used the angle estimator 70. When the compensation amount α is not used, does produce an estimated angle θm with good accuracy, but this estimated angle θm contains a small amount of error.

The position sensorless motor control apparatus of the first embodiment obtains this error in advance through an experiment, etc., constructs a table, and produces a compensation value α indicating an amount by which the angle estimation θm is compensated then, the angle estimation error is compensated for by generating the back electromotive force reference value es based on the angle obtained by adding the compensation value α to the estimated angle θm.

By compensating for the angle estimation error by the compensation value α in this way, the first embodiment achieves a position sensorless motor control apparatus that estimates the angle with higher accuracy.

When a reverse rotation command is given, the position sensorless motor control apparatus of the first embodiment interchanges the u-phase current value iu and the v-phase current value iv, and interchanges the u-phase voltage command value vu* and the v-phase voltage command value vv*. Since this has the same effect as changing the connections of the u-phase stator winding and v-phase stator winding, the reverse rotation is achieved by making only simple changes to software.

In this way, by interchanging the phase currents and also interchanging the phase voltage command values when the reverse rotation is commanded the first embodiment achieves a position sensorless motor control apparatus that easily accomplishes reverse rotation of the rotor by making only simple changes to software.

Embodiment 2

A position sensorless motor control apparatus according to a second embodiment of the invention will be described below. In the position sensorless motor control apparatus of the first embodiment, the phase voltage values vu, vv, and vw were created from the phase voltage command values vu*, vv*, and vw* generated by the current controller 50. In the position sensorless motor control apparatus of the second embodiment hereinafter described, voltage sensors are added to detect the phase voltages directly. The second embodiment then achieves high resolution and high accuracy angle estimation, achieves angle estimation even in the presence of phase voltage saturation, and achieves high accuracy angle estimation even when the back electromotive force constant changes.

Figure 11:
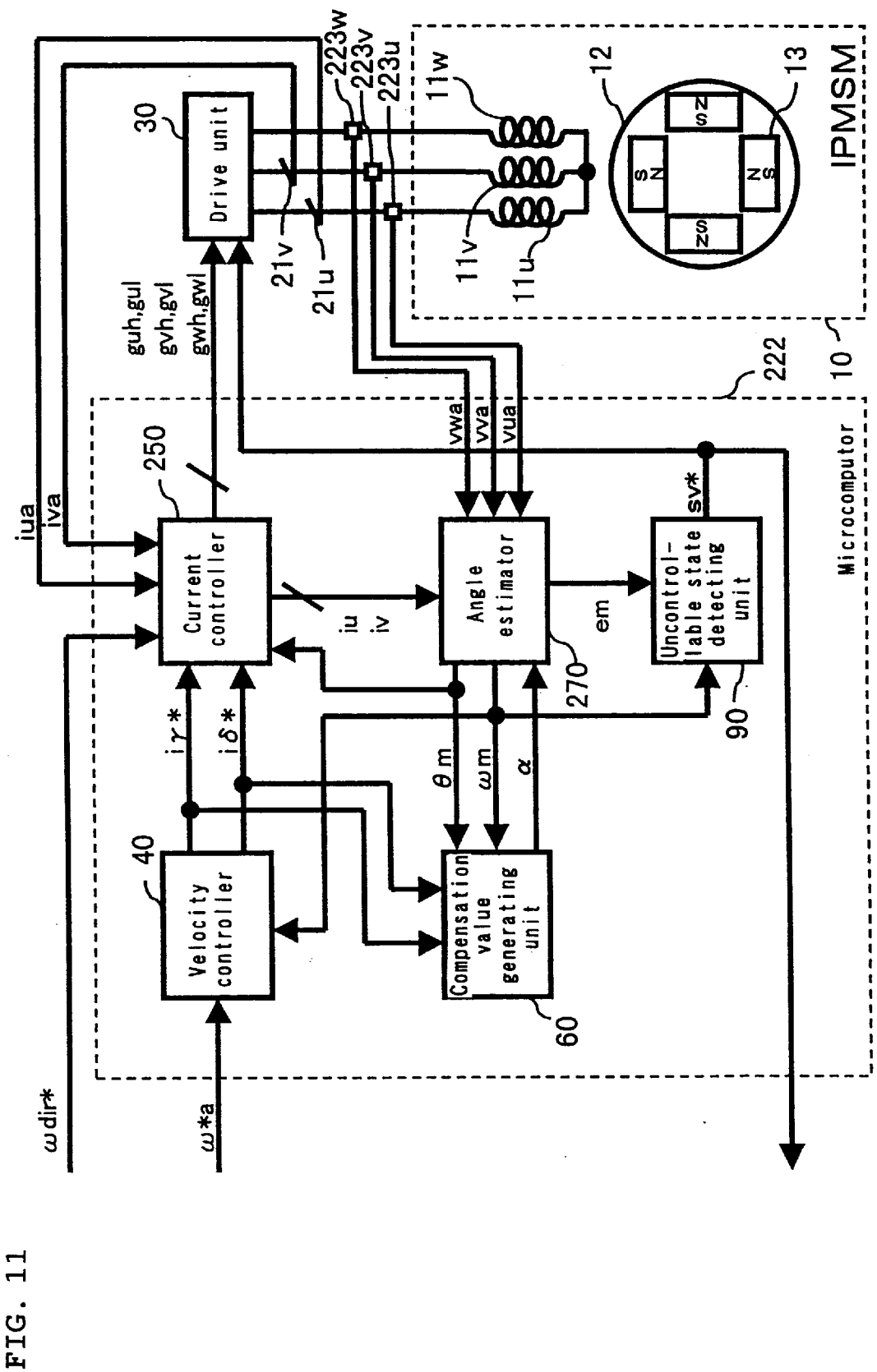
FIG. 11 is a block diagram showing the configuration of a position sensorless motor control apparatus according to a second embodiment.
Figure 12:
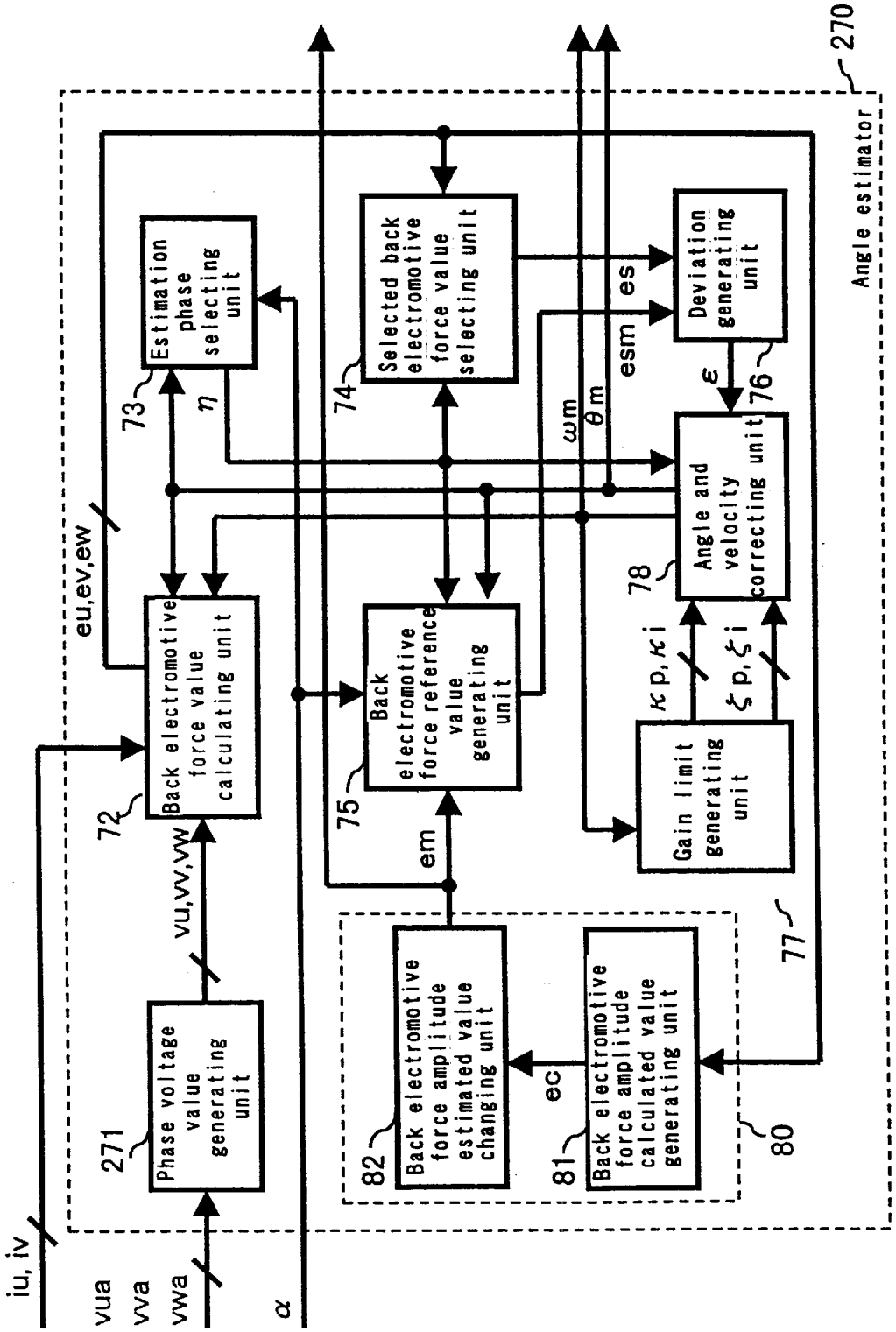
FIG. 12 is a block diagram showing the configuration of an angle estimator according to the second embodiment.

First, the configuration of the position sensorless motor control apparatus according to the second embodiment will be described. FIG. 11 is a block diagram showing the configuration of the position sensorless motor control apparatus according to the second embodiment. FIG. 12 is a block diagram showing the configuration of the angle estimator according to the second embodiment.

<Description of FIG. 11>

The position sensorless motor control apparatus of the second embodiment differs from the position sensorless motor control apparatus of the first embodiment by the inclusion of voltage sensors 223u, 223v, and 223w which detect the terminal voltages of the stator windings 11u, 11v, and 11w and output an analog u-phase voltage value vua, analog v-phase voltage value vva, and analog w-phase voltage value vwa, respectively. The configuration of the microcomputer 222 also differs from that of the first embodiment. More specifically, the current controller 250 and angle estimator 270 contained in the microcomputer 222 differ from those of the first embodiment. More particularly, the phase voltage generating unit 271 in the angle estimator 270 differs from that of the first embodiment.

Regarding inputs and outputs, differences from the first embodiment are that the current controller 250 does not output the phase voltage command values vu*, vv*, and vw*, and that the angle estimator 270 receives the analog phase voltage values vua, vva, and vwa instead of the phase voltage command values vu*, vv*, and vw*.

Otherwise, the configuration is the same as that of the first embodiment, and the same constituent elements will be designated by the same reference numerals and will not be described herein.

Next, the operation of the position sensorless motor control apparatus of the second embodiment will be described.

The voltage sensors 222u, 223v, and 223w respectively detect the voltages applied to the stator windings 11u, 11v, and 11w, and produce the analog u-phase voltage value vua, analog v-phase voltage value vva, and analog w-phase voltage value vwa, respectively. These analog phase voltage values are processed through a suitable low pass filter.

<Description of FIG. 12>

The phase voltage value generating unit 271 comprises analog digital converters which convert analog values, i.e., the analog u-phase voltage value vua, analog v-phase voltage value vva, and analog w-phase voltage value vwa, into digital values, i.e., the u-phase voltage value vu, v-phase voltage value vv, and w-phase voltage value vw, respectively.

The position sensorless motor control apparatus of the first embodiment generated the phase voltage values vu, vv, and vw from the phase voltage command values vu*, vv*, and vw*. If the phase voltages are detected directly by adding voltage sensors, as in the position sensorless motor control apparatus of the second embodiment, the operation is fundamentally the same as that in the first embodiment, and the same effect as achieved in the first embodiment can be obtained.

Furthermore, in the position sensorless motor control apparatus of the second embodiment, by adding the voltage sensors 223u, 223v, and 223w and detecting directly the voltages applied to the stator windings 11u, 11v, and 11w, the accuracy of the phase voltage values vu, vv, and vw improves, and the accuracy of the estimated angle θm is further enhanced.

Embodiment 3

A position sensorless motor control apparatus according to a third embodiment of the invention will be described below. In the position sensorless motor control apparatus of the first embodiment, the phase voltage command values for the three phases, iu*, iv*, and iw*, were generated, and control was performed so that currents would flow in the stator windings 11u, 11v, and 11w as directed by the phase current command values iu*, iv*, and iw*. In the position sensorless motor control apparatus of the third embodiment, on the other hand the phase currents are converted into the γ-axis current value iγ and δ-axis current value iδ on the γ, δ axes of the rotating coordinate system defined by the estimated angle θm, and control is performed so that these current values match the γ-axis current command value iγ* and δ-axis current command value id*, respectively. High resolution and high accuracy angle estimation is then achieved based on the currents flowing in the stator windings and the voltages applied to the stator windings, and also angle estimation is achieved even in the presence of phase voltage saturation.

Figure 13:
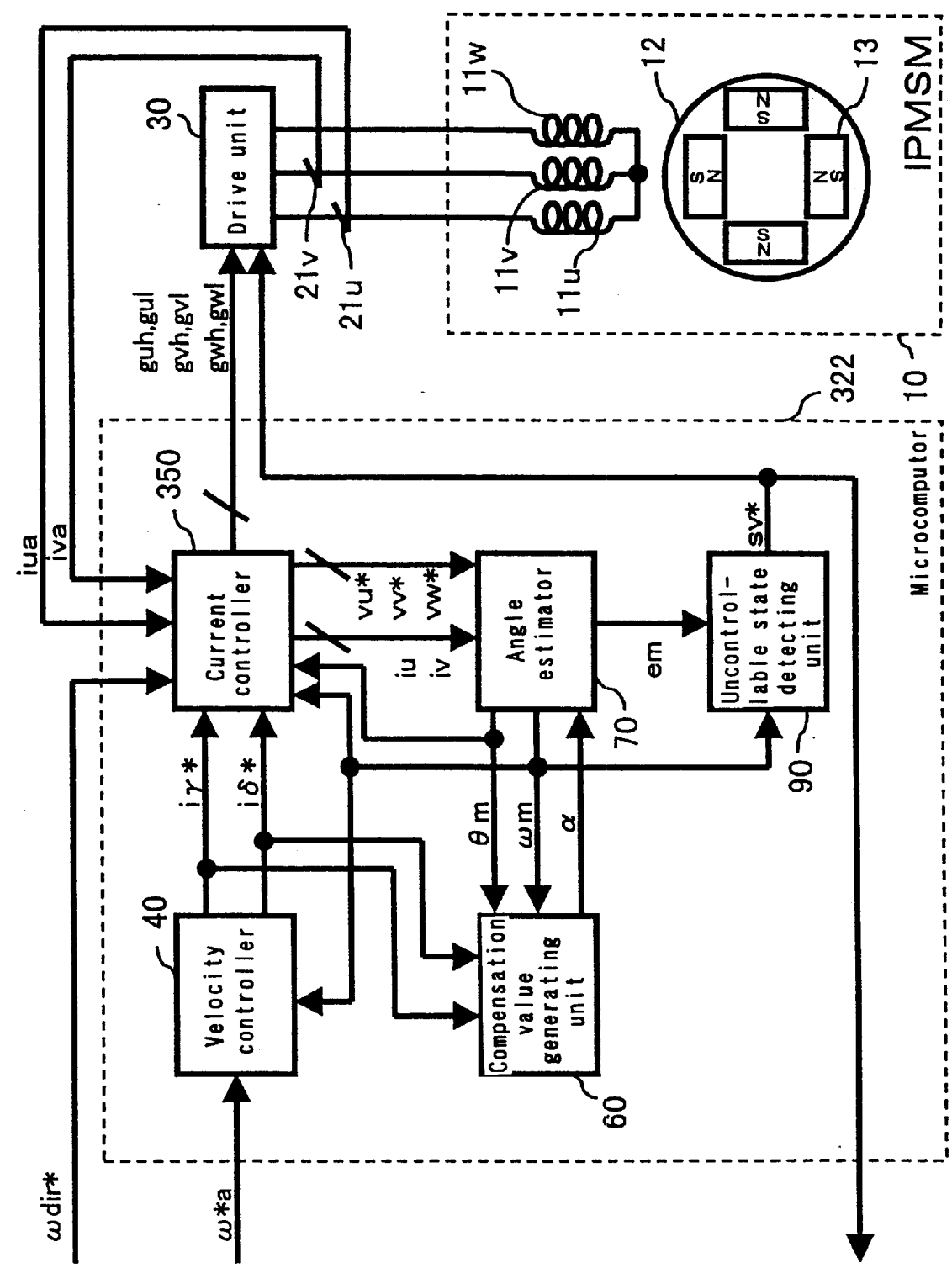
FIG. 13 is a block diagram showing the configuration of a position sensorless motor control apparatus according to a third embodiment.

First, the configuration of the position sensorless motor control apparatus according to the third embodiment will be described. FIG. 13 is a diagram showing the configuration of the position sensorless motor control apparatus according to the third embodiment. Only the microcomputer 322 differs from that of the first embodiment. More specifically, the current controller 350 contained in the microcomputer 322 differs from that of the first embodiment. Otherwise, the configuration is the same as that of the first embodiment, and the same constituent elements as those in the first embodiment will be designated by the same reference numerals and will not be described herein.

Figure 14:
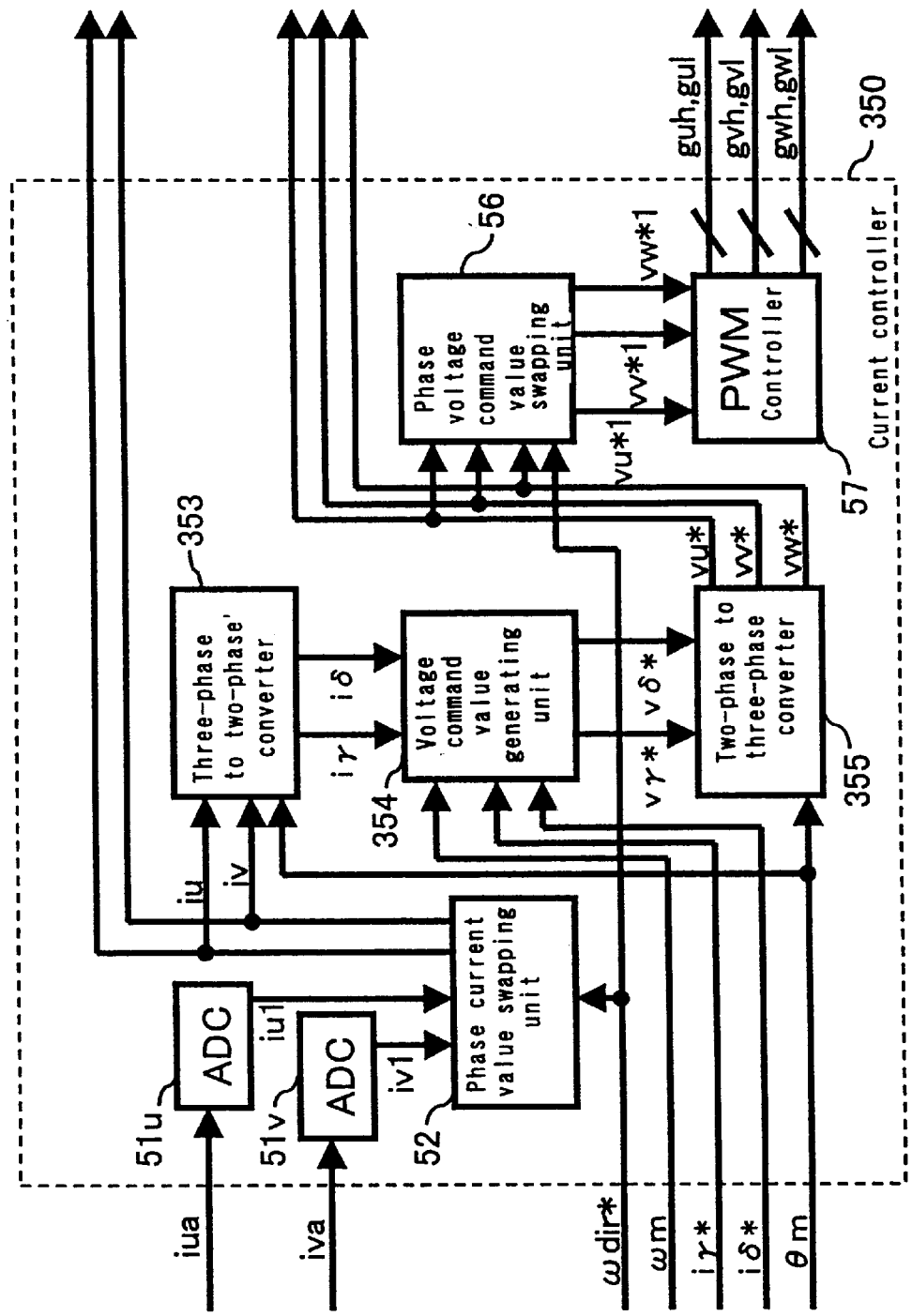
FIG. 14 is a block diagram showing the configuration of a current controller according to the third embodiment.

<Description of FIG. 14>

The current controller 350 takes the analog u-phase current value iua, analog v-phase current value iva, rotational direction command ωdir*, γ-axis current command value iγ* δ-axis current command value iδ*, estimated angle θm, and estimated velocity θm as inputs, and outputs the u-phase current value iu, v-phase current value iv, u-phase voltage command value vu*, v-phase voltage command value vv*, w-phase voltage command value vw*, and switching command signals guh, gul, gvh, gvl, gwh, and gwl.

The current controller 350 comprises: an ADC 51u which takes the analog u-phase current value iua as an input and outputs the pre-swap u-phase current value iu1; an ADC 51v which takes the analog v-phase current value iva as an input and outputs the pre-swap v-phase current value iv1; a phase current value swapping unit 52 which takes the pre-swap u-phase current value iu1, pre-swap v-phase current value iv1, and rotational direction command ωdir* as inputs, and outputs the u-phase current value iu and v-phase current value iv; a three-phase to two-phase converter 353 which takes the u-phase current value iu, v-phase current value iv, and estimated angle θm as inputs, and outputs the γ-axis current value iγ and δ-axis current value iδ; a voltage command value generating unit 354 which takes the γ-axis current value iγ, δ-axis current value iδ, γ-axis current command value iγ*, δ-axis current command value iδ*, and estimated velocity ωm as inputs, and outputs the γ-axis voltage command value vγ* and δ-axis voltage command value vδ*: a two-phase to three-phase converter 355 which takes the γ-axis voltage command value vγ*, δ-axis voltage command value vδ*, and estimated angle θm as inputs, and outputs the u-phase voltage command value vu*, v-phase voltage command value vv*, and w-phase voltage command value vw*; a phase voltage command value swapping unit 56 which takes the u-phase voltage command value vu*, v-phase voltage command value vv*, w-phase voltage command value vw*, and rotational direction command ωdir* as inputs, and outputs the post-swap u-phase voltage command value vu*1, post-swap v-phase voltage command value vv*1, and post-swap w-phase voltage command value vw*1; and a PWM controller 57 which takes the post-swap u-phase voltage command value vu*1, post-swap v-phase voltage command value vv*1, and post-swap w-phase voltage command value vw*1 as inputs, and outputs the switching command signals guh, gul, gvh, gvl, gwh, and gwl.

Next, the operation of the position sensorless motor control apparatus according to the third embodiment will be described the only difference from the first embodiment is the operation of the current controller 350. The operation of the other constituent elements is the same as that in the first embodiment, and will not be described herein.

The current controller 350 is activated at predetermined intervals of time (current control period), and controls the switching signals guh, gul, gvh, gvl, gwh, and gwl so that the currents flow in the stator windings 11u, 11v, and 11w as directed by the γ-axis current command value iγ* and the δ-axis current command value iδ*, by operating the ADCs 51u and 51v, the phase current value swapping unit 52, the three-phase to two-phase converter 353, the voltage command value generating unit 354, the two-phase to three-phase converter 355, the phase voltage command value swapping unit 56, and the PM controller 57 in this order, as described below.

The ADCs 51u and 51v and the phase current value swapping unit 52 are the same as those in the first embodiment, and will not be described here.

The three-phase to two-phase converter 353 converts the current values, indicating the currents flowing in the stator windings 11u, 11v, and 11w, into the γ-axis current value iγ and δ-axis current value iδ on the γ, δ axes of the rotating coordinate system defined by the estimated angle θm. The two-phase to three-phase converter 355, as will be described later, reverses the conversion process of the three-phase to two-phase converter 353 for the voltages applied to the stator windings 11u, 11v, and 11w. More specifically, the three-phase to two-phase converter 353 generates the γ-axis current value iγ and δ-axis current value iγ as shown in the following equations (43) and (44).

$$i\gamma = \{\sqrt{(2)}\} \cdot \{iu \cdot \sin(\theta m + 60°) + iv \cdot \sin \theta m\} \quad (43)$$

$$i\delta = \{\sqrt{(2)}\}\{\cdot iu \cdot \cos(\theta m + 60°) + iv \cdot \cos \theta m\} \quad (44)$$

The voltage command value generating unit 354 controls the γ-axis voltage command value vγ* through proportional integral control (PI control) and non-interacting control so that the γ-axis current value iγ matches the γ-axis current command value iγ*. It also controls the δ-axis voltage command value vδ* through proportional integral control (PI control) and non-interacting control so that the δ-axis current value iδ matches the δ-axis current command value iδ*.

As shown in equation (45) below, the difference between the γ-axis current command value iγ* and the γ-axis current value iγ is subjected to proportional integral control using the proportional gain KPD and integral gain KID, and the result is summed with the resistance R per stator winding phase multiplied by the γ-axis current command value iγ*; from the resulting sum is subtracted the angular velocity ωe multiplied by the q-axis inductance Lq multiplied by the δ-axis current command value iδ*, and the result of the subtraction is taken as the γ-axis voltage command value vγ*. Here, the angular velocity ωe is calculated from the estimated velocity ωm.

$$v\gamma^* = KPD \cdot (i\gamma^* - i\gamma) + KID \cdot \Sigma(i\gamma^* - i\gamma) + R \cdot i\gamma^* - \omega e \cdot Lq \cdot i\delta^* \quad (45)$$

Further, as shown in equation (46) below, the difference between the δ-axis current command value iδ* and the δ-axis current value iδ is subjected to proportional integral control using the proportional gain KPQ and integral gain KIQ, and the result is summed with the phase resistance R multiplied by the δ-axis current command value iδ*; the sum is further summed with the angular velocity ωe multiplied by the d-axis inductance Ld multiplied by the γ-axis current command value iγ*, and the resulting sum is summed with the angular velocity ωe multiplied by the effective value ψ of the dq axis winding flux linkage due to the permanent magnet 13, to calculate the δ-axis voltage command value vδ*.

$$v\delta^*32 \ KPQ \cdot (i\delta^* - i\delta) + KIQ \cdot \Sigma(i\delta^* - i\delta) + R \cdot i\delta^* + \omega e \cdot Ld \cdot i\gamma^* + \omega e \cdot \psi \quad (46)$$

The two-phase to three-phase converter 355 converts the γ-axis voltage command value vγ* and δ-axis voltage command value vδ* on the γ, δ axes of the rotating coordinate system defined by the estimated angle θm into a stationary coordinate system, and produces the u-phase voltage command value vu*, v-phase voltage command value vv*, w-phase voltage command value vw* for application to the respective stator windings 11u, 11v, and 11w. More specifically, this is done as shown by the following equations (47), (48), and (49). However, since the drive unit 30 cannot apply voltages greater than the voltage of the power supply 31 to the stator windings 11u, 11v, and 11w, limits as defined by the equations (15), (17), and (19) are imposed.

$$vu^* = \{\sqrt{(2/3)}\} \cdot \{v\gamma^* \cdot \cos \theta m - v\delta^* \cdot \sin \theta m\} \quad (47)$$

$$vv^* = \{\sqrt{(2/3)}\} \cdot \{v\gamma^* \cdot \cos (\theta m - 120°) - v\delta^* \cdot \sin(\theta m - 120°)\} \quad (48)$$

$$vw^* = \{\sqrt{(2/3)}\} \cdot \{v\gamma^* \cdot \cos (\theta m + 120°) - v\delta^* \cdot \sin(\theta m + 120°)\} \quad (49)$$

The operation of the phase voltage command value swapping unit 56 and PWM controller 57 is the same as that in the first embodiment, and will not be described herein.

The operation of other constituent elements is the same as that in the first embodiment, and will not be described herein.

The position sensorless motor control apparatus of the first embodiment generated the phase voltage command values vu*, vv*, and vw* for the three phases, and controlled the currents based on these command values. If the currents are controlled on the γ, δ axes of the rotating coordinate system defined by the estimated angle θm, as in the position sensorless motor control apparatus of the third embodiment, the operation is fundamentally the same as that in the first embodiment, and the same effect as achieved in the first embodiment can be obtained.

Embodiment 4

A position sensorless motor control apparatus according to a fourth embodiment of the invention will be described below. The position sensorless motor control apparatus of the first embodiment obtained the back electromotive force values using strict phase voltage equations. By contrast, the position sensorless motor control apparatus of the fourth embodiment obtains the back electromotive force values using simplified phase voltage equations, and reduces the computation time for the angle estimation.

Figure 15:
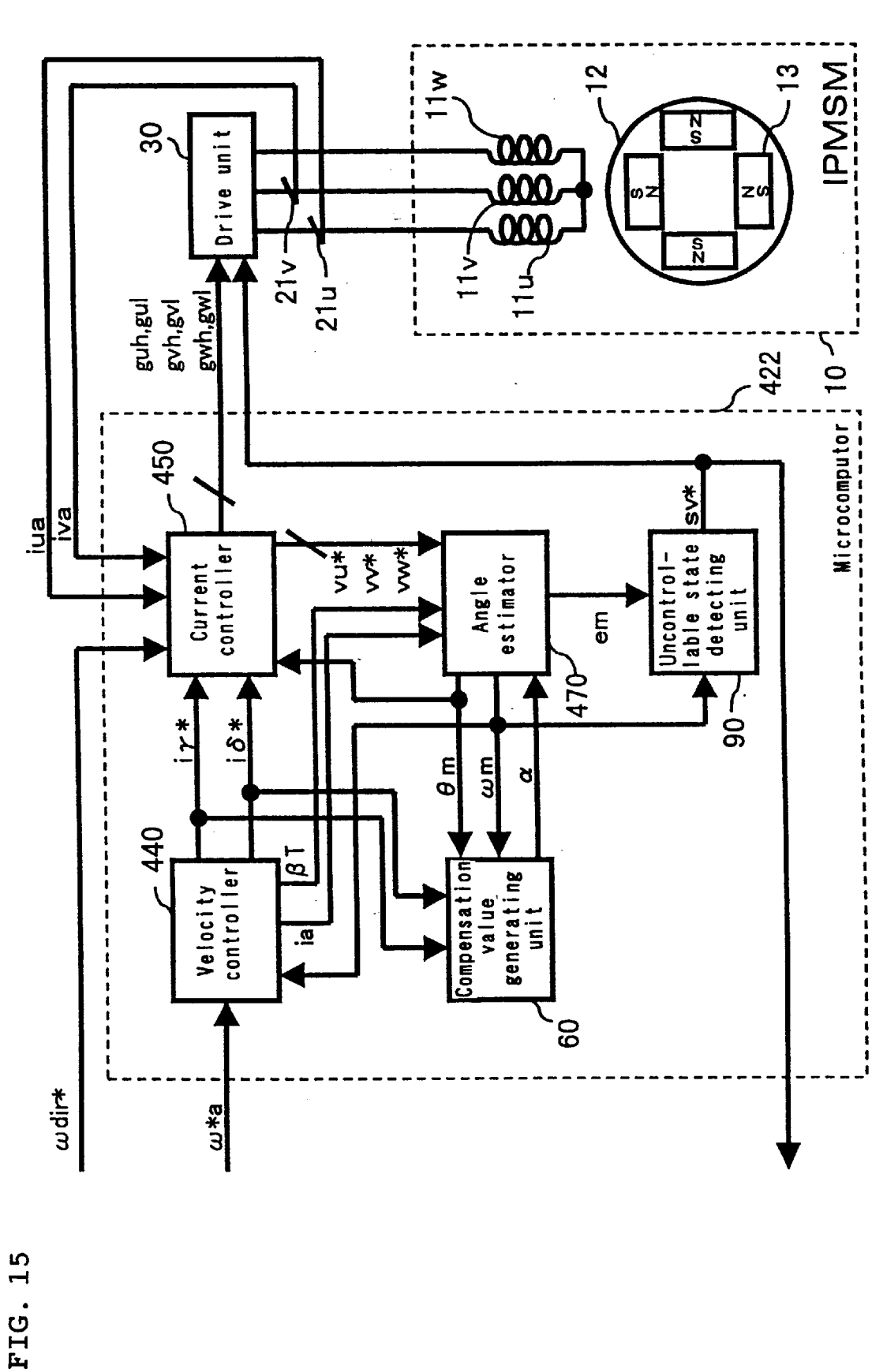
FIG. 15 is a block diagram showing the configuration of a position sensorless motor control apparatus according to a fourth embodiment.

<Description of FIG. 15>

First, the configuration of the position sensorless motor control apparatus according to the fourth embodiment will be described.

Figure 16:
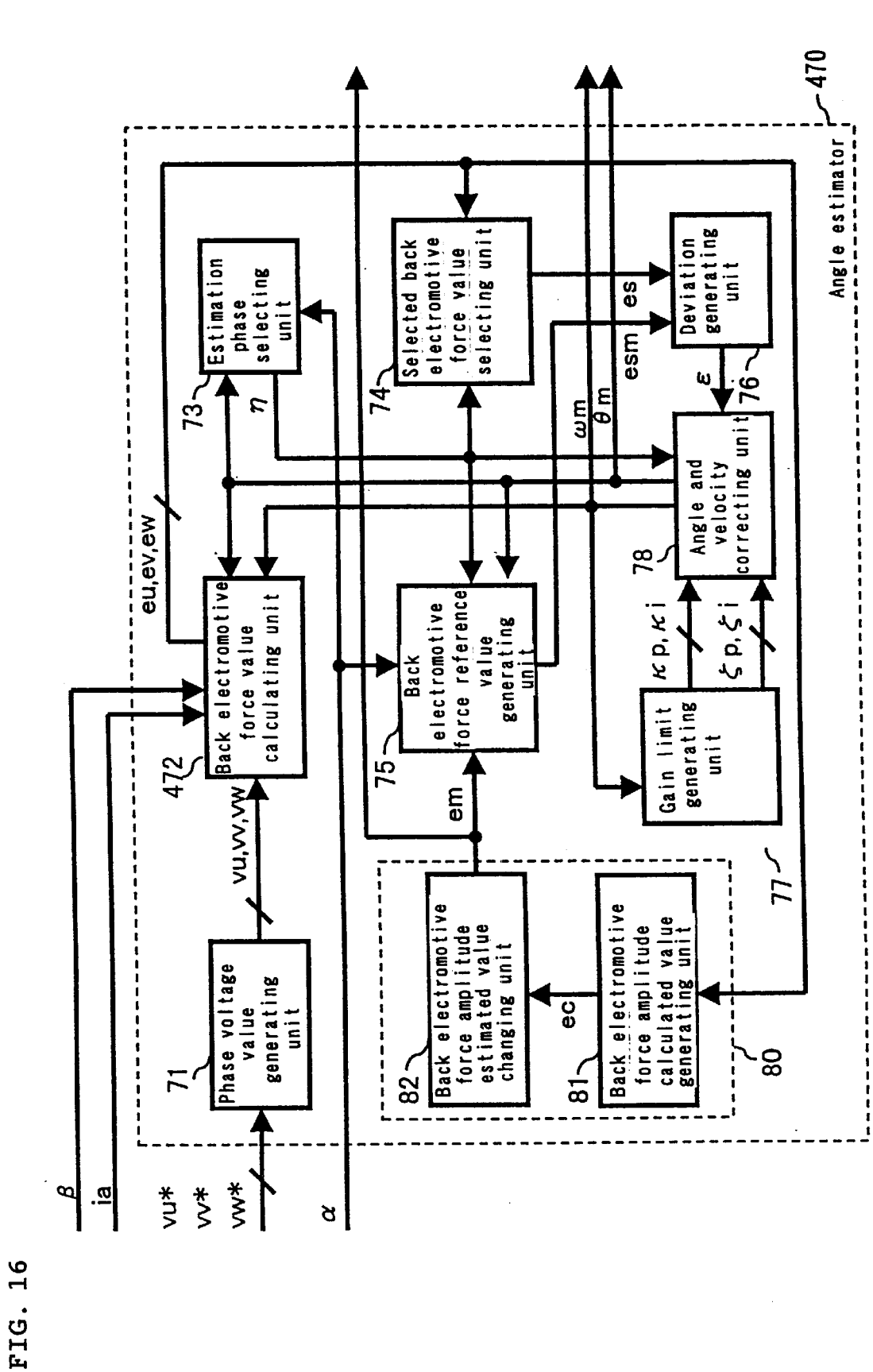
FIG. 16 is a block diagram showing the configuration of an angle estimator according to the fourth embodiment.

FIG. 15 is a block diagram showing the configuration of the position sensorless motor control apparatus according to the fourth embodiment, and FIG. 16 is a block diagram showing the configuration of the angle estimator according to the fourth embodiment. Only the microcomputer 422 differs from that of the first embodiment. More specifically, the velocity controller 440, current controller 450, and angle estimator 470 contained in the microcomputer 422 differ from those of the first embodiment. Further, the back electromotive force value calculating unit 472 in the angle estimator 470 differs from that of the first embodiment. Otherwise, the configuration is the same as that of the first embodiment, and the same constituent elements as those in the first embodiment will be designated by the same reference numerals and will not be described herein.

The velocity controller 440 takes the analog velocity command value ω*a and estimated velocity ωm as inputs, and outputs the γ-axis current command value iγ*, δ-axis current command value iδ*, current command amplitude ia, and current command phase βT. The current controller 450 takes the analog u-phase current value iua, analog v-phase current value iva, rotational direction command ωdir*, γ-axis current command value iγ*, δ-axis current command value iδ*, and estimated angle θm as inputs, and outputs the u-phase voltage command value vu*, v-phase voltage command value vv*, w-phase voltage command value vw*, and the switching command signals guh, gul, gvh, gvl, gwh, and gwl. The angle estimator 470 takes the current command amplitude ia, current command phase βT, u-phase voltage command value vu*, v-phase voltage command value vv*, w-phase voltage command value vw*, and compensation value α as inputs, and outputs the estimated angle θm, estimated velocity ωm, and back electromotive force amplitude estimated value em.

Next, the operation of the position sensorless motor control apparatus of the fourth embodiment will be described the velocity controller 440 and current controller 450 are similar in operation to the velocity controller 40 and current controller 50 in the first embodiment, only difference being in their outputs. The configuration other than the back electromotive force value calculating unit 472 is the same as that of the third embodiment. Therefore, the configuration other than the back electromotive force value calculating unit 472 will not be described herein.

<Description of FIG. 16>

The back electromotive force value calculating unit 472 produces the back electromotive force values for the respective phases (the u-phase back electromotive force value eu, v-phase back electromotive force value ev, and w-phase back electromotive force value ew). The phase voltage equation of each phase is solved for the back electromotive force value, and then simplified. More specifically, assuming that the phase current values iu, iv, and iw are sinusoidal, the phase currents iu, iv, and iw are created from the current command amplitude ia and current command phase βT, and these values are substituted into the equations (26), (27), and (28), which are simplified to obtain the following equations (50), (51), and (52).

$$eu = vu + R \cdot ia \cdot \sin(\theta m + \beta T) + 1.5 \cdot (la + La) \cdot \cos(\theta m + \beta T) - 1.5 \cdot Las \cdot \cos(\theta m - \beta T) \quad (50)$$

$$ev = vv + R \cdot ia \cdot \sin(\theta m + \beta T - 120°) + 1.5 \cdot (la + La) \cdot \cos(\theta m + \beta T - 120°) - 1.5 \cdot Las \cdot \cos(\theta m - \beta T - 120°) \quad (51)$$

$$ew = vw + R \cdot ia \cdot \sin(\theta m + \beta T - 240°) + 1.5 \cdot (la + La) \cdot \cos(\theta m + \beta T - 240°) - 1.5 \cdot Las \cdot \cos(\theta m - \beta T - 240°) \quad (52)$$

The position sensorless motor control apparatus of the first embodiment obtained the back electromotive force values using strict phase voltage equations. If the back electromotive force values are obtained using simplified phase voltage equations, as in the position sensorless motor control apparatus of the fourth embodiment, the operation is fundamentally the same as that in the first embodiment, and the same effect as achieved in the first embodiment can be obtained.

Further, since the phase voltage value for each phase is simplified compared with the first embodiment, the fourth embodiment achieves a position sensorless motor control apparatus that reduces the time required for the computation of the back electromotive force values (u-phase back electromotive force value eu, v-phase back electromotive force value ev, and w-phase back electromotive force value ew).

Furthermore, by using the phase current values whose waveforms are assumed to be sinusoidal, the fourth embodiment achieves a position sensorless motor control apparatus that estimates the angle without being affected by noise if noise is contained in the analog phase current values iua and iva detected by the current sensors 21u and 21v.

Embodiment 5

A position sensorless motor control apparatus according to a fifth embodiment of the invention will be described below. The position sensorless motor control apparatus of the first embodiment switched the estimation phase according to the estimated angle θm. By contrast, the position sensorless motor control apparatus of the fifth embodiment selects as the estimation phase the phase the magnitude of whose back electromotive force value is the smallest of all the phases.

Figure 17:
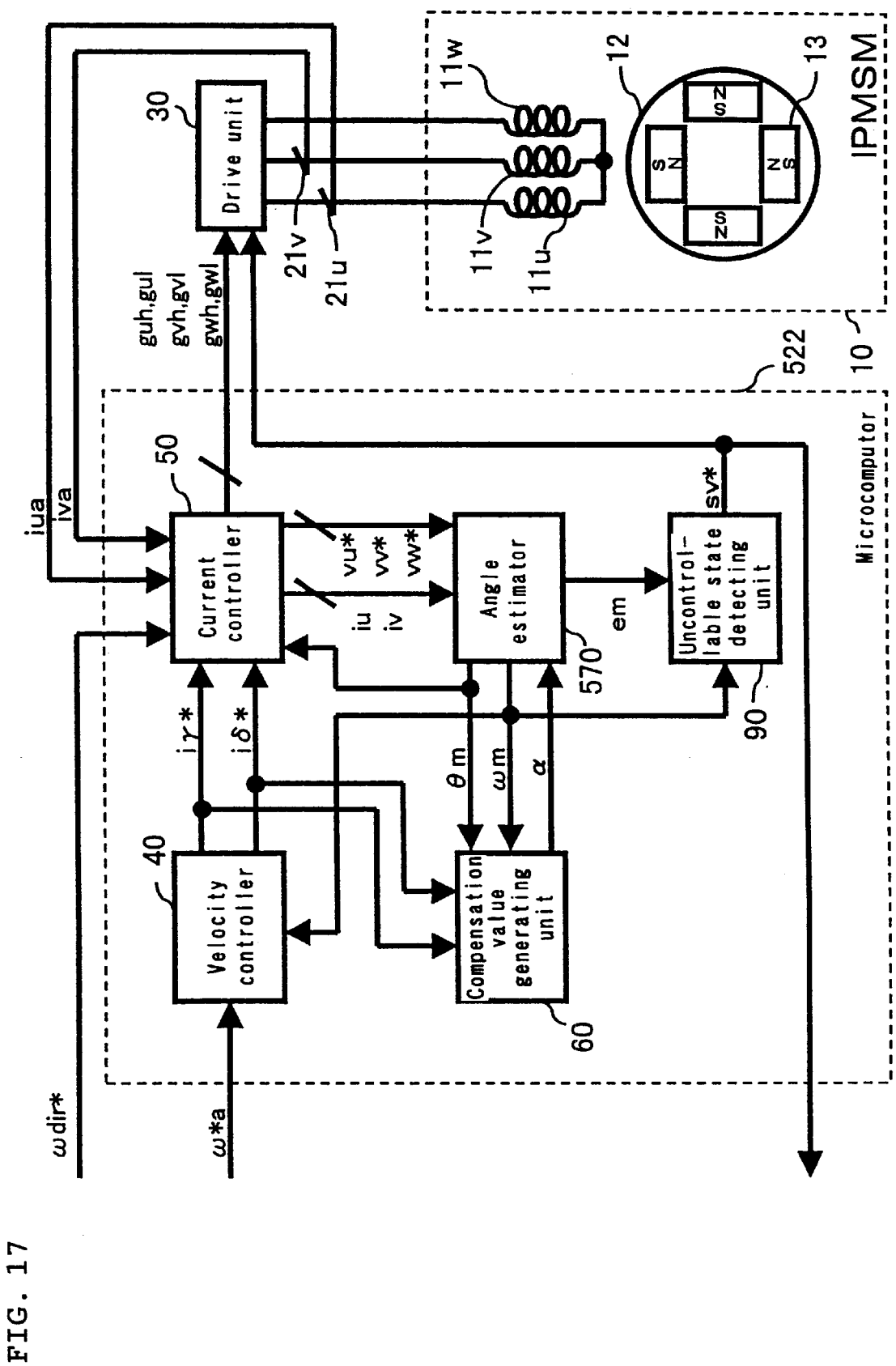
FIG. 17 is a block diagram showing the configuration of a position sensorless motor control apparatus according to a fifth embodiment.
Figure 18:
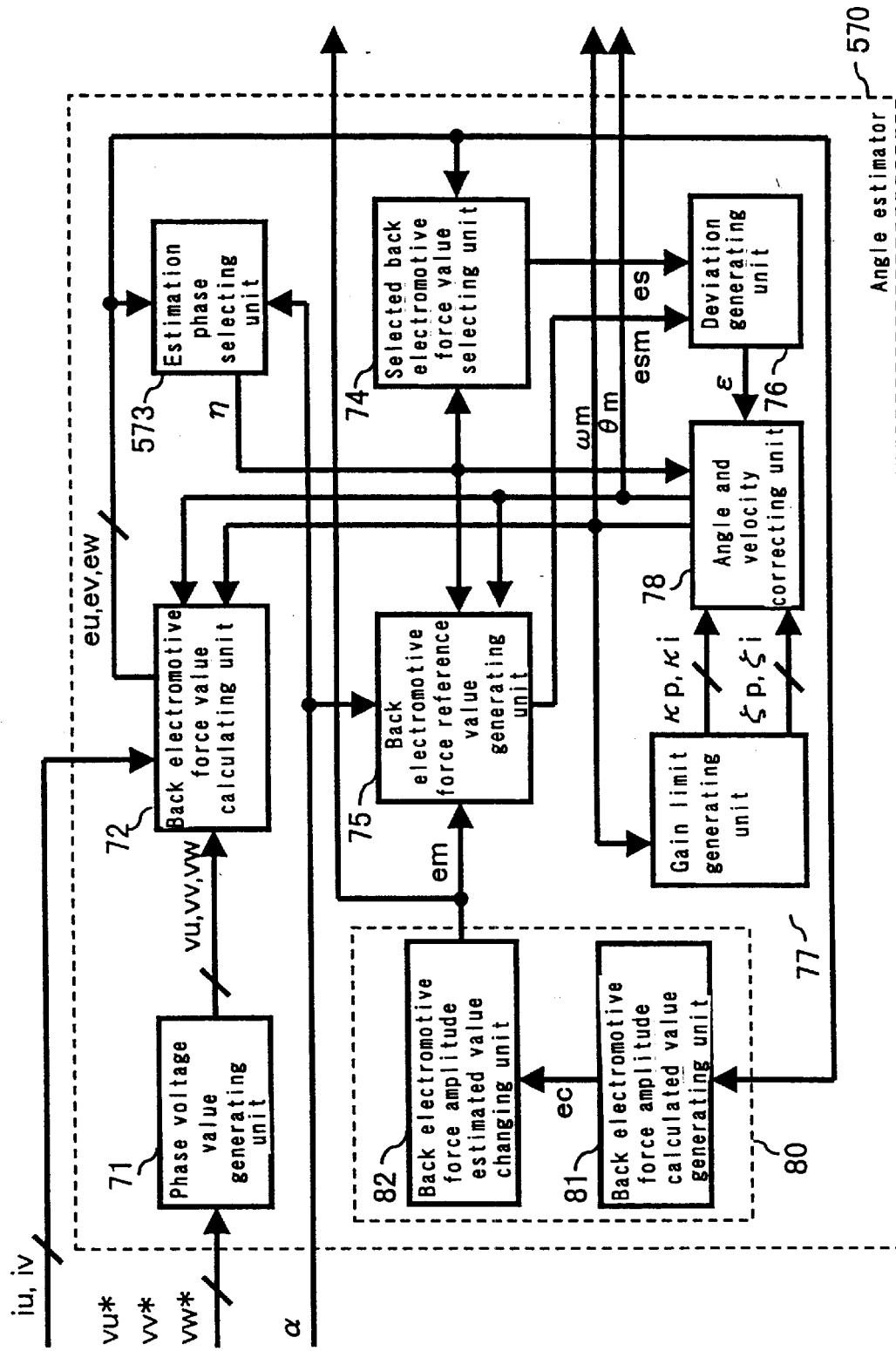
FIG. 18 is a block diagram showing the configuration of an angle estimator according to the fifth embodiment.

<Description of FIGS. 17 and 18>

First, the configuration of the position sensorless motor control apparatus according to the fifth embodiment will be described.

FIG. 17 is a block diagram showing the configuration of the position sensorless motor control apparatus according to the fifth embodiment, and FIG. 18 is a block diagram showing the configuration of the angle estimator 570 according to the fifth embodiment. Only the microcomputer 522 differs from that of the first embodiment. More specifically, the angle estimator 570 contained in the microcomputer 522 differs from that of the first embodiment. More particularly, the estimation phase selecting unit 573 in the angle estimator 570 differs from that of the first embodiment. Otherwise, the configuration is the same as that of the first embodiment, and the same constituent elements as those in the first embodiment will be designated by the same reference numerals and will not be described herein.

Figure 19:
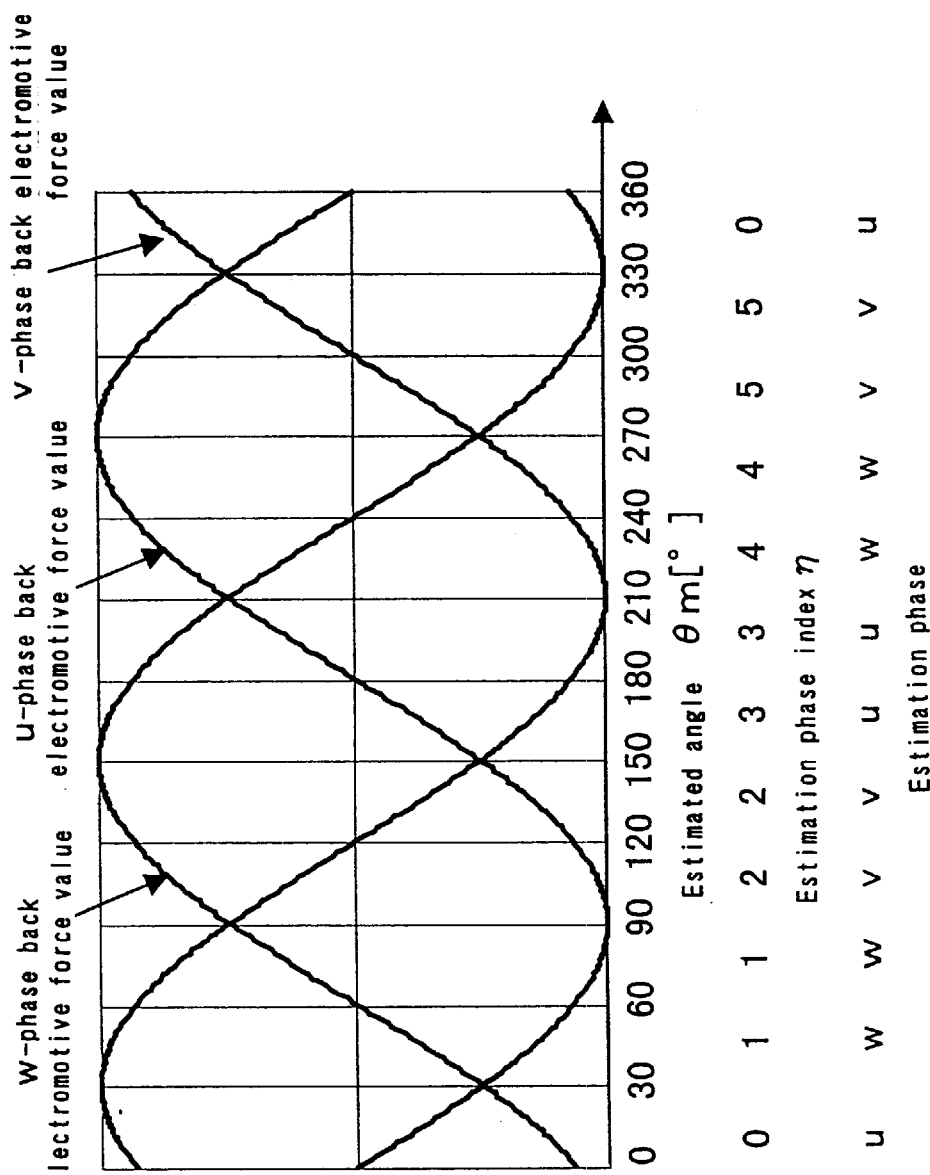
FIG. 19 is a waveform diagram showing the relationship between the back electromotive force value of each phase and the estimation phase index according to the fifth embodiment.

<Description of FIG. 19>

Next, the operation of the position sensorless motor control apparatus according to the fifth embodiment will be described.

The estimation phase selecting unit 573 selects as the estimation phase the phase the magnitude of whose back electromotive force value is the smallest of all the phases. FIG. 19 is a waveform diagram showing the relationship between the back electromotive force value for each phase and the estimation phase index. As shown in equation (53) below and FIG. 19, when the phase the magnitude of whose back electromotive force value is the smallest of all the phases is the u phase, and when the v-phase back electromotive force value is positive and the w-phase back electromotive force value is negative, then the estimation phase index is set to 0 and the u phase is selected as the estimation phase. For other cases also, the estimation phase index η and the estimation phase are determined from the following equation (53) and FIG. 19.

$$\begin{aligned}
&\eta=0 \text{ estimation phase=u phase (when } |eu| \text{ is the smallest, and } ev>0 \text{ and } ew<0) \\
&\eta=1 \text{ estimation phase=w phase (when } |ew| \text{ is the smallest, and } ev>0 \text{ and } eu<0) \\
&\eta=2 \text{ estimation phase=v phase (when } |ev| \text{ is the smallest, and } ew>0 \text{ and } eu<0) \\
&\eta=3 \text{ estimation phase=u phase (when } |eu| \text{ is the smallest, and } ew>0 \text{ and } ev<0) \\
&\eta=4 \text{ estimation phase=w phase (when } |ew| \text{ is the smallest, and } eu>0 \text{ and } ev<0) \\
&\eta=5 \text{ estimation phase=v phase (when } |ev| \text{ is the smallest, and } eu>0 \text{ and } ew<0)
\end{aligned} \quad (53)$$

The position sensorless motor control apparatus of the first embodiment switched the estimation phase according to the estimated angle θm. If the phase the magnitude of whose back electromotive force value. is the smallest of all the phases is selected as the estimation phase, as in the position sensorless motor control apparatus of the fifth embodiment, the operation is fundamentally the same as that in the first embodiment, and the same effect as achieved in the first embodiment can be obtained.

Embodiment 6

A position sensorless motor control apparatus according to a sixth embodiment of the invention will be described below. The position sensorless motor control apparatus of the first embodiment corrected the estimated angle θm based on the deviation between the back electromotive force value and the back electromotive force reference value esm. The position sensorless motor control apparatus of the sixth embodiment greatly simplifies the phase voltage equations, produces a phase voltage reference value, obtains the deviation between the phase voltage value and the phase voltage reference value, and corrects the estimated angle θm so that the deviation converges to 0.

Of the coefficients in the phase voltage equation of each stator winding phase, the position sensorless motor control apparatus of the first embodiment corrected the back electromotive force amplitude. By contrast, the position sensorless motor control apparatus of the sixth embodiment corrects the phase voltage amplitude.

The position sensorless motor control apparatus of the sixth embodiment then achieves high resolution and high accuracy angle estimation, achieves angle estimation even in the presence of phase voltage saturation, and achieves high accuracy angle estimation even when motor constants change.

Figure 20:
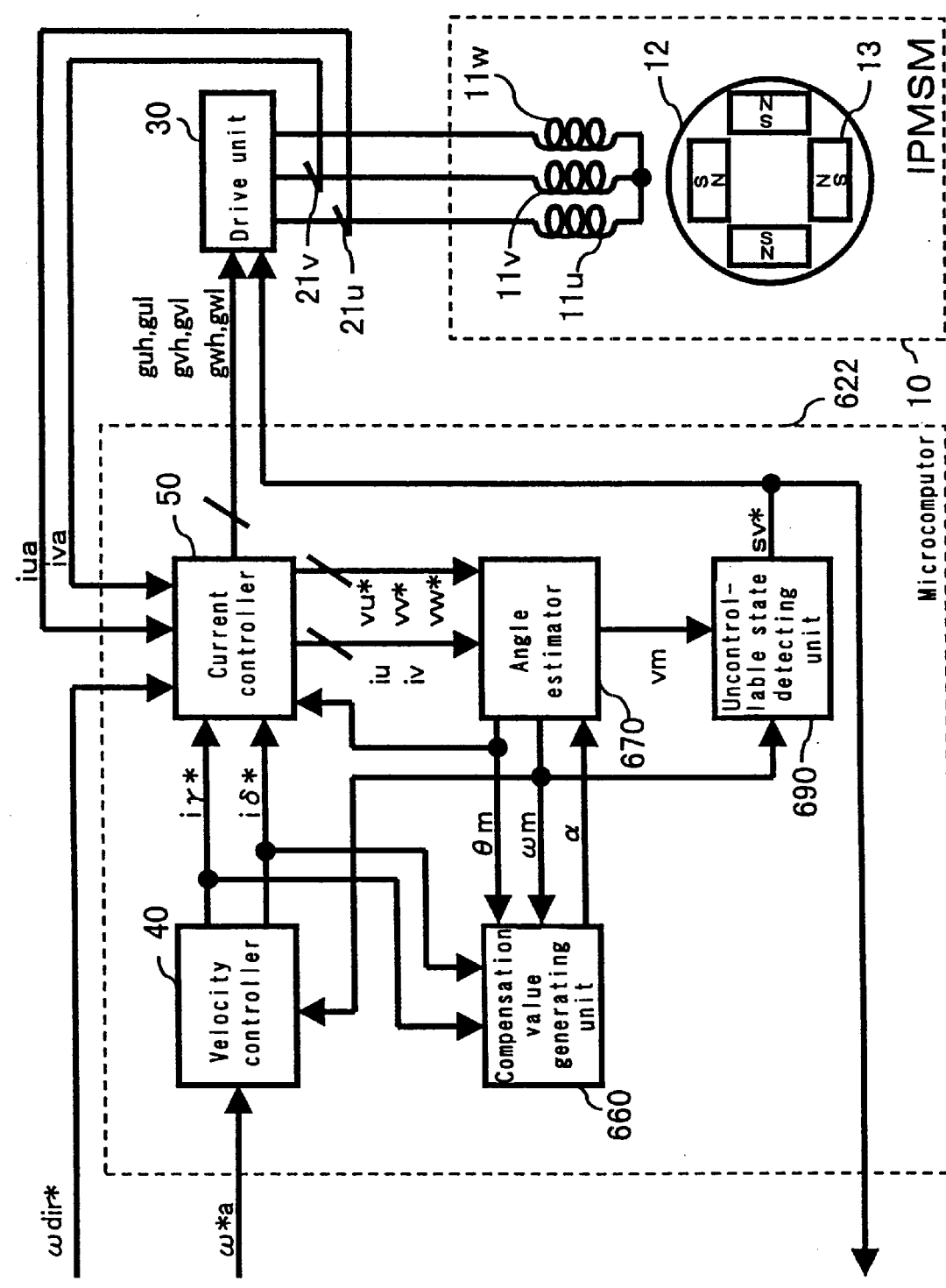
FIG. 20 is a block diagram showing the configuration of a position sensorless motor control apparatus according to a sixth embodiment.

<Description of FIG. 20>

First, the configuration of the position sensorless motor control apparatus according to the sixth embodiment will be described.

FIG. 20 is a block diagram showing the configuration of the position sensorless motor control apparatus according to the sixth embodiment. In the position sensorless motor control apparatus of the sixth embodiment, the microcomputer 622 differs from that of the first embodiment. More specifically, the compensation value generating unit 660, angle estimator 670, and uncontrollable state detecting unit 690 contained in the microcomputer 622 are different from those in the first embodiment. Otherwise, the configuration is the same as that of the first embodiment, and the same constituent elements will be designated by the same reference numerals and will not be described herein.

In the first embodiment, the angle estimator 70 output the back electromotive force amplitude estimated value em for input to the uncontrollable state detecting unit 90. In the sixth embodiment, the back electromotive force amplitude estimated value em is replaced by a phase voltage amplitude estimated value vm. More specifically, in the sixth embodiment, the angle estimator 670 outputs the phase voltage amplitude estimated value vm for input to the uncontrollable state detecting unit 690.

Figure 21:
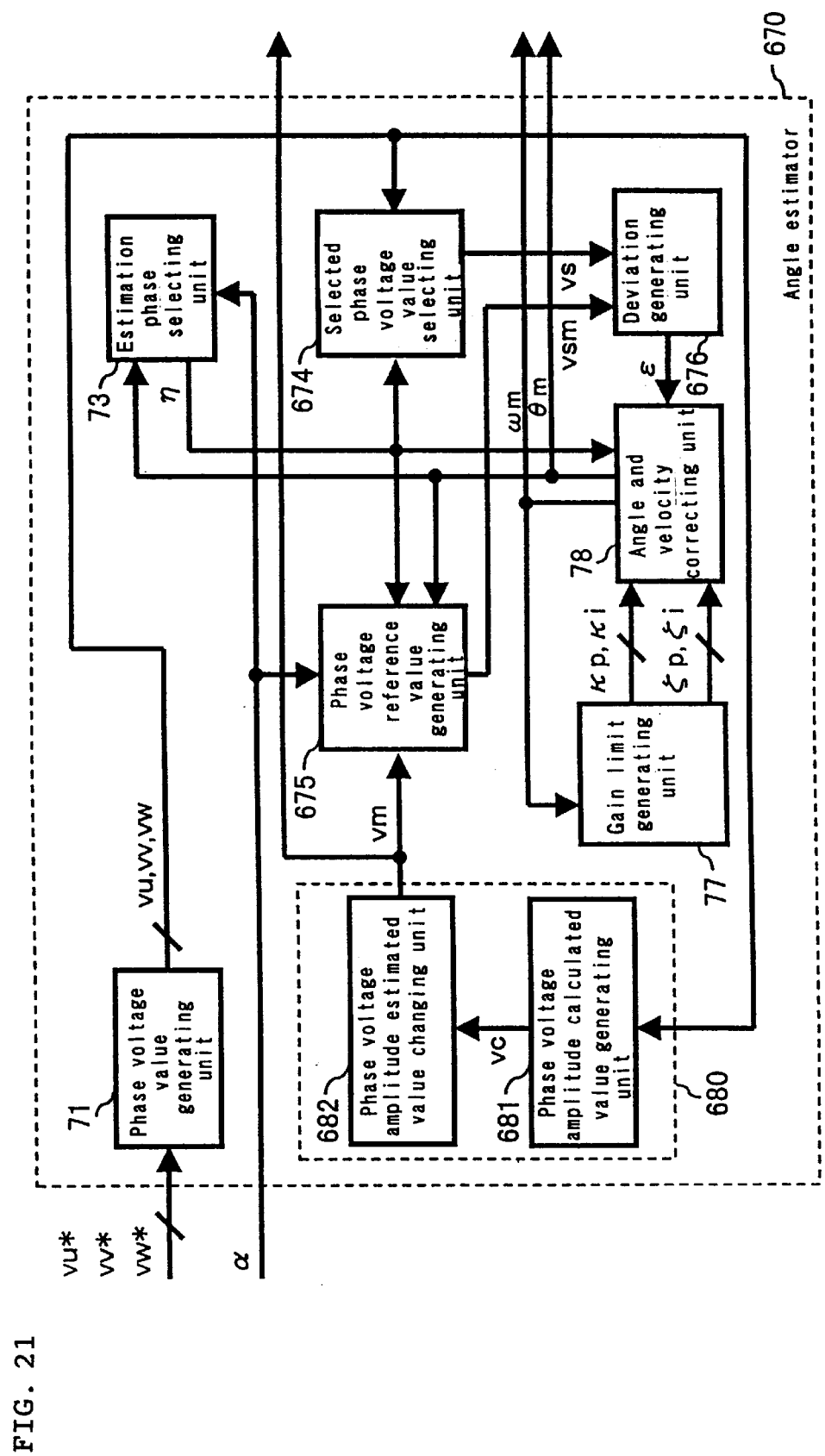
FIG. 21 is a block diagram showing the configuration of an angle estimator according to the sixth embodiment.

<Description of FIG. 21>

FIG. 21 is a block diagram showing the configuration of the angle estimator 670 according to the sixth embodiment. The angle estimator 670 comprises: a phase voltage value generating unit 71 which takes the u-phase voltage command value vu*, v-phase voltage command value vv*, and w-phase voltage command value vw* as inputs, and outputs the u-phase voltage value vu, v-phase voltage value vv, and w-phase voltage value vw; an estimation phase selecting unit 73 which takes the estimated angle θm and compensation value α as inputs, and outputs the estimation phase index η; a selected phase voltage value selecting unit 674 which takes the estimation phase index η, u-phase voltage value vu, v-phase voltage value vv, and w-phase voltage value vw as inputs, and outputs a selected phase voltage value vs; a phase voltage reference value generating unit 675 which takes the estimation phase index η, estimated angle θm, compensation value α, and phase voltage amplitude estimated value vm as inputs, and outputs a phase voltage reference value vsm; a deviation generating unit 676 which takes the selected phase voltage value vs and phase voltage reference value vsm as inputs, and outputs the deviation ε; a gain limit generating unit 77 which takes the estimated velocity ωm as an input, and outputs the proportional gain κp, integral gain κi, proportional limit ζp, and integral limit ζi; an angle and velocity correcting unit 78 which takes the estimation phase index η, deviation ε, proportional gain κp, integral gain κi, proportional limit ζp, and integral limit ζi as inputs, and outputs the estimated angle θm and estimated velocity ωm; and a phase voltage amplitude estimated value correcting unit 680 which takes the u-phase voltage value vu, v-phase voltage value vv, and w-phase voltage value vw as inputs, and outputs the phase voltage amplitude estimated value vm.

The phase voltage amplitude estimated value correcting unit 680 comprises: a phase voltage amplitude calculated value generating unit 681 which takes the u-phase voltage value vu. v-phase voltage value vv, and w-phase voltage value vw as inputs, and outputs a phase voltage amplitude calculated value vc; and a phase voltage amplitude estimated value changing unit 682 which takes the phase voltage amplitude calculated value vc as an input and outputs the phase voltage amplitude estimated value vm.

Figure 22:
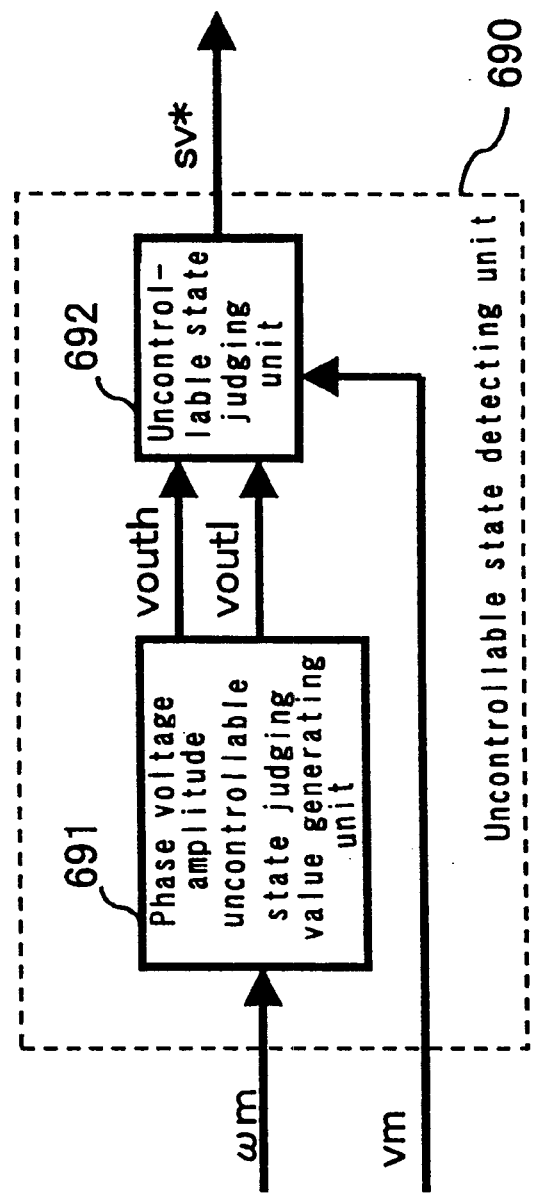
FIG. 22 is a block diagram showing the configuration of an uncontrollable state detecting unit according to the sixth embodiment.

<Description of FIG. 22>

FIG. 22 is a block diagram showing the configuration of the uncontrollable state detecting unit 690 according to the sixth embodiment. The uncontrollable state detecting unit 690 comprises: a phase voltage uncontrollable state judging value generating unit 691 which takes the estimated velocity θm as an input, and outputs a phase voltage amplitude upper bound value vouth for the judgement of an uncontrollable state and a phase voltage amplitude lower bound value voutl for the judgement of an uncontrollable state; and an uncontrollable state judging unit 692 which takes the phase voltage amplitude upper bound value vouth and lower bound value voutl and the phase voltage reference value vm as inputs, and outputs the servo-on signal sv*.

Next, the operation of the position sensorless motor control apparatus according to the sixth embodiment will be described.

The operation of the constituent elements other than the compensation value generating unit 660, angle estimator 670, and uncontrollable state detecting unit 690 is the same as that of the first embodiment, and will not be described herein.

First, the basic principle of angle estimation in the position sensorless motor control apparatus of the sixth embodiment will be described.

The voltage equations on the d, q axes are expressed as shown in equation (54) below. When the d-axis current value id and q-axis current value iq are controlled the d-axis voltage value dv and q-axis voltage value vq are uniquely determined, so that the voltage phase βv is also uniquely determined and given by equation (55) below.

$$vd = R \cdot id - \omega e \cdot Lq \cdot iq$$

$$vq = R \cdot iq + \omega e(\psi + Ld \cdot id) \tag{54}$$

$$\beta v = -a\tan[\{R \cdot id - \omega e \cdot Lq \cdot iq\}/\{(R \cdot iq + \omega e \cdot (\psi + Ld \cdot id)\}] \tag{55}$$

Here, the phase voltage reference value vsm having this voltage phase is generated, and the estimated angle θm and the phase voltage amplitude estimated value vm representing the amplitude of the phase voltage reference value are corrected so that the phase voltage matches the phase voltage reference value vsm. The angle estimation is thus accomplished.

A principle similar to that used in the first embodiment is used to make both values match. When determining the voltage phase, instead of using the d-axis current value id and q-axis current value iq, the command values on their estimated axes γ, δ, i.e., the γ-axis current command value iγ* and δ-axis current command value iδ*, are used. The voltage phase is included in the compensation value α.

The method for detecting an uncontrollable state is also changed. As the rotational speed of the rotor 12 increases, a larger phase voltage needs to be applied since the back electromotive force increases. As a result, the phase voltage command generated by the current controller 50 increases in amplitude.

In the first embodiment, an uncontrollable state was detected using the characteristic that the amplitude of the back electromotive force is proportional to velocity. Since the amplitude of the phase voltage command value also tends to increase with increasing velocity, in the sixth embodiment an uncontrollable state is detected in a manner similar to that employed in the first embodiment, by using the amplitude of the phase voltage command value.

The operation of the position sensorless motor control apparatus according to the sixth embodiment will now be described in detail.

First, the operation of the compensation value generating unit 660 will be described.

The compensation value generating unit 660 operates each time the operation of the current controller 50 ends. The compensation value generating unit 660 generates the compensation value α indicating an amount by which the angle estimation θm in the angle estimator 670 is compensated. The compensation amount α is the sum of the voltage phase and the angle estimation error.

First, voltage phase component (α1) is created. This is expressed as shown in equation (56) below by rewriting the equation (55) using the γ-axis current command value iγ* and δ-axis current command value iδ*. Next, angle estimation error component (α2) is created. This is done in the same manner as in the first embodiment, as shown by equation (57) below. The sum of the two components is taken as the compensation value α, as shown in equation (58) below.

$$\alpha 1 = -a\ \tan[\{R \cdot i\gamma^* - \omega e \cdot Lq \cdot i\delta^*\}/\{(R \cdot i\delta^* + \omega e \cdot (\psi + Ld \cdot i\gamma^*)\}] \quad (56)$$

$$\alpha 2 = \alpha \text{table}(\theta m\ \%\ 60°,\ \omega m,\ i\gamma^*,\ i\delta^*) \quad (57)$$

$$\alpha = \alpha 1 + \alpha 2 \quad (58)$$

The operation of the angle estimator 670 will be described next.

The phase voltage value generating unit 71 and the estimation phase selecting unit 73 are the same as those in the first embodiment, and the operation thereof will not be described herein.

The selected phase voltage value selecting unit 674 selects the phase voltage value of the estimation phase as the selected phase voltage value vs. As shown in equation (59) below, when the estimation phase index η=0 or 3, the u-phase voltage value vu is selected as the selected phase voltage value vs. Likewise, when the estimation phase index η=2 or 5, the v-phase voltage value ev is selected as the selected phase voltage value vs. Further, when the estimation phase index η=1 or 4, the w-phase voltage value vw is selected as the selected phase voltage value vs.

$$vs = vu\ (\text{when}\ \eta = 0, 3)$$

$$vs = vv\ (\text{when}\ \eta = 2, 5)$$

$$vs = vw\ (\text{when}\ \eta = 1, 4) \quad (59)$$

The phase voltage reference value generating unit 675 generates the phase voltage reference value vsm which is the reference value for the phase voltage value of the estimation phase. As shown in equation (60) below, when the estimation phase index η=0 or 3, the phase voltage reference value for the u phase (the u-phase voltage reference value vum) is selected as the phase voltage reference value vsm. Likewise, when the estimation phase index η=2 or 5, the phase voltage reference value for the v phase (the v-phase voltage reference value vvm) is selected as the phase voltage reference value vsm. Further, when the estimation phase index η=1 or 4, the phase voltage reference value for the w phase (the w-phase voltage reference value vwm) is selected as the phase voltage reference value vsm.

$$vsm = vum\ (\text{when}\ \eta = 0, 3)$$

$$vsm = vvm\ (\text{when}\ \eta = 2, 5)$$

$$vsm = vwm\ (\text{when}\ \eta = 1, 4)$$

$$vum = -vm \cdot \sin(\theta m + \alpha)$$

$$vvm = -vm \cdot \sin(\theta m + \alpha - 120°)$$

$$vwm = -vm \cdot \sin(\theta m + \alpha - 240°) \quad (60)$$

The deviation generating unit 76 generates the deviation ε representing the difference between the selected phase voltage value vs and the phase voltage reference value vsm. As shown in equation (61) below, the deviation ε is obtained by subtracting the phase voltage reference value vsm from the selected phase voltage value vs.

$$\epsilon = vs - vsm \quad (61)$$

The gain limit generating unit 77 and the angle and velocity correcting unit 78 are the same as those in the first embodiment, and the operation thereof will not be described herein.

The phase voltage amplitude calculated value generating unit 681 generates the phase voltage amplitude calculated value vc based on the sum of the absolute values of the phase voltage values for the respective phases. As shown in equation (62) below, the absolute value of the u-phase voltage value vu, the absolute value of the v-phase voltage value wv, and the absolute value of the w-phase voltage value vw are summed together, and the resulting sum multiplied by a predetermined coefficient KEC is taken as the phase voltage amplitude calculated value vc. Here, the coefficient KEC is given as previously shown by equation (40) and, assuming that each phase is sinusoidal, is used to multiply the sum of the absolute values of the respective phases to convert the sum into the amplitude.

$$vc = KEC \cdot (|vu| + |vv| + |vw|) \quad (62)$$

The phase voltage amplitude estimated value changing unit 682 takes the phase voltage amplitude calculated value vc, processed through a first-order digital low pass filter (LPF), as the phase voltage amplitude estimated value vm. More specifically, this is done as shown by equation (63) below. In the equation, vm(n) is the present phase voltage amplitude estimated value, and vm(n−1) is the previous phase voltage amplitude estimated value. KLEM is the low pass filter coefficient which takes a value between 0 and 1, and the effect of the filter increases as KLEM decreases.

The low pass filter obtains an error (amplitude error) between the phase voltage amplitude calculated value vc and the previous phase voltage amplitude estimated value vm(n−

1), and multiplies it by the coefficient KLEM and adds the result of the multiplication to the previous phase voltage amplitude estimated value vm(n−1) to produce the present phase voltage amplitude estimated value vm(n). Using the low pass filter in this way, the amplitude error is calculated, and the phase voltage amplitude estimated value vm(n) is corrected in such a manner as to reduce the amplitude error.

$$vm(n)=KLEM\cdot vc+(1-KLEM)\cdot vm(n-1) \quad (63)$$

Figure 23:
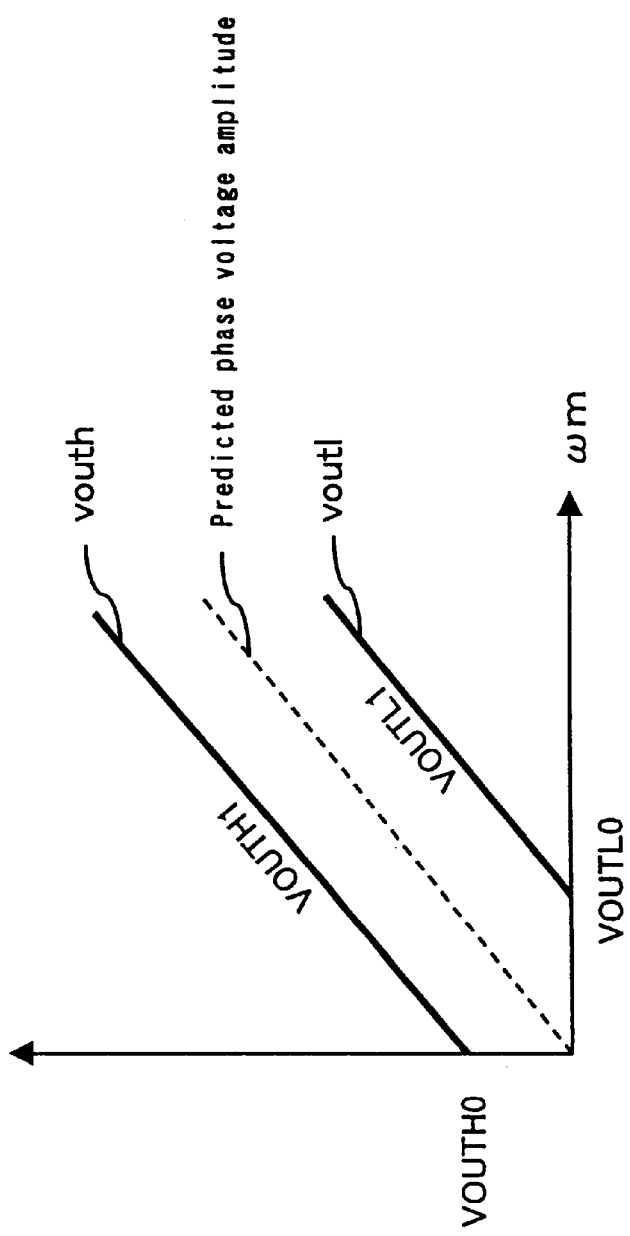
FIG. 23 is a diagram showing the relationship of an upper bound value and a lower bound value for phase voltage amplitude with respect to estimated velocity according to the sixth embodiment.

<Description of FIG. 23>

Next, the operation of the uncontrollable state detecting unit 690 will be described in detail.

The phase voltage amplitude uncontrollable state judging value generating unit 691 creates an upper bound value and a lower bound value defining a range of a certain width for the amplitude of the back electromotive force which is predicted to be produced when the rotor 12 rotates at the estimated velocity ωm. FIG. 23 is a diagram illustrating the relationship of the phase voltage amplitude upper bound value vouth and lower bound value voutl with respect to the estimated velocity ωm according to the sixth embodiment. As shown in FIG. 23, the phase voltage amplitude upper bound value vouth for the judgement of an uncontrollable state is set as a linear function of estimated velocity ωm, whose intercept is VOUTH0 and whose slope is VOUTH1. Likewise, the phase voltage amplitude lower bound value voutl for the judgement of an uncontrollable state is set as a linear function of estimated velocity ωm, whose point of intersection with the ωm axis is VOUTL0 and whose slope is VOUTL1.

The uncontrollable state judging unit 692 judges that an uncontrollable state has occurred when the phase voltage amplitude estimated value vm is outside the range defined by the phase voltage amplitude upper bound value vouth and lower bound value voutl. As shown in equation (64) below, when the phase voltage amplitude estimated value vm is smaller than the phase voltage amplitude lower bound value voutl, it is determined that an uncontrollable state has occurred, and the servo-on signal sv* is set to L. Likewise, when the phase voltage amplitude estimated value vm is larger than the phase voltage amplitude upper bound value vouth, it is determined that an uncontrollable state has occurred, and the servo-on signal sv* is set to L. Otherwise, it is determined that the state is normal, and the servo-on signal sv* is set to H.

$$sv^*=L(vm<voutl)$$

$$sv^*=H(voutl<vm\leq vouth)$$

$$sv^*=L(vm>vouth) \quad (64)$$

The position sensorless motor control apparatus of the first embodiment has produced the estimated angle θm by performing control so that the deviation between the back electromotive force value and the back electromotive force reference value esm converges to 0. If control is performed so that the deviation between the phase voltage value and the phase voltage reference value vsm converges to 0, as in the position sensorless motor control apparatus of the sixth embodiment, the operation is fundamentally the same as that in the first embodiment. Accordingly, the same effect as achieved in the first embodiment can be obtained in the sixth embodiment.

Further, the position sensorless motor control apparatus of the first embodiment has corrected the estimated angle θm and the back electromotive force amplitude estimated value em so that the back electromotive force value matches the back electromotive force reference value. Accordingly, computation time has been required for the computation of the back electromotive force values for the respective phases (the u-phase back electromotive force value eu, v-phase back electromotive force value eu, and w-phase back electromotive force value ew).

On the other hand the position sensorless motor control apparatus of the sixth embodiment corrects the estimated angle Om and the phase voltage amplitude estimated value vm so that the phase voltage value matches the phase voltage reference value vsm. Here, computation time is not required in the angle estimator 70, since the phase voltage values for the respective phases (the u-phase voltage value vu, v-phase voltage value vv, and w-phase voltage value vw) are generated by the current controller 50.

In this way, by performing control so that the phase voltage value matches the phase voltage reference value vsm, the sixth embodiment achieves a position sensorless motor control apparatus that accomplishes angle estimation by reducing the computation time.

Embodiment 7

A position sensorless motor control apparatus according to a seventh embodiment of the invention will be described below. The position sensorless motor control apparatus of the first embodiment corrected the estimated angle θm based on the deviation between the back electromotive force value and the back electromotive force reference value. On the other hand the position sensorless motor control apparatus of the foregoing sixth embodiment greatly simplifies the phase voltage equations, produces the phase voltage reference value, obtains the deviation between the phase voltage value and the phase voltage reference value, and corrects the estimated angle θm so that this deviation converges to 0.

The main purport of the present invention is to focus attention on the phase voltage equation for each stator winding phase; the former focused attention on the back electromotive force, while in the latter, attention was focused on the phase voltage. In this way, various modifications are possible in the present invention. The seventh embodiment hereinafter described shows one such modification and focuses attention on the phase current. The position sensorless motor control apparatus of the seventh embodiment produces a phase current reference value, obtains the deviation between the phase current and the phase current reference value and, using the characteristic that this deviation is equivalent to the deviation of the back electromotive force, corrects the estimated angle θm so that the deviation converges to 0.

The position sensorless motor control apparatus in each of the first to sixth embodiments has been described as controlling the IPMSM (interior permanent magnet synchronous motor). By contrast, the position sensorless motor control apparatus of the seventh embodiment controls a surface permanent magnet synchronous motor (SPMSM).

Figure 24:
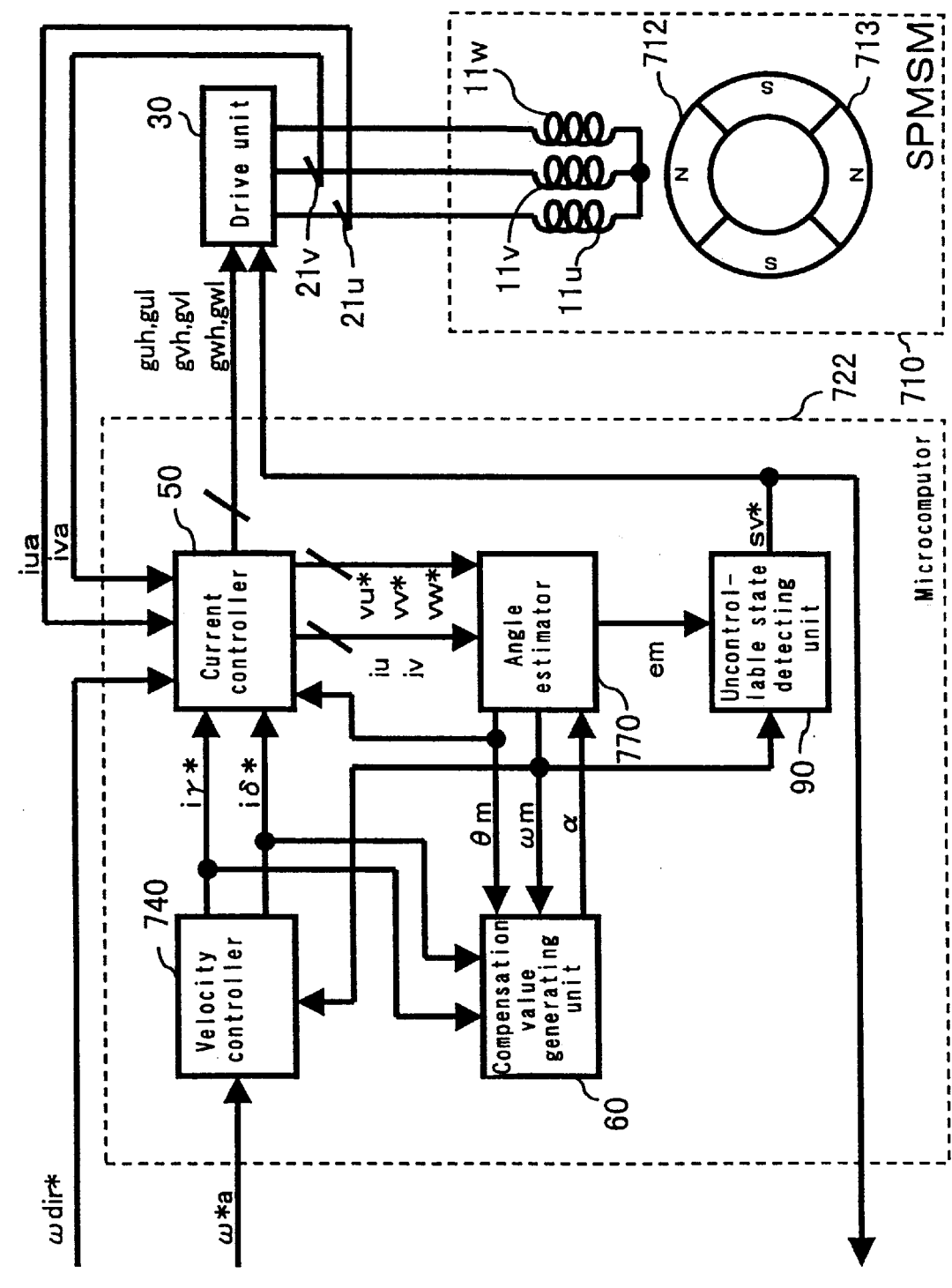
FIG. 24 is a block diagram showing the configuration of a position sensorless motor control apparatus according to a seventh embodiment.

<Description of FIG. 24>

FIG. 24 is a block diagram showing the configuration of the position sensorless motor control apparatus according to the seventh embodiment. The surface permanent magnet synchronous motor (SPMSM) 710 comprises a stator (not shown), around which are wound stator windings 11u, 11v, and 11w through which phase currents flow, and a rotor 712 placed in close proximity and in opposing relationship to the stator (not shown). The stator windings 11u, 11v, and 11w are connected in a Y-configuration. This brushless motor 710 includes a permanent magnet 713 embedded in the surface of the rotor 712, and the rotor 712 is rotated by the interaction between the magnetic flux generated by the phase current and the magnetic flux produced by the permanent magnet 713.

In the position sensorless motor control apparatus of the seventh embodiment, the microcomputer 722 differs from that of the first embodiment. More specifically, the velocity controller 740 and angle estimator 770 contained in the microcomputer 722 differ from those of the first embodiment. Otherwise, the configuration is the same as that of the first embodiment, and the same constituent elements will be designated by the same reference numerals and will not be described herein.

Figure 25:
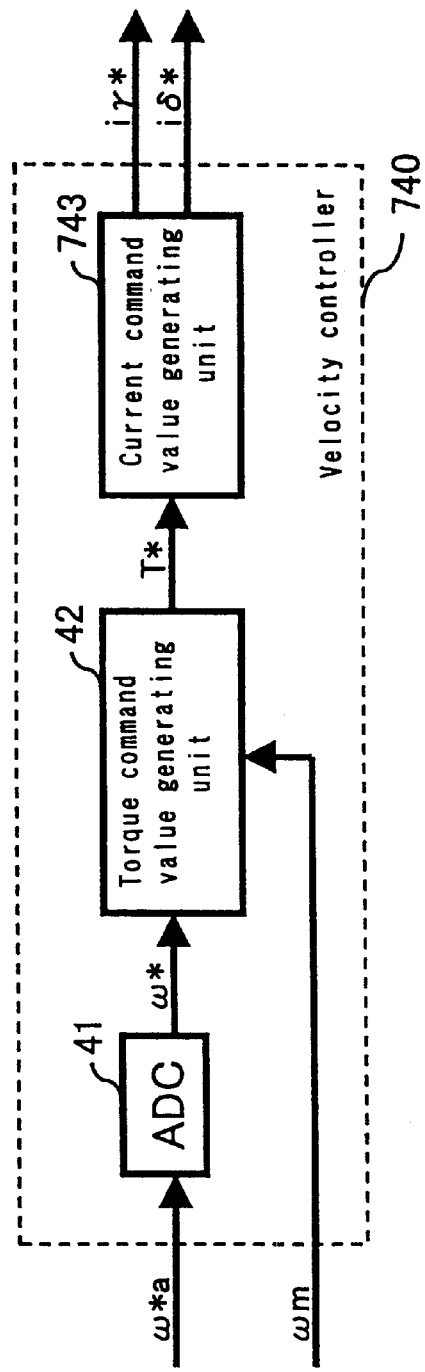
FIG. 25 is a block diagram showing the configuration of a velocity controller according to the seventh embodiment.

<Description of FIG. 25>

FIG. 25 is a block diagram showing the configuration of the velocity controller according to the seventh embodiment. The current command value generating unit 743 in the velocity controller 740 differs from that of the first embodiment. Otherwise, the configuration of the velocity controller 740 is the same as that of the first embodiment, and will not be described here.

Figure 26:
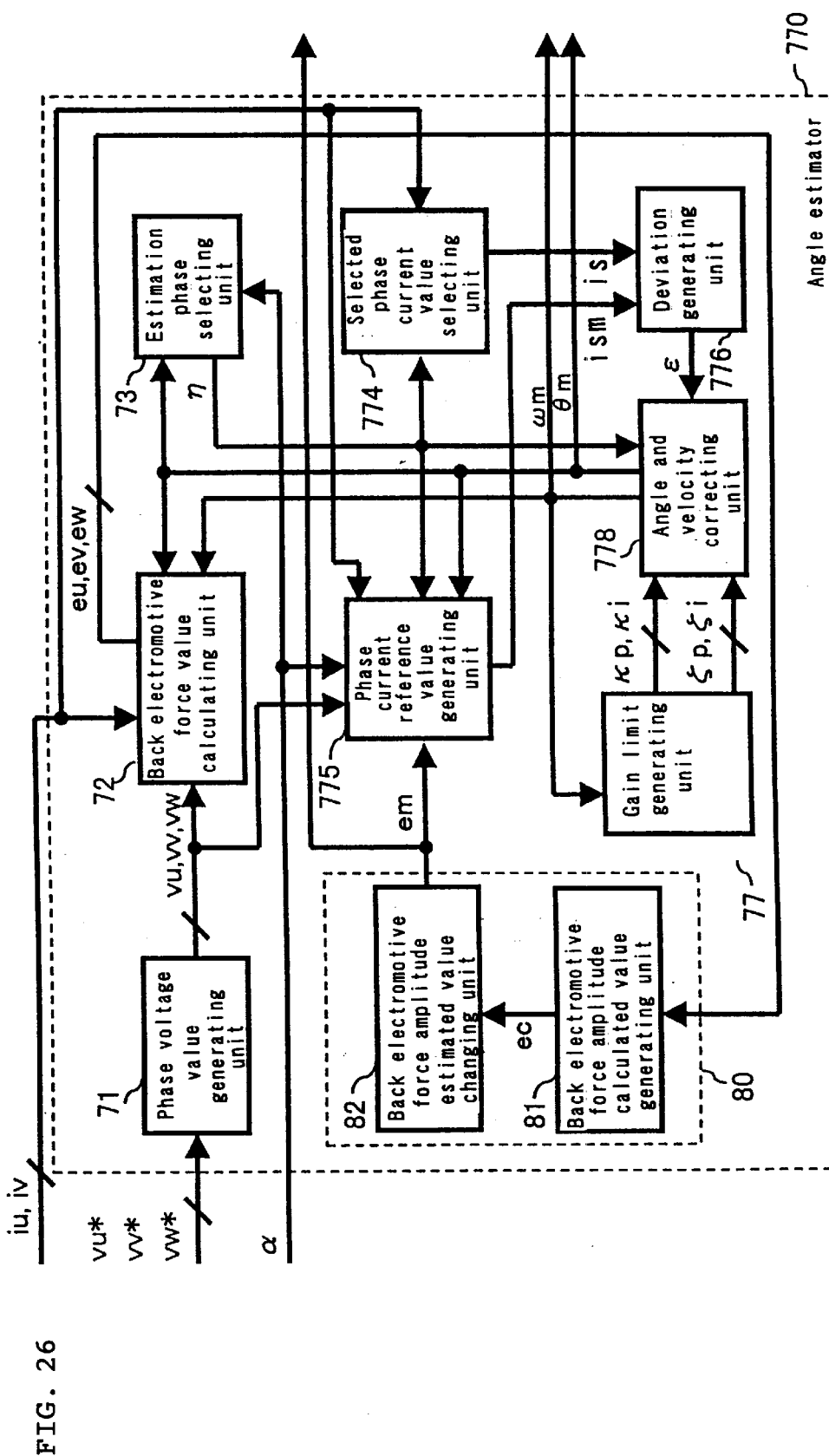
FIG. 26 is a block diagram showing the configuration of an angle estimator according to the seventh embodiment.
Figure 27:
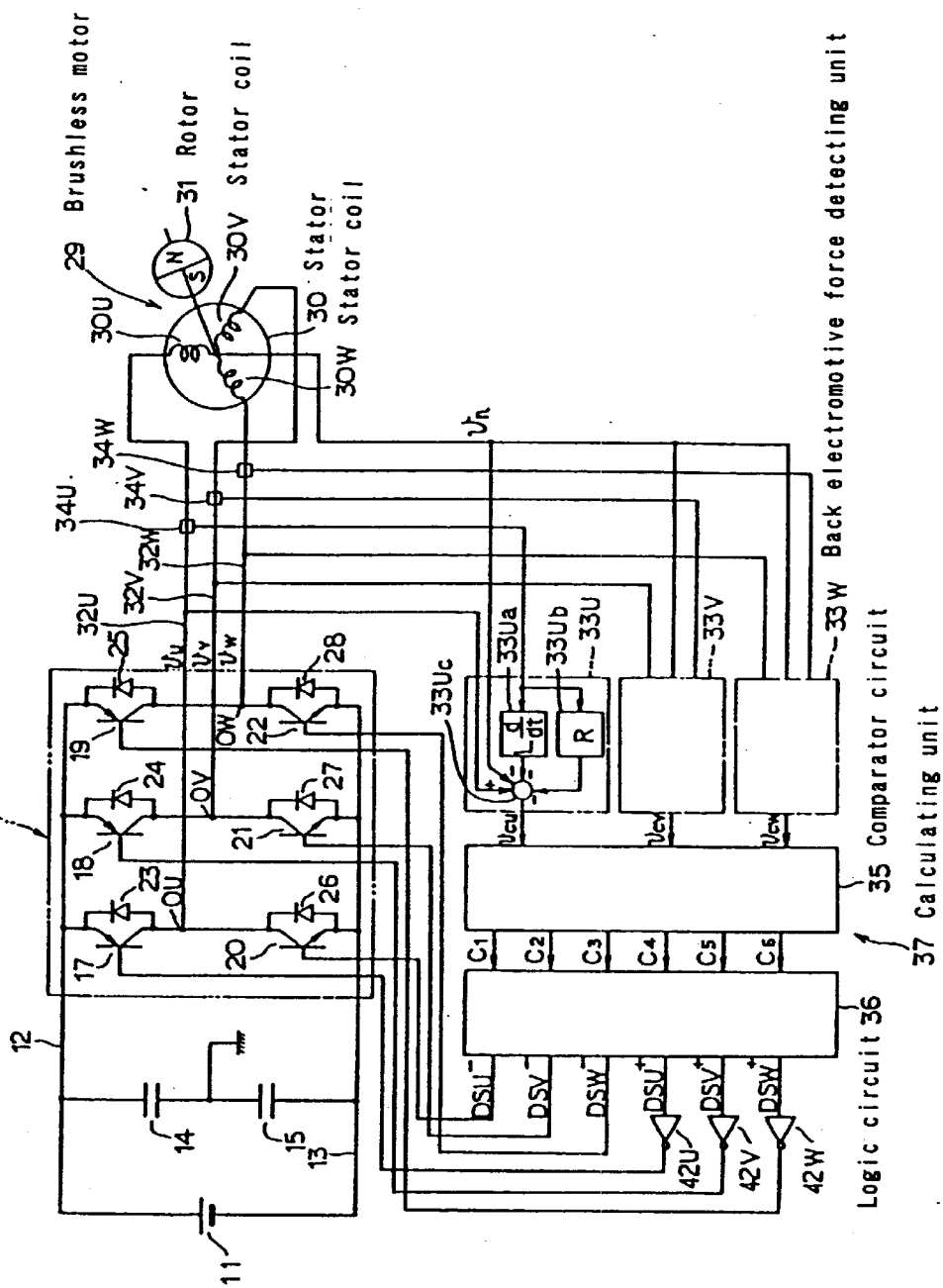
FIG. 27 is a block diagram showing the configuration of a position sensorless motor control apparatus according to prior art 1.
Figure 28:
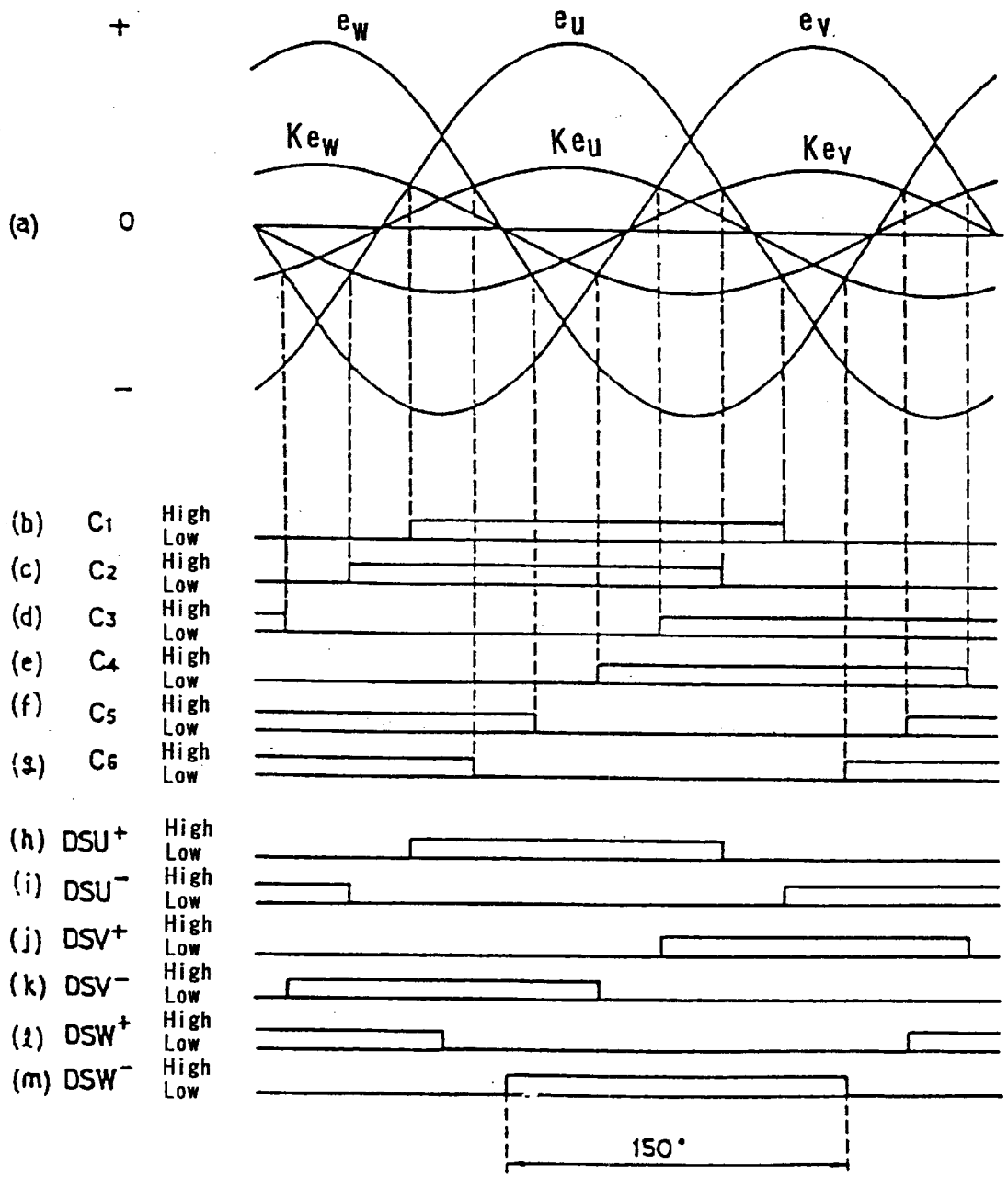
FIG. 28 is a timing chart for the position sensorless motor control apparatus according to prior art 1.
Figure 29:
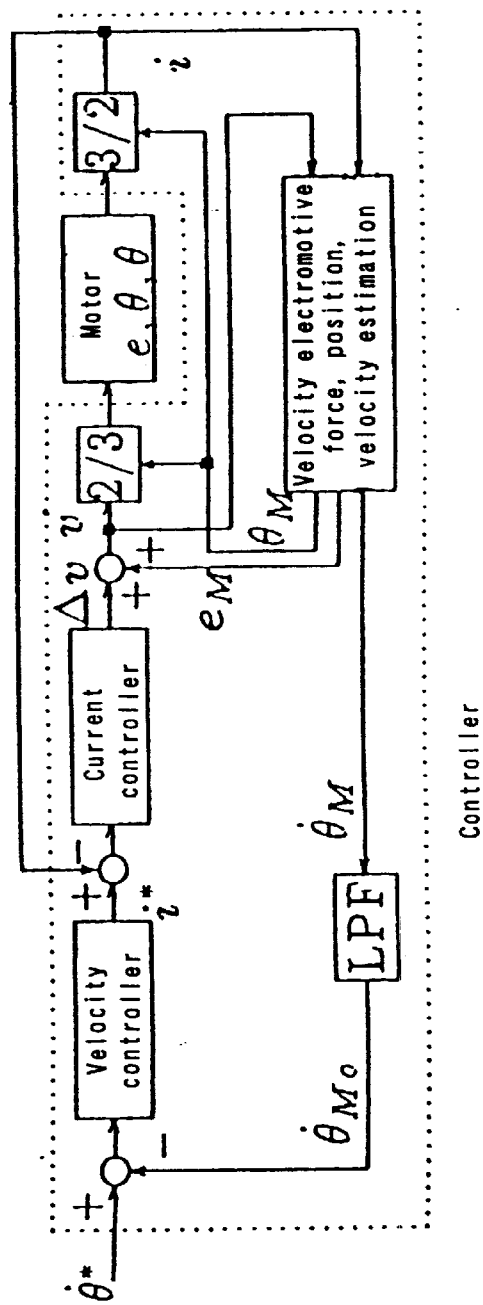
FIG. 29 is a block diagram showing the configuration of a position sensorless motor control apparatus according to prior art 2.
Figure 30:
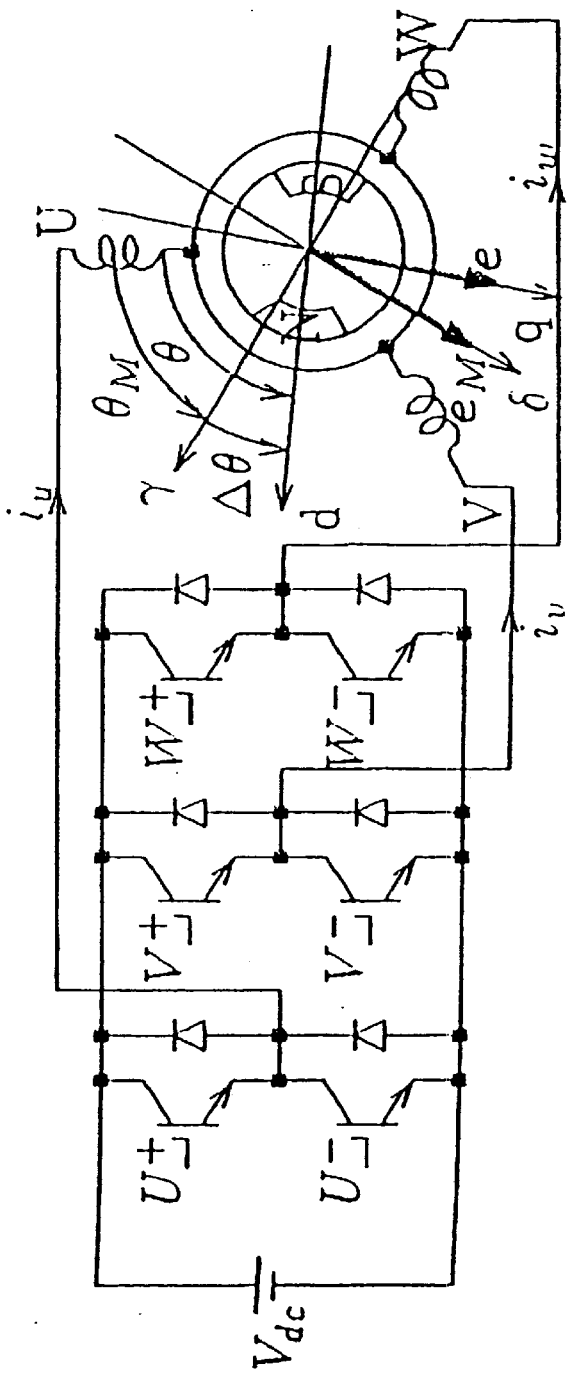
FIG. 30 is an analytic model of the position sensorless motor control apparatus according to prior art 2.

<Description of FIG. 26>

FIG. 26 is a block diagram showing the configuration of the angle estimator according to the seventh embodiment. The angle estimator 770 comprises: a phase voltage value generating unit 71 which takes the u-phase voltage command value vu*, v-phase voltage command value vv*, and w-phase voltage command value vw* as inputs, and outputs the u-phase voltage value vu, v-phase voltage. value vv, and w-phase voltage value vw; a back electromotive force value calculating unit 72 which takes the u-phase voltage value vu, v-phase voltage value wv, w-phase voltage value vw, estimated angle θm, estimated velocity ωm, u-phase current value iu, and v-phase current value iv as inputs, and outputs the u-phase back electromotive force value eu, v-phase back electromotive force value ev, and w-phase back electromotive force value ew; an estimation phase selecting unit 73 which takes the estimated angle θm and compensation value α as inputs, and outputs the estimation phase index η; a selected phase current value selecting unit 774 which takes the estimation phase index η, u-phase current value iu, and v-phase current value iv as inputs, and outputs a selected phase current value is; a phase current reference value generating unit 775 which takes the estimation phase index η, estimated angle θ m, compensation value α, back electromotive force amplitude estimated value em, u-phase current value iu, v-phase current value iv, u-phase voltage value vu, v-phase voltage value vv, and w-phase voltage value vw as inputs, and outputs the phase current reference value ism; a deviation generating unit 776 which takes the selected phase current value is and phase current reference value ism as inputs, and outputs the deviation ε; a gain limit generating unit 77 which takes the estimated velocity ωm as an input, and outputs the proportional gain κp, integral gain κi, proportional limit ζp, and integral limit ζi; an angle and velocity correcting unit 778 which takes the estimation phase index η, deviation ε, proportional gain κp, integral gain κi, proportional limit ζp, and integral limit ζi as inputs, and outputs the estimated angle θm and estimated velocity ωm; and a back electromotive force amplitude estimated value correcting unit 80 which takes the u-phase back electromotive force value eu, v-phase back electromotive force value ev, and w-phase back electromotive force value ew as inputs, and outputs the back electromotive force amplitude estimated value em.

The back electromotive force amplitude estimated value correcting unit 80 is the same as that of the first embodiment, and will not be described herein.

Next, the operation of the position sensorless motor control apparatus according to the seventh embodiment will be described.

In the seventh embodiment, the configuration other than the velocity controller 740 and angle estimator 770 is the same as that of the first embodiment, and will not be described herein.

First, the operation of the velocity controller 740 will be described.

The velocity controller 740 is activated at predetermined intervals of time, and controls the γ-axis current command value iγ* and the δ-axis current command value iδ* so that the rotor 712 rotates at the velocity directed by the externally supplied analog velocity command value ω*a, by operating the ADC 41, the torque command value generating unit 42, and the current command value generating unit 743 in this order, as described below.

The operation of the ADC 21 and torque command value generating unit 42 is the same as that of the first embodiment, and will not be described herein.

The current command value generating unit 743 generates the γ-axis current command value iγ* and the δ-axis current command value iδ* so that the output torque of the SPMSM 710 becomes identical with the torque command value T*.

As previously shown by the equation (5), the result obtained by dividing the torque command value T* by the predetermined value KT is taken as the current command value amplitude ia. Further, as shown in equation (65) below, the γ-axis current command value iγ* is set to 0. On the other hand the δ-axis current command value iδ* is taken as the current command value amplitude ia, as shown in equation (66) below.

$$i\gamma^* = 0 \tag{65}$$

$$i\delta^* = ia \tag{66}$$

Next, the operation of the angle estimator 770 will be described.

First, the meaning of the deviation between the phase current value and the phase current reference value will be explained.

In the SPMSM 710, the phase voltage equation for the u phase is expressed as shown in equation (67) below. In the equation, vu is the u-phase voltage value, eu is the u-phase back electromotive force value, R is the phase resistance value, iu is the u-phase current value, L is the inductance, and d/dt is the time derivative. Here, the u-phase back electromotive force value eu does not directly indicate the phase back electromotive force value eu calculated from the phase voltage equation to be described later.

$$vu = eu + R \cdot iu + L \cdot d(iu)/dt \tag{67}$$

The equation (67) is discretized by a first-order Euler approximation and solved for the u-phase current value iu; the result is the equation (68) shown below. In the equation, iu(n) is the u-phase current value iu when the angle estimator 770 is activated this time, and iu(n−1), vu(n−1), and eu(n−1) are the u-phase current value ie, u-phase voltage value vu, and u-phase back electromotive force value eu, respectively, the last time the angle estimator 770 was activated. ΔT is the angle estimation cycle with which the angle estimator 770 is activated.

$$iu(n) = iu(n-1) + \Delta T/L \cdot \{vu(n-1) - eu(n-1) - R \cdot iu(n-1)\} \tag{68}$$

The back electromotive force value eu(n−1) is expressed as shown in equation (69) below. In the equation, e is the back electromotive force amplitude, and θ (n−1) is the angle θ the last time the angle estimator 770 was activated. It is assumed here that the waveform of the back electromotive force is sinusoidal.

$$eu(n-1)=-e\cdot\sin\{\theta(n-1)\} \qquad (69)$$

On the other hand, in a modeled motor, the discretized equation is expressed by equation (70) below. In the equation, ium is the u-phase current reference value, and eum is the u-phase back electromotive force reference value. Further, the u-phase back electromotive force reference value eum (n−1) is expressed as shown by the equation (71) below. In the equation, em is the back electromotive force amplitude estimated value, and θm (n−1) is the estimated angle θm the last time the angle estimator 770 was activated.

$$ium(n)=iu(n-1)+\Delta T/L\cdot\{vu(n-1)-eum(n-1)-R\cdot iu(n-1)\} \qquad (70)$$

$$eum(n-1)=-em\cdot\sin\{\theta m(n-1)\} \qquad (71)$$

For the u phase, the deviation (u-phase deviation εu) between the u-phase current value iu and the phase current reference value ium is calculated as shown in equation (72) below. If the resistance value R and the inductance L in the phase voltage equation are both correct, the u-phase deviation εu is proportional to the deviation between the u-phase back electromotive force value and back electromotive force reference value. Here, the sign is opposite from that in the first embodiment.

$$\begin{aligned}\varepsilon u &= iu(n) - ium(n) \\ &= -\Delta T/L\cdot\{eu(n-1) - eum(n-1)\}\end{aligned} \qquad (72)$$

Accordingly, the same concept used in the first embodiment can be applied here, and the angle estimation is accomplished by performing control so that the u-phase current value iu matches the phase current reference value ium. However, since the sign of the deviation is opposite, the direction in which the estimated angle θm is to be corrected must be reversed.

The operation of the angle estimator 770 will now be described in detail. The angle estimator 770 is activated in a predetermined cycle (angle estimation cycle: ΔT), and produces the estimated angle θm and estimated velocity ωm by operating the phase voltage value generating unit 71, the back electromotive force value calculating unit 72, the estimation phase selecting unit 73, the selected phase current value selecting unit 774, the phase current reference value generating unit 775, the deviation generating unit 776, the gain limit generating unit 77, the angle and velocity correcting unit 778, the back electromotive force amplitude calculated value generating unit 81, and the back electromotive force amplitude estimated value changing unit 82 in this order, as described below.

The angle estimation cycle ΔT is made to match the cycle of the current control by operating the current controller 750, the compensation value generating unit 60, and the angle estimator 770 in this order.

The phase voltage value generating unit 71, the back electromotive force value calculating unit 72, and the estimation phase selecting unit 73 are the same as those in the first embodiment, and will not be described herein.

The selected phase current value selecting unit 774 takes the phase current value of the selected phase as the selected phase current value is. As shown in equation (73) below, when the estimation phase index η=0 or 3, the u-phase current value iu is taken as the selected phase current value is. Likewise, when the estimation phase index η=2 or 5, the v-phase current value iv is taken as the selected phase current value is. Further, when the estimation phase index η=1 or 4, the w-phase current value iw is taken as the selected phase current value is.

$$is=iu \text{(when } \eta=0, 3)$$

$$is=iv \text{(when } \eta=2, 5)$$

$$is=iw \text{(when } \eta 1, 4) \qquad (73)$$

The phase current reference value generating unit 775 takes the phase current reference value of the selected phase as the phase current reference value ism. As shown in equation (74) below, when the estimation phase index η=0 or 3, the u-phase current reference value ium is taken as the phase current reference value ism. Likewise, when the estimation phase index η2 or 5, the v-phase current reference value ivm is taken as the phase current reference value ism. Further, when the estimation phase index η=1 or 4, the w-phase current reference value iwm is taken as the phase current reference value ism. Here, the u-phase current reference value ium is expressed by equation (70), and the v-phase current reference value ivm and w-phase current reference value iwm are expressed by equation (75) below.

$$ism=ium \text{(when } \eta=0, 3)$$

$$ism=ivm \text{(when } \eta=2, 5)$$

$$ism=iwm \text{(when } \eta=1, 4) \qquad (74)$$

$$ivm(n)=iv(n-1)+\Delta T/L\cdot\{vv(n-1)-evm(n-1)-R\cdot iv(n-1)\}$$

$$iwm(n)=iw(n-1)+\Delta T/L\{\cdot vw(n-1)-ewm(n-1)-R\cdot iw(n-1)\} \qquad (75)$$

The deviation generating unit 776 generates the deviation ε. The deviation between the selected phase current value is and the phase current reference value ism is taken as the deviation ε, as shown by the following equation (76).

$$\epsilon=is-ism \qquad (76)$$

The gain limit generating unit 77 is the same as that of the first embodiment, and will not be described herein.

The angle and velocity correcting unit 778 corrects the estimated angle θm so that the deviation ε converges to 0. It also produces the estimated angle ωm.

First, the correction sign σ indicating the direction of the correction is generated. As shown in equation (77) below, when the estimation phase index η=0, 2, or 4, the correction sign σ is set to 1. When the estimation phase index η=1, 3, or 5, the correction sign σ is set to −1.

The method for correcting the estimated angle θm is the same as that in the first embodiment, and will not be described herein.

$$\sigma=+1 (\eta=0, 2, 4)$$

$$\sigma=-1 (\eta=1, 3, 5) \qquad (77)$$

The operation of the back electromotive force amplitude calculated value generating unit 81 and back electromotive force amplitude estimated value changing unit 82 are the same as that in the first embodiment, and will not be described herein.

The position sensorless motor control apparatus of the first embodiment has produced the estimated angle θm by performing control so that the deviation between the back electromotive force value and the back electromotive force reference value esm converges to 0. If control is performed so that the deviation between the phase current value and the phase current reference value ism converges to 0, as in the position sensorless motor control apparatus of the seventh embodiment, the operation is fundamentally the same as that in the first embodiment. Accordingly, the same effect as achieved in the first embodiment can be obtained in the seventh embodiment.

In the third to seventh embodiments, the phase voltage values vu, vv, and vw have been described as being generated based on the phase voltage command values vu*, vv*, and vw*, but the phase voltage values vu, vv, and vw may be generated based on the voltages detected by the voltage sensors, as in the second embodiment.

Further, in the second and the fourth to seventh embodiments, the phase current command values iu*, iv*, and iw* have been generated to control the currents, but the currents may be controlled on the γ, θ axes of the rotating coordinate system defined by the estimated angle θm, as in the third embodiment.

In the first to seventh embodiments, the phase current value and the phase voltage command value have been described as being interchanged between the u and v phases, but it will be recognized that, in a three-phase motor, the phase current value and the phase voltage command value need only be interchanged between any two of the three phases.

Further, when controlling the currents by the current controller, the same effect can be obtained whether the currents detected by the current sensors are used or whether the current commands are used that is, in the first to third and the fifth to seventh embodiments, the currents detected by the current sensors have been substituted into the phase voltage equations, but instead the current commands may be substituted. Conversely, in the fourth embodiment, the current commands have been substituted into the phase voltage equations, but instead the currents detected by the current sensors may be substituted.

In the first to seventh embodiments, the compensation value α has been varied according to the estimated angle θm, but the compensation value α need not necessarily be varied according to the estimated angle θm. In that case, compensation for estimation errors cannot be accomplished with an accuracy equivalent to the cycle of electrical angle, but estimation errors of average magnitude can be addressed.

In the sixth embodiment, the voltage phase component (α1) of the compensation value α has been obtained using an inverse tangent function as shown by the equation (56), but instead the voltage phase component (α1) of the compensation value α may be incorporated into the angle estimation error component (α2) and a table of compensation values α may be constructed so that the compensation value α can be obtained directly from the table.

In the sixth embodiment, an uncontrollable state has been determined based on the phase voltage amplitude estimated value vm, but instead a two-dimensional range may be constructed for the d-axis voltage command value vd* and q-axis voltage command value vq*, and an uncontrollable state may be determined when the values are outside this range.

In the first to seventh embodiments, the proportional gain κp, integral gain κi, proportional limit ζp, and integral limit ζi have been set similar to each other with respect to the estimated velocity ωm, but they may be set separately with respect to the estimated velocity ωm.

In the first to fifth embodiments and the seventh embodiment, the back electromotive force amplitude calculated value generating unit has been described as generating the back electromotive force amplitude calculated value ec from the sum of the absolute values of the back electromotive force values, but instead the back electromotive force amplitude calculated value ec may be produced by taking the square root of the sum of the squares of the back electromotive force values.

Likewise, in the sixth embodiment, the phase voltage amplitude calculated value generating unit has been described as generating the phase voltage amplitude calculated value vc from the sum of the absolute values of the phase voltage values, but instead the phase voltage amplitude calculated value vc may be produced by taking the square root of the sum of the squares of the phase voltage values.

In the first to fifth embodiments and the seventh embodiment, the back electromotive force amplitude calculated value ec has been produced using the back electromotive force values of the three phases, but the back electromotive force amplitude calculated value ec may be obtained from the back electromotive force value of one phase. In that case, the back electromotive force value whose magnitude is the largest of the three phases is multiplied by a coefficient and the result is taken as the back electromotive force amplitude calculated value ec.

Likewise, in the sixth embodiment, the phase voltage amplitude calculated value vc has been produced using the phase voltage values of the three phase, but the phase voltage amplitude calculated value vc may be obtained from the back electromotive force value of one phase. In that case, the phase voltage value whose magnitude is the largest of the three phases is multiplied by a coefficient and the result is taken as the phase voltage amplitude calculated value vc.

In the first to seventh embodiments, each back electromotive force has been assumed to be sinusoidal in waveform, but non-sinusoidal waveforms such as trapezoidal or other waveforms also fall within the scope of the invention. When trapezoidal waveform is employed, for example, the back electromotive force reference value having a sinusoidal waveform should be replaced by one having a trapezoidal waveform.

Further, in the first to seventh embodiments, the current controller, the compensation value generating unit, and the angle estimator are operated in synchronized fashion, but they need not necessarily be operated in synchronized fashion. However, when they are not synchronized, appropriate design changes must be made so that the operation to advance the estimated angle θm, performed in the angle and velocity correcting unit, can be performed in the current controller.

In the first to seventh embodiments, dead time compensation may be applied to the post-swap voltage command values vu*1, vv*1, and vw*1. Further, in the first and the third to seventh embodiments, the phase voltage command values vu*, vv*, and vw* have been taken as the phase voltage values vu, vv, and vw, but instead the phase voltage command values vu*, vv*, and vw* compensated to eliminate the effects of dead time may be taken as the phase voltage values vu, vv, and vw. This serves to enhance the angle estimation accuracy. In that case, the phase voltage values vu, vv, and vw from which neutral voltage components have been subtracted are used for the estimation.

In the first to seventh embodiments, the result of the proportional integration has been taken directly to produce each phase voltage command value, but instead the third harmonics may be superimposed on the result of the proportional integration or two-phase modulation may be performed based on the result of the proportional integration. In that case, the phase voltage values vu, vv, and vw from which neutral voltage components have been subtracted are used for the estimation.

The first to sixth embodiments have each been described as controlling an IPMSM, but an SPMSM may be controlled instead. Conversely, the seventh embodiment has been described as controlling an SPMSM, but it may be configured to control an IPMSM by taking inductance variations into account in the calculation of the phase current model value ism.

Each embodiment may also be configured to control a synchronous reluctance motor. Since synchronous reluctance motors do not have permanent magnets, control should be performed by setting the back electromotive force by the permanent magnet to 0. For example, in the sixth embodiment, the effective value $\psi$ of the dq axis winding flux linkage due to the permanent magnet should be set to 0 in the equation (56), and the voltage phase component $\alpha 1$ of the compensation value $\alpha$ should be generated as shown in the following equation (78).

$$\alpha 1 = -a \, \tan[\{R \cdot i\gamma^* - \omega e \cdot Lq \cdot i\delta^*\}/\{R \cdot i\gamma^* + \omega e \cdot Ld \cdot i\delta^*\}] \tag{78}$$

As described above, according to the present invention, by obtaining the deviation and correcting the estimated angle for each angle estimation cycle at very short intervals of time, there is offered the advantageous effect of being able to realize a position sensorless motor control apparatus that produces the estimated angle with high resolution and high accuracy at all times.

Further, by obtaining the deviation and correcting the estimated angle for each angle estimation cycle at very short intervals of time, there is also offered the advantageous effect of being able to realize a position sensorless motor control apparatus capable of following rapid changes in angular velocity and thus having good response to velocity changes.

According to the invention, since the estimated angle is not affected by temperature changes, there is offered the advantageous effect of being able to realize a position sensorless motor control apparatus that estimates the rotor angle with high accuracy over a wide temperature range.

According to the invention, since there is no need to rotate the coordinates when performing calculations between the estimated signal and measured data, etc., there is offered the advantageous effect of being able to realize a position sensorless motor control apparatus capable of driving a motor at high speed or with large output torque by estimating the rotor angle correctly even when the stator winding phase voltage of the motor saturates, causing the waveform of the phase voltage, etc. to become a trapezoidal, square, or other shape.

According to the invention, since the stator winding current is treated as a sinusoidal signal, the computation for angle estimation is simplified this offers the advantageous effect of being able to realize a position sensorless motor control apparatus that accomplishes the angle estimation with a short computation time using a small-size and inexpensive microprocessor or the like.

Furthermore, since the stator winding has a large inductance component, the waveform of the phase current of the stator winding does not easily saturate, and even when the waveform of the phase voltage of the stator winding saturates, the waveform of the phase current is maintained close to a sinusoidal shape; this offers the advantageous effect of being able to realize a position sensorless motor control apparatus capable of driving a motor at high speed or with large output torque by estimating the rotor angle with high accuracy even when the waveform of the phase voltage of the stator winding saturates.

According to the invention, a specific parameter of angle error is calculated and the estimated angle is corrected in such a manner as to reduce the angle error. This offers the advantageous effect that even when the actual motor driving waveform is, for example, a square waveform (or a trapezoidal waveform), the angle estimating unit has an estimated model of sinusoidal waveform, calculates the angle error between the angle of the square (or trapezoidal) waveform and the angle of the sinusoidal waveform, and corrects the estimated model of the sinusoidal waveform in such a manner as to reduce the angle error. The invention thus offers the advantageous effect of facilitating the generation of the estimated model.

According to the invention, there is offered the advantageous effect of being able to achieve high angular velocity and large output torque because the angle can be estimated correctly, even when the motor angular velocity or output torque increases and the required phase voltage becomes large, causing the phase voltage of each stator winding phase to saturate and thereby causing the voltage waveform of each phase to lose its sinusoidal shape.

Furthermore, in the position sensorless motor control apparatus of the invention, the permanent magnet of the rotor can be magnetized with any desired waveform. Accordingly, the invention offers the advantageous effect of being able to estimate the rotor angle with high accuracy even for motors whose rotor permanent magnets are magnetized with non-sinusoidal waveforms and whose back electromotive force waveform is non-sinusoidal.

According to the invention, specific parameters of angle error and amplitude error are calculated, and the estimated angle is corrected in such a manner as to reduce the angle error.

This offers the advantageous effect of being able to realize a position sensorless motor control apparatus also capable of estimating correct angular velocity in the presence of variations in load or in angular velocity.

According to the invention, correction is also applied to a coefficient in the function of estimated angle that the estimated model has. This offers the advantageous effect of being able to realize a position sensorless motor control apparatus that can obtain a highly accurate estimated model and that performs angle estimation with high accuracy.

According to the invention, the transfer characteristics of the signal path leading from the output of the angle estimating unit to the feedback input of the angle estimating unit do not contain any elements having temperature dependence. This offers the advantageous effect of being able to realize a position sensorless motor control apparatus that estimates the rotor angle with high accuracy over a wide temperature range.

According to the invention, angle error is corrected by selecting the phase where the detection accuracy of the angle error is high. This offers the advantageous effect of being able to realize a position sensorless motor control apparatus capable of estimating the angle with high accuracy for any rotor angle.

According to the invention, when the rotor angle estimation error of the motor is detected having exceeded a predetermined range (and as a result, the estimated angular velocity, for example, indicates a value entirely different from the actual angular velocity), the motor is, for example, stopped. This offers the advantageous effect of being able to realize a position sensorless motor control apparatus capable of easily exiting from an uncontrollable state in which the motor is thrown out of control.

According to the invention, the estimated model is corrected using the error signal multiplied by a gain having a defined correspondence with the angular velocity of the rotor. This offers the advantageous effect of being able to realize a position sensorless motor control apparatus capable of obtaining a proper correction value from a low angular velocity range to a high angular velocity range, thus achieving high accuracy angle estimation over a wide velocity range.

According to the invention, the estimated signal is prevented from being corrected using an excessively large correction value. This offers the advantageous effect of being able to achieve a stable position sensorless motor control apparatus that is resistant to noise.

According to the invention, the upper bound value or lower bound value of the correction value is varied according to the angular velocity. This offers the advantageous effect of being able to achieve a stable position sensorless motor control apparatus that is resistant to noise over a wide velocity range.

According to the invention, by providing a table of compensation values associated with parameters, there is offered the advantageous effect of being able to realize a position sensorless motor control apparatus that estimates the angle with a higher accuracy than an apparatus that estimates the angle by calculation only.

According to the invention, there is offered the advantageous effect of being able to realize a position sensorless motor control apparatus that accomplishes switching between the forward and reverse rotations with a very small number of elements involved, and that allows most of the circuit block or program block to be used for both forward and reverse rotations.

According to the invention, the back electromotive force is derived by subtracting components other than the back electromotive force from the measured or calculated voltage of each stator winding. This offers the advantageous effect of being able to realize a position sensorless motor control apparatus that estimates the rotor angle with high accuracy over a wide temperature range.

According to the invention, a simple method is used that compares the back electromotive forces of the respective phases and selects the phase whose back electromotive force is the smallest, eliminating the need to calculate errors for all phases; this offers the advantageous effect of reducing the computation time, since the phase whose error is the largest in the normal state is selected and the error is calculated only for the selected phase.

According to the invention, the angle is estimated by reference to the current signal of the stator winding. Since the estimated angle is not affected by temperature variations, this offers the advantageous effect of being able to realize a position sensorless motor control apparatus that estimates the rotor angle with high accuracy over a wide temperature range.

According to the invention, a position sensorless motor control apparatus is achieved that estimates the angle in a short computation time by performing control so that the phase voltage matches the phase voltage reference value.

Although the invention has been described in some detail dealing with the preferred embodiments, the configuration details of any of the preferred embodiments disclosed herein may be changed or modified, and any changes in the combination or order of elements thereof can be accomplished without departing from the spirit and scope of the invention as set forth in the appended claims.

What is claimed is:

1. A position sensorless motor control apparatus, wherein
    a target current of a stator winding of a motor is derived by a function that takes a target angular velocity of a rotor and an estimated angular velocity of said rotor as variables, and
    a voltage, derived by a function that takes said target current of said stator winding, an actually measured current of said stator winding, and an estimated angle of the rotor of said motor as variables, is applied to said stator winding of said motor.

2. A position sensorless motor control apparatus including an angle estimating unit for estimating rotor angle and angular velocity of a motor, wherein
    said angle estimating unit
    has a table of compensation values with at least one of said estimated angle, said estimated angular velocity, and a measured or calculated current of a stator winding taken as a parameter, and
    compensates said estimated angle by using the compensation value associated with said parameter.

3. A position sensorless motor control apparatus comprising:
    a current sensor for detecting a phase current value representing the value of a current to a stator winding of a motor;
    a voltage command value generating unit for generating, based on an estimated angle of a rotor of said motor, a phase voltage command value indicating a command value for a voltage to be applied to said stator winding;
    a driving unit for applying voltage to said stator winding based on said phase voltage command value;
    an angle estimating unit for generating said estimated angle; and
    a rotational direction command unit for outputting a rotational direction command indicating the direction in which said rotor is to be rotated, and wherein
        when said rotational direction commands indicates a reverse direction, said phase current values for at least two phases are interchanged with each other and said phase voltage command values for said at least two phases are interchanged with each other.

4. A position sensorless motor control apparatus including an angle estimating unit for estimating rotor angle of a motor, wherein
    said angle estimating unit has a second signal or a third signal derivable from said second signal, or angle information of said second signal or said third signal, said second signal having the same waveform as the waveform of a back electromotive force derived by subtracting components other than the back electromotive force from a measured or calculated phase voltage of a stator winding.

5. A position sensorless motor control apparatus according to claim 4, wherein
    said second signal or said third signal or said angle information is derived by a function that takes the measured or calculated phase voltage off said stator winding of said motor, a measured current of said stator winding, and said estimated rotor angle of said motor as variables.

6. A position sensorless motor control apparatus according to claim 4, wherein
    said angle estimating unit further
        calculates an angle error between a signal derived from said second signal or said third signal, or a signal derived from said angle information, and the back electromotive force derived by subtracting the components other than the back electromotive force from the measured or calculated phase voltage of said stator winding, or calculates an amplitude error having a defined correspondence with said angle error, and corrects the estimated angle of said second signal or said third signal or of said angle information in such a manner as to reduce said angle error or said amplitude error having a defined correspondence with said angle error.

7. A position sensorless motor control apparatus according to claim 6, wherein said angle estimating unit further calculates an amplitude error between the amplitude of said second signal or said third signal and the amplitude of the back electromotive force derived by subtracting the components other than the back electromotive force from the measured or calculated phase voltage of said stator winding, and corrects the amplitude of said second signal or said third signal in such a manner as to reduce said amplitude error.

8. A position sensorless motor control apparatus according to claim 7, wherein when the amplitude of said second signal or said third signal exceeds a predetermined range, said motor is decelerated or stopped.

9. A position sensorless motor control apparatus according to claim 6, wherein said angle estimating unit further corrects the estimated angle of said second signal or said third signal or of said angle information by using a correction value obtained by multiplying said angle error, or said amplitude error having a defined correspondence with said angle error, by a gain having a defined correspondence with an estimated rotor angular velocity of said motor.

10. A position sensorless motor control apparatus according to claim 9, wherein the absolute value of said gain may become larger as said angular velocity increases, but does not become smaller.

11. A position sensorless motor control apparatus according to claim 6, wherein said angle estimating unit further performs control so that a correction value, which is used to correct said second signal or said third signal or said angle information, does not exceed at least one of an upper bound value and a lower bound value having a defined correspondence with the angular velocity of said motor.

12. A position sensorless motor control apparatus according to claim 11, wherein the absolute value of said upper bound value or lower bound value may become larger as said angular velocity increases, but does not become smaller.

13. A position sensorless motor control apparatus according to claim 6, wherein said angle estimating unit further has a table of compensation values with at least one of said estimated angle, an estimated angular velocity of said motor, and the measured or calculated current of said stator winding taken as a parameter, and compensates the estimated angle of said second signal or said third signal or of said angle information by using the compensation value associated with said parameter in said table.

14. A position sensorless motor control apparatus according to claim 4, wherein the components other than said back electromotive force are derived using a measured or calculated current of said stator winding of said motor, said measured or calculated current being assumed to be a sinusoidal signal.

15. A position sensorless motor control apparatus including an angle estimating unit that has a back electromotive force estimated signal containing information on rotor angle of a motor, wherein said angle estimating unit selects the largest error from among errors each representing an error between a back electromotive force of each phase, derived based on information containing the current of each stator winding phase of said motor, and the estimated signal of said back electromotive force, and corrects said estimated signal in such a manner as to reduce said largest error.

16. A position sensorless motor control apparatus including an angle estimating unit that has a back electromotive force estimated signal containing information on rotor angle of a motor, wherein said angle estimating unit selects a stator winding phase whose back electromotive force is the smallest of the back electromotive forces of the stator winding phases of said motor derived based on information respectively containing the currents of the respective stator winding phases of said motor, and corrects said estimated signal in such a manner as to reduced an error between the back electromotive force of said selected phase and the estimated signal of said back electromotive force.

17. A position sensorless motor control apparatus including an angle estimating unit for estimating a rotor angle of a motor, wherein said angle estimating unit has a fourth signal or a fifth signal derivable from said fourth signal, or angle information of said fourth signal or said fifth signal, said fourth signal having the same waveform as the waveform of a stator winding current, wherein said angle estimating unit:

calculates an angle error between said fourth signal or said fifth signal, or said angle information, and a signal derived from said stator winding current, or calculates an amplitude error having a defined correspondence with said angle error, corrects an estimated angle of said fourth signal or said fifth signal or of said angle information in such a manner as to reduce said angle error or said amplitude error having a defined correspondence with said angle error, calculates an amplitude error between the amplitude of said fourth signal or said fifth signal that said angle estimating unit has and the amplitude of the signal derived from said stator winding current, and corrects the amplitude of said fourth signal or said fifth signal in such a manner as to reduce said amplitude error.

18. A position sensorless motor control apparatus according to claim 17, wherein when said angle error or said amplitude error having a defined correspondence with said angle error exceeds a predetermined range, said motor is decelerated or stopped.

19. A position sensorless motor control apparatus according to claim 17, wherein said angle estimating unit further corrects the estimated angle of said fourth signal or said fifth signal or of said angle information by using a correction value obtained by multiplying said angle error, or said amplitude error having a defined correspondence with said angle error, by a gain having a defined correspondence with an estimated angular velocity of said rotor of said motor.

20. A position sensorless motor control apparatus according to claim 19, wherein the absolute value of said gain may become larger as said angular velocity increases, but does not become smaller.

21. A position sensorless motor control apparatus according to claim 17, wherein said angle estimating unit further performs control so that a correction value, which is used to correct said fourth signal or said fifth signal or said angle information, does not exceed at least one of an upper bound value and a lower bound value having a defined correspondence with the angular velocity of said motor.

22. A position sensorless motor control apparatus according to claim 21, wherein the absolute value of said upper bound value or lower bound value may become larger as said angular velocity increases, but does not become smaller.

23. A position sensorless motor control apparatus according to claim 17, wherein said angle estimating unit further
has a table of compensation values with at least one of said estimated angle, an estimated angular velocity of said rotor, and the measured or calculated current of said stator winding taken as a parameter, and
compensates the estimated angle of said fourth signal or said fifth signal or of said angle information by using the compensation value associated with said parameter in said table.

24. A position sensorless motor control apparatus including an angle estimating unit that has a stator winding current estimated signal containing information on rotor angle of a motor, wherein said angle estimating unit selects the largest error from among errors each representing an error between a measured current of each stator winding of said motor and the estimated signal of said current, and corrects said estimated signal in such a manner as to reduce said largest error.

25. A position sensorless motor control apparatus including an angle estimating unit that has a stator winding current estimated signal containing information on rotor angle of a motor, wherein said angle estimating unit
selects a stator winding phase whose measured current is the smallest of the measured currents of the stator winding phases of said motor, and corrects said estimated signal in such a manner as to reduced an error between the current of said selected phase and the estimated signal of said current.

26. A position sensorless motor control apparatus including an angle estimating unit for estimating a rotor angle of a motor, wherein said angle estimating unit has a sixth signal or a seventh signal derivable from said sixth signal, or angle information of said sixth signal or said seventh signal, said sixth signal having the same waveform as the waveform of a measured or calculated phase voltage of a stator winding, wherein said angle estimating unit:

calculates an angle error between said sixth signal or said seventh signal, or said angle information, and a signal derived from said measured or calculated phase voltage of said stator winding, or calculates an amplitude error having a defined correspondence with said angle error, corrects an estimated angle of said sixth signal or said seventh signal or of said angle information in such a manner as to reduce said angle error or said amplitude error having a defined correspondence with said angle error, calculates an amplitude error between the amplitude of said sixth signal or said seventh signal that said angle estimating unit has, and the amplitude of the signal derived from said measured or calculated phase voltage of said stator winding, and corrects the amplitude of said sixth signal or said seventh signal in such a manner as to reduce said amplitude error.

* * * * *